United States Patent
Hanrahan et al.

(10) Patent No.: US 11,789,646 B2
(45) Date of Patent: Oct. 17, 2023

(54) METHODS, APPARATUS, AND ARTICLES OF MANUFACTURE TO INCREASE DATA REUSE FOR MULTIPLY AND ACCUMULATE (MAC) OPERATIONS

(71) Applicant: Intel Corporation, Santa Clara, CA (US)

(72) Inventors: Niall Hanrahan, Galway (IE); Martin Power, Dublin (IE); Kevin Brady, Newry (GB); Martin-Thomas Grymel, Leixlip (IE); David Bernard, Kilcullen (IE); Gary Baugh, Bray (IE); Cormac Brick, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 57 days.

(21) Appl. No.: 17/484,780

(22) Filed: Sep. 24, 2021

(65) Prior Publication Data

US 2022/0012058 A1 Jan. 13, 2022

(51) Int. Cl.
*G06F 3/06* (2006.01)
*G06F 7/544* (2006.01)

(52) U.S. Cl.
CPC .......... *G06F 3/0656* (2013.01); *G06F 3/0613* (2013.01); *G06F 3/0625* (2013.01); *G06F 3/0679* (2013.01); *G06F 7/5443* (2013.01)

(58) Field of Classification Search
CPC .... G06F 3/0656; G06F 3/0613; G06F 3/0625; G06F 3/0679
See application file for complete search history.

(56) References Cited

U.S. PATENT DOCUMENTS

| 10,620,876 B1 | 4/2020 | Gauria et al. |
| 10,768,895 B2 | 9/2020 | Connor et al. |

(Continued)

FOREIGN PATENT DOCUMENTS

| EP | 3299952 A1 * | 3/2018 | ........... G06F 7/5443 |
| EP | 3671433 A1 * | 6/2020 | ............. G06F 17/16 |

(Continued)

OTHER PUBLICATIONS

T. T. Hoang, M. Själander and P. Larsson-Edefors, "A High-Speed, Energy-Efficient Two-Cycle Multiply-Accumulate (MAC) Architecture and Its Application to a Double-Throughput MAC Unit," in IEEE Transactions on Circuits and Systems I: Regular Papers, vol. 57, No. 12, pp. 3073-3081.*

(Continued)

*Primary Examiner* — Pierre Michel Bataille
(74) *Attorney, Agent, or Firm* — Akona IP

(57) ABSTRACT

Methods, apparatus, systems, and articles of manufacture are disclosed that increase data reuse for multiply and accumulate (MAC) operations. An example apparatus includes a MAC circuit to process a first context of a set of a first type of contexts stored in a first buffer and a first context of a set of a second type of contexts stored in a second buffer. The example apparatus also includes control logic circuitry to, in response to determining that there is an additional context of the second type to be processed in the set of the second type of contexts, maintain the first context of the first type in the first buffer. The control logic circuitry is also to, in response to determining that there is an additional context of the first type to be processed in the set of the first type of contexts maintain the first context of the second type in the second buffer and iterate a pointer of the second buffer from a first position to a next position in the second buffer.

25 Claims, 20 Drawing Sheets

(56) References Cited

U.S. PATENT DOCUMENTS

| | | | |
|---|---|---|---|
| 2013/0339677 A1* | 12/2013 | Tullberg | G06F 9/3001 |
| | | | 712/221 |
| 2019/0065151 A1* | 2/2019 | Chen | G06N 3/048 |
| 2019/0220734 A1 | 7/2019 | Ferdman et al. | |
| 2020/0042860 A1 | 2/2020 | Sun et al. | |
| 2021/0004208 A1* | 1/2021 | Lai | G06F 7/5443 |
| 2021/0103793 A1 | 4/2021 | Huang | |
| 2021/0397933 A1* | 12/2021 | Boesch | H03M 7/6005 |
| 2022/0012058 A1 | 1/2022 | Hanrahan et al. | |
| 2022/0237438 A1* | 7/2022 | Mills | G06N 3/045 |
| 2023/0086802 A1* | 3/2023 | Wadhwa | G06N 3/063 |
| | | | 708/620 |

FOREIGN PATENT DOCUMENTS

| | | | | |
|---|---|---|---|---|
| KR | 10-2018-0050928 A | | 5/2018 | |
| WO | WO-2018185766 A1 * | 10/2018 | | G06F 12/0207 |

OTHER PUBLICATIONS

International Searching Authority, "International Search Report and Written Opinion," issued in connection with International Application No. PCT/US2022/038910, dated Nov. 14, 2022, 9 pages.

Parashar et al., "SCNN: An Accelerator for Compressed-sparse Convolutional Neural Networks," ACM, ISCA 2017, Jun. 24, 2017, 14 pages.

Horowitz, "Computing's Energy Problem (and what we can do about it)," IEEE, 2014 IEEE International Solid-State Circuits Conference, Feb. 10, 2014, 5 pages.

Sze et al., "Efficient Processing of Deep Neural Networks," Morgan & Claypool Publishers, Synthesis Lectures on Computer Architecture, vol. 15, No. 2, Jun. 15, 2020, pp. 58-59, citing an 82 page excerpt.

He et al., "Deep Residual Learning for Image Recognition," arXiv:1512. 03385v1 [cs.CV], Dec. 10, 2015, 12 pages.

NVIDIA, "NVIDIA Deep Learning Accelerator (NVDLA)," NVIDIA Corporation, [http://nvdla.org/] retrieved on Jan. 16, 2023, 6 pages.

\* cited by examiner

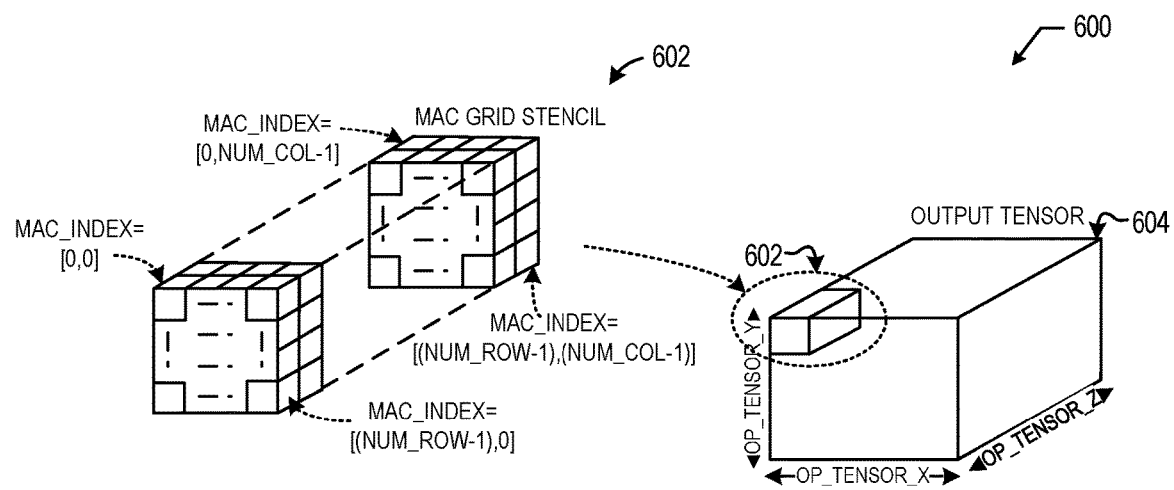
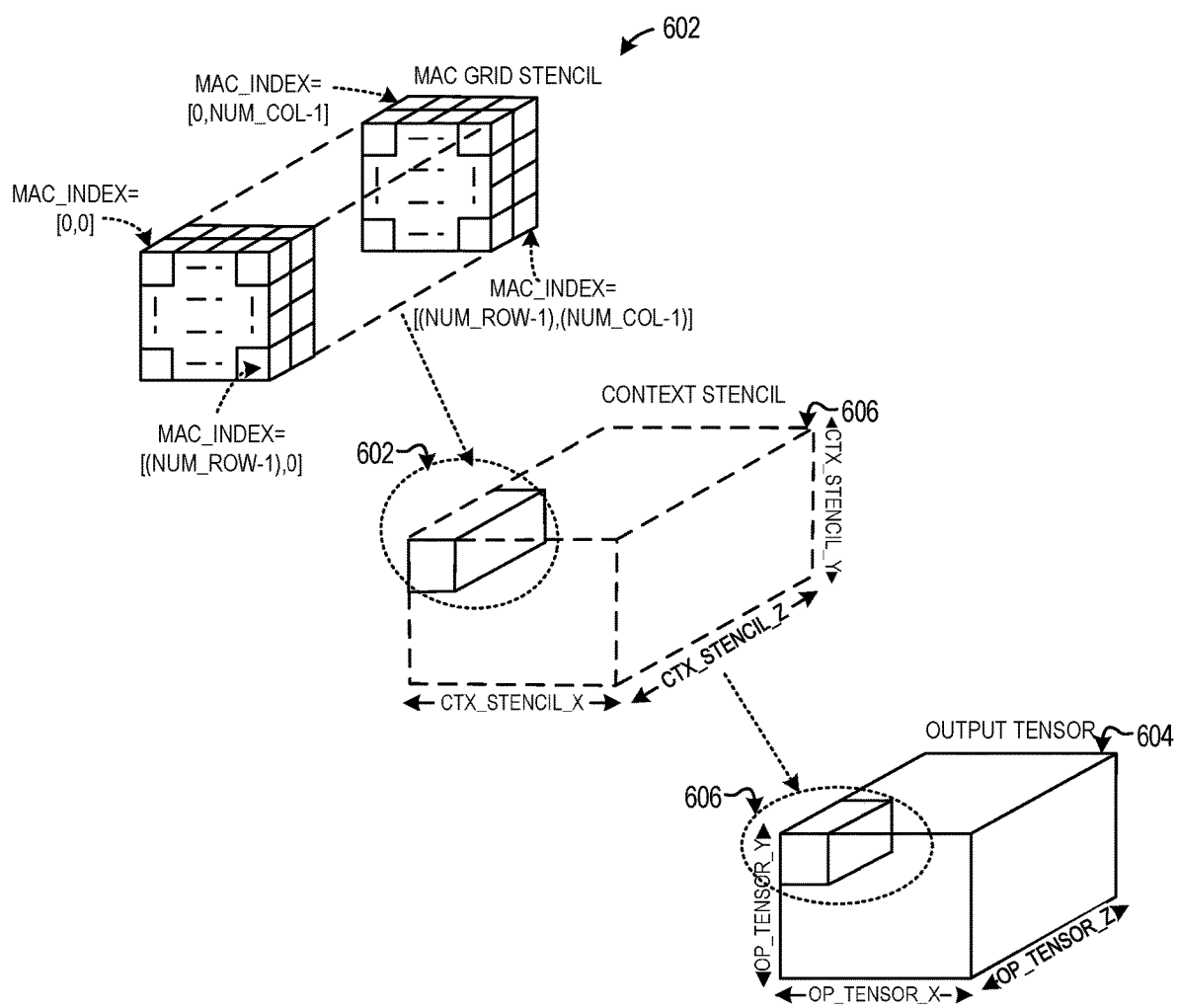
FIG. 6

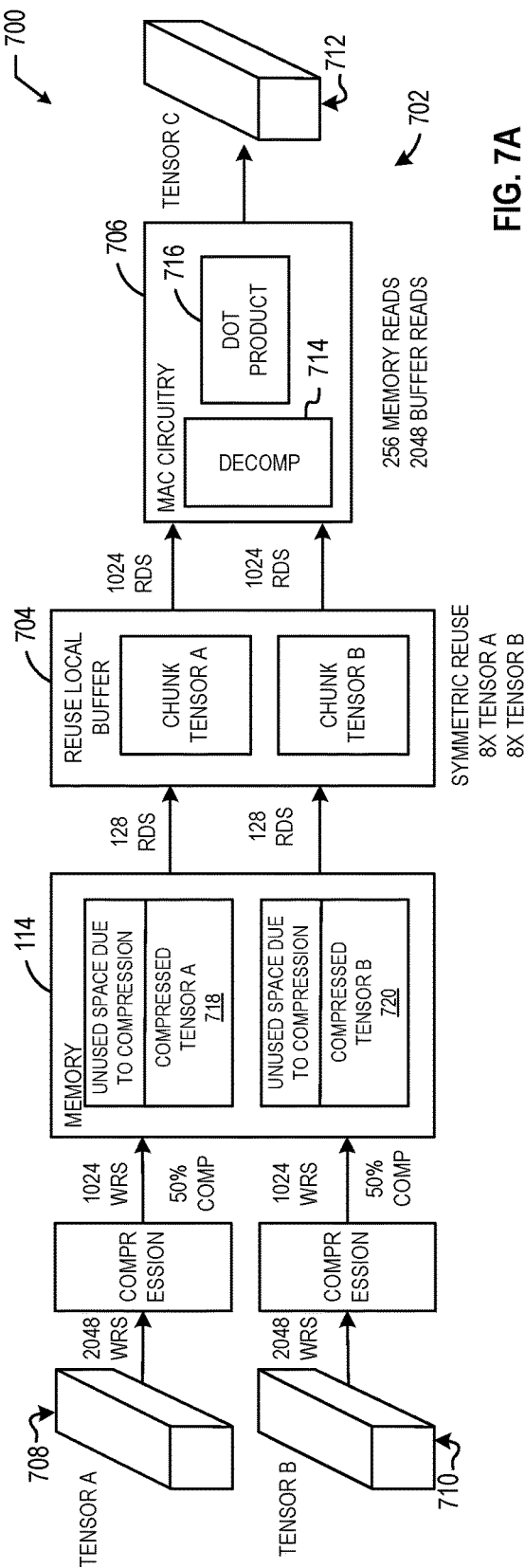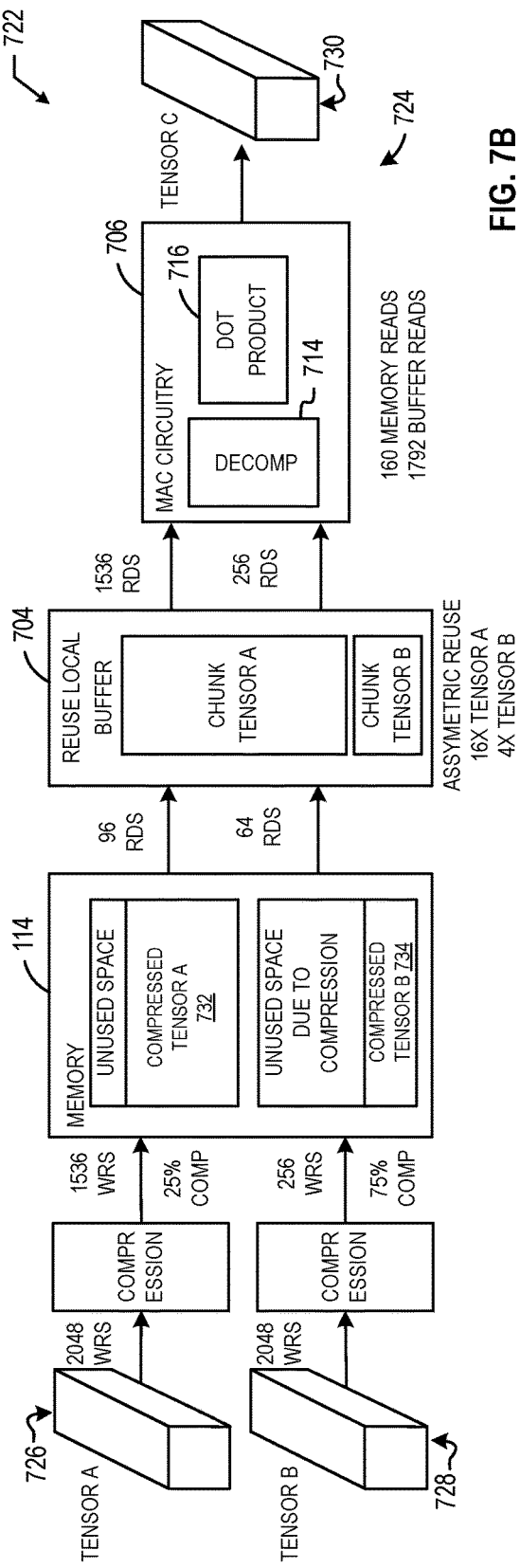

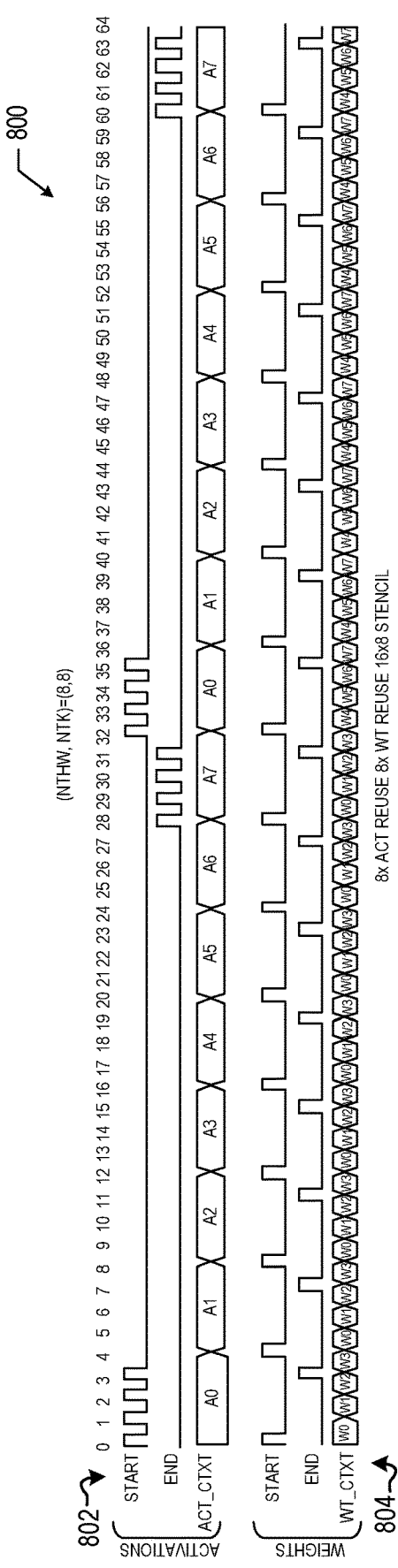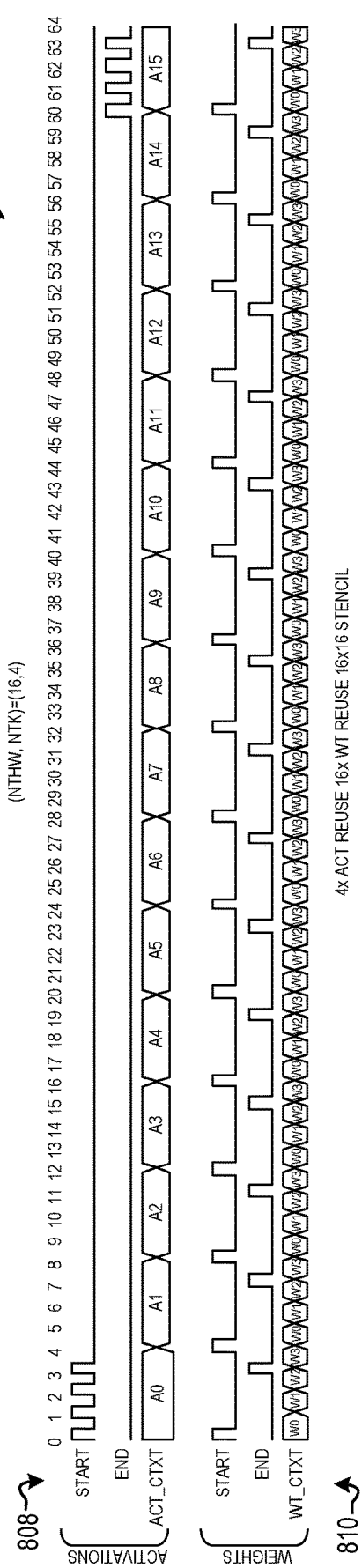

METHODS, APPARATUS, AND ARTICLES OF MANUFACTURE TO INCREASE DATA REUSE FOR MULTIPLY AND ACCUMULATE (MAC) OPERATIONS

FIELD OF THE DISCLOSURE

This disclosure relates generally to accelerator circuitry and, more particularly, to methods, apparatus, and articles of manufacture to increase data reuse for multiply and accumulate (MAC) operations.

BACKGROUND

Demand for image processing capabilities has moved beyond high-power dedicated desktop hardware and has become an expectation for personal and/or otherwise mobile devices. Mobile devices typically include processing capabilities that are limited by size constraints, temperature management constraints, and/or power constraints.

BRIEF DESCRIPTION OF THE DRAWINGS

FIG. 6 is an illustration showing one or more differences between transformation of an example single context MAC stencil to an example output tensor and transformation of an example multi-context MAC stencil to the example output tensor.

FIG. 7A is a block diagram illustrating an example multi-context MAC operation with symmetric compression and symmetric data reuse.

FIG. 7B is a block diagram illustrating an example multi-context MAC operation with asymmetric compression and asymmetric data reuse with reuse bias towards the densest data.

FIG. 8A is a timing diagram illustrating an example interface protocol for a data reuse technique with symmetric activation contexts and weight contexts.

FIG. 8B is a timing diagram illustrating an example interface protocol for a data reuse technique with asymmetric activation contexts and weight contexts with weight context reuse bias.

Figure 1:
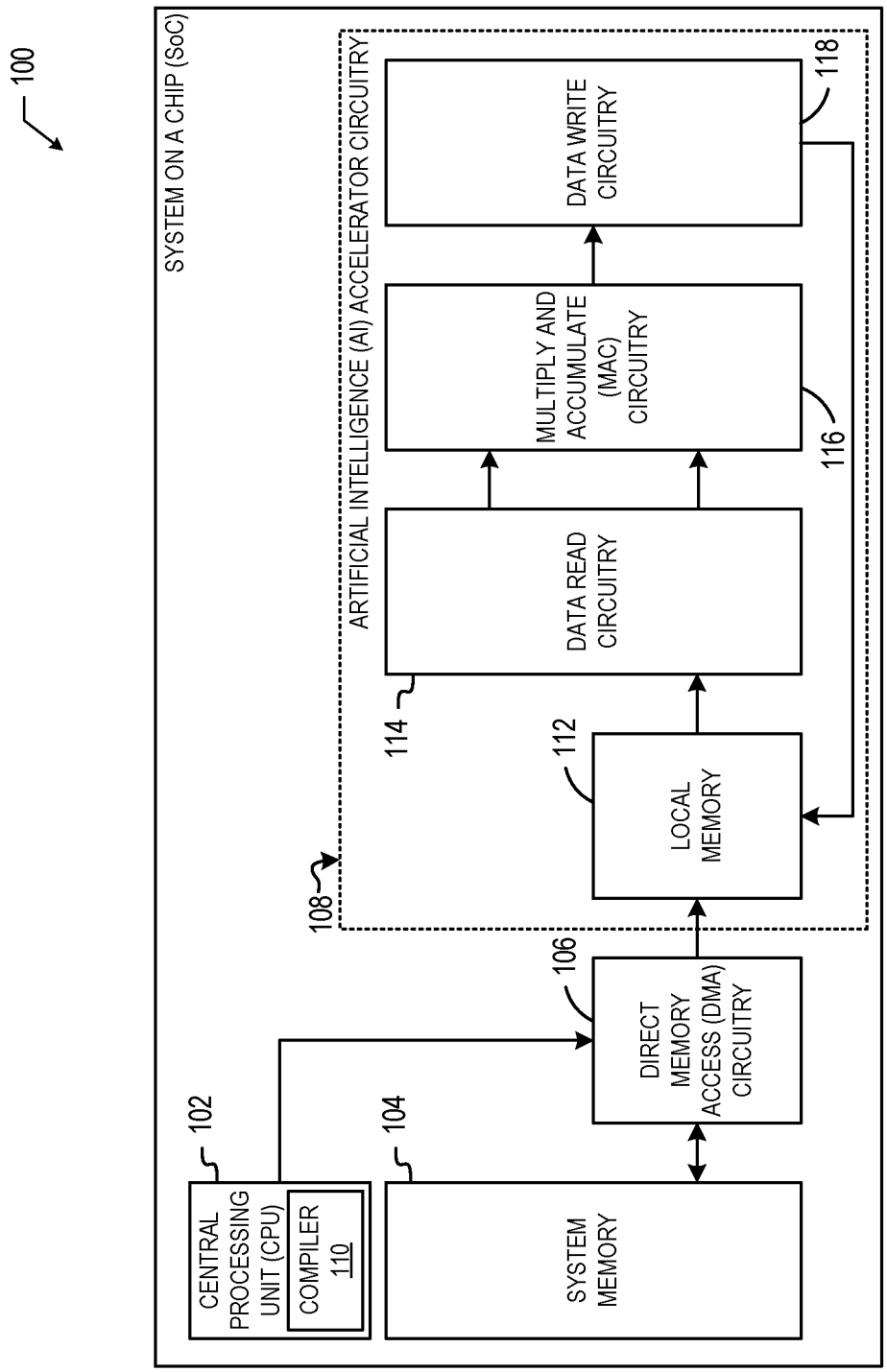
FIG. 1 is a block diagram of an example system on a chip (SoC) including an example central processor unit (CPU), an example system memory, example direct memory access (DMA) circuitry, and example artificial intelligence (AI) accelerator circuitry.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Typical computing systems, including personal computers and/or mobile devices, employ advanced image processing or computer vision algorithms to automate tasks that human vison can perform. Computer vision tasks include acquiring, processing, analyzing, and/or understanding digital images. Such tasks facilitate, in part, extraction of dimensional data from the digital images to produce numerical and/or symbolic information. Computer vision algorithms can use the numerical and/or symbolic information to make decisions and/or otherwise perform operations associated with three-dimensional (3D) pose estimation, event detection, object recognition, video tracking, etc., among others. To support augmented reality (AR), virtual reality (VR), robotics, and/or other applications, it is then accordingly important to perform such tasks quickly (e.g., in real time or near real time) and efficiently.

Advanced image processing or computer vision algorithms sometimes employ a convolutional neural network (CNN). A CNN is a deep, artificial neural network typically used to classify images, cluster the images by similarity (e.g., a photo search), and/or perform object recognition within the images using convolution. As used herein, convolution is defined to be a function derived from two given functions by integration that expresses how a shape of one of the functions is modified by a shape of the other function. Thus, a CNN can be used to identify faces, individuals, street signs, animals, etc., included in an input image by passing an output of one or more filters corresponding to an image feature (e.g., a horizontal line, a two-dimensional (2D) shape, etc.) over the input image to identify matches of the image feature within the input image. CNNs obtain vectors (e.g., broken down from multidimensional arrays) that need to be stored and/or used in computations to perform one or more functions. Thus, a CNN may receive multidimensional arrays (e.g., tensors) including data corresponding to one or more images. To perform a convolution, processor circuitry applies one or more filters and an activation function to an input tensor (e.g., a multidimensional array) to generate an output tensor. As used herein, the term tensor refers to a dimensional set of data. Tensors may be categorized by rank where the rank is independent of the number of dimensions of the tensor. For example, rank zero tensors correspond to scalar values, rank one tensors correspond to vector values, rank two tensors correspond to matrix values, and rank three tensors or greater correspond to tensor values.

Artificial intelligence (AI) accelerator circuitry, including neural compute engines (NCEs) and neural network accelerators (NNAs), is dedicated hardware circuitry for executing operations of AI models (e.g., neural network (NN) models). For example, such operations can be divided into two phases: a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data.

Once trained and deployed, the model may be operated in the inference phase to process data. In the inference phase, data to be analyzed (e.g., live data) is input to the model, and the model executes to create an output. This inference phase can be thought of as the AI model "thinking" to generate the output based on what it learned from the training (e.g., by executing the model to apply the learned patterns and/or associations to the live data). In some examples, input data undergoes preprocessing before being used as an input to the AI model. Moreover, in some examples, the output data may undergo post-processing after it is generated by the AI model to transform the output into a useful result (e.g., a display of data, an instruction to be executed by a machine, etc.).

Most operations performed by AI accelerator circuitry are convolutions. For example, for an input tensor having three dimensions (e.g., $I=X_I, Y_I, Z_I$), the AI accelerator circuitry applies K F by F by $Z_k$ sized filters (where $Z_k=Z_I$) in conjunction with a non-linear activation function to produce an output tensor (e.g., $O=X_O, Y_O, Z_O$) that also has depth K (e.g., $Z_O=K$). To apply the K filters and the non-linear activation function, the AI accelerator circuitry includes multiply and accumulate (MAC) circuitry (e.g., an array of one or more MAC circuits).

Each point in the output tensor, O, requires $F*F*Z_k$ MAC compute cycles. In the case of a 1×1 filter (sometimes referred to as a kernel) with a stride of 1, the input tensor, I, is processed K times to generate the output tensor, and each filter is processed $X_I*Y_I$ times to generate a channel (e.g., a step in $Z_O$) in the output tensor.

Data movement is a key driver of power consumption of AI accelerator circuitry. Additionally, power efficiency is key metric for any AI accelerator circuitry and is usually expressed in tera-operations per second per watt (TOPS/W). The power consumption of AI accelerator circuitry ($P_{Total}$), expressed in equation (1) below, can be considered as the sum of the power consumed by MAC operations and computations ($P_{MAC}$) and the power consumed moving data into, out of, and around the AI accelerator circuitry ($P_{Data\ Movement}$).

$$P_{Total} = P_{MAC} + P_{Data\ Movement} \quad (1)$$

Despite the millions of computations that take place for each convolution, $P_{MAC}$ is not the greatest contributor to the overall power consumption, $P_{Total}$. Rather, the overall power consumption, $P_{Total}$, is most significantly impacted by $P_{Data\ Movement}$. Table 1 below illustrates this relationship.

TABLE 1

| Operation | Energy Consumption (Picojoules) |
| --- | --- |
| 8 b integer Addition | 0.03 |
| 16 b integer Addition | 0.05 |
| 32 b integer Addition | 0.1 |
| 16 b FP Addition | 0.4 |
| 32 b FP Addition | 0.9 |
| 8 b integer Multiplication | 0.2 |
| 32 b integer Multiplication | 3.1 |
| 16 b FP Multiplication | 1.1 |
| 32 b FP Multiplication | 3.7 |
| 32 b SRAM Read (8 KB) | 5 |
| 32 b DRAM Read | 640 |

Table 1 represents the energy consumption for various arithmetic operations and memory accesses in a 45 nanometer (nm) process. The operations include eight-bit (8b) integer addition, 16-bit (16b) integer addition, 32-bit (32b) integer addition, 16b floating point (FP) addition, 32b FP addition, 8b integer multiplication, a 32b integer multiplication, a 16b FP multiplication, a 32b FP multiplication, a 32b static random-access memory (SRAM) read, and a 32b dynamic random-access memory (DRAM) read. 8b integer and 16b FP operations are commonly performed by AI accelerator circuitry. For addition and multiplication, the energy consumption of 8b integer and 16b FP operations is overshadowed by the energy consumption of reading from SRAM and DRAM. Thus, for AI accelerator circuitry to achieve a competitive power efficiency (e.g., measured in TOPS/W), the energy consumption of data movement should be reduced.

Most AI accelerator circuitry includes direct memory access (DMA) circuitry to transfer activations and weights from system memory (e.g., DRAM) to a memory local to the AI accelerator circuitry. The MAC circuitry of the AI accelerator circuitry then extracts activations and weights from the local memory within the AI accelerator circuitry. With this type of architecture, the cost of data movement can be measured as the number of operations performed by the MAC circuitry for each byte read from local memory of the AI accelerator circuitry. As used herein, the number of operations performed per byte read from local memory of an AI accelerator circuitry is referred to as ops/byte. Ops/byte is considered for 8b data as this is typical for inference operations on edge AI accelerator circuitry. Ops/byte is considered for both activations and weights.

With AI accelerator circuitry being more widely adopted, the demand to improve performance of AI accelerator circuitry by increasing the number of MAC circuits within MAC circuitry is likewise increasing. Additionally, as the number of MAC circuits increases, the demand to supply activation and weight data to the AI accelerator circuitry also increases. Thus, as the demand to increase the number of MAC circuits in AI accelerator circuitry increases, so too does the demand for increased data movement and increased memory bandwidth.

Because data movement (e.g., movement of data into the MAC circuitry) is a key driver of power consumption of AI accelerator circuitry, reusing data that has already been moved into the MAC circuitry can improve (e.g., reduce) power consumption of the AI accelerator circuitry. For a convolution of an input tensor, I, having dimensions $X_I$, $Y_I$, $Z_I$ (e.g., I=$X_I$, $Y_I$, $Z_I$), and K F by F by $Z_k$ filters (where $Z_k$=$Z_I$), the maximum possible reuse on the activations is K, and the maximum possible reuse on the weights is $X_I*Y_I$. To achieve maximum reuse, the activations and weights can be read once from local memory of the AI accelerator circuitry and buffered for use by the MAC circuitry. However, due to the large size of K, X and $Y_I$ in practice, internal buffers of the AI accelerator circuitry cannot perform a single read operation including all the data, making maximum reuse impossible. For example, the input tensor may be multidimensional array including vectors having thousands of elements where each such element may include a large number of bits. Such a vector may include 10,000 16b elements which corresponds to 160,000 bits of information.

Thus, AI accelerator circuitry and/or other processor circuitry can benefit from improved data reuse. For example, because data movement into MAC circuitry consumes considerably more power than data movement within the MAC circuitry, reducing the number of memory accesses outside of the MAC circuitry via data reuse lowers the power consumption associated with supplying data to the MAC circuitry. Additionally, as mentioned above, the increasing demand for more MAC circuits in AI accelerator circuitry increases the demand for increased memory bandwidth. Increased memory bandwidth can be a performance bottleneck. However, improving data reuse alleviates such performance bottlenecks.

Existing technology includes some techniques to reuse data within AI accelerator circuitry. For example, some existing AI accelerator circuitry included in SoCs, transfer activation and weight data from the system memory (e.g., DRAM) of the SoC to the local memory of the AI accelerator circuitry via a direct memory access (DMA). The existing AI accelerator circuitry then maintains a first buffer of weight data and a first buffer of activation data. The first weight and activation buffers supply second, smaller (at least in terms of data storage capacity), activation and weight buffers that interface directly with MAC circuitry of the existing AI accelerator circuitry. Such MAC circuitry includes, for example, a 16 by 16 grid of MAC circuits. The second activation buffer broadcasts activation data across rows of the MAC circuitry. Similarly, the second weight buffer broadcasts weight data along columns of the MAC circuitry. Each MAC circuit of the MAC circuitry multiplies a weight by an activation where the amount activation reuse is based on the number of columns of the MAC circuitry and the amount of weight reuse is based on the number of rows of the MAC circuitry. Thus, for existing AI accelerator circuitry, such broadcasting provides 16 ops/byte data reuse. Once the MAC circuitry has consumed the data in the second buffers, the second buffers are repopulated by reading new data from the first buffers and/or by fetching new data from the system memory (e.g., DRAM).

Thus, in existing AI accelerator circuitry, to increase data reuse, the size of the grid of MAC circuits needs to be increased. However, increasing the grid of MAC circuits increases the die area of the AI accelerator circuitry. For example, an N by N grid of MAC circuits achieves a reuse factor of N on both activation and weight data, while a 2N by 2N grid of MAC circuits achieves a reuse factor of 2N. However, increasing the grid of MAC circuits from N by N to 2N by 2N increases the area of the MAC circuitry by four times. Thus, while a 2N by 2N grid of MAC circuits provides two times as much data reuse as an N by N grid of MAC circuits, the increased area of the 2N by 2N grid of MAC circuits is four times larger than the N by N grid of MAC circuits. Therefore, while the 2N by 2N grid of MAC circuits may reduce TOPS/W, the increased cost of the 2N by 2N grid of MAC circuits in TOPS per millimeter squared (TOPS/mm$^2$) is a heavy price to pay. Additionally, silicon area constraints limit the practical size of the MAC circuitry and limit data reuse in existing AI accelerator circuitry which, in turn, defines the memory bandwidth requirement of existing AI accelerator circuitry. For example, because data is fed serially through rows and columns of the MAC circuitry, the slowest MAC circuit in the grid of MAC circuits governs the speed of execution of the MAC circuitry. Thus, as the size of the grid of MAC circuits increases, so too does the execution time of the MAC circuitry.

Additionally, utilization of the MAC circuitry decreases for tensor sizes that are less than the size of the grid of MAC circuits. Thus, a larger grid of MAC circuits will have less utilization for deeper layers in an NN where the X and Y dimensions of the input tensor become smaller. For example, later layers of some NNs include 14 by 14 and 7 by 7 input tensors. Such input tensors would not efficiently map to a 32 by 32 grid of MAC circuits.

Examples disclosed herein enable higher data reuse within MAC circuitry and reduce the external memory bandwidth required by AI accelerator circuitry. Additionally, disclosed methods, apparatus, and articles of manufacture reduce gross data movement throughout an SoC implementing examples disclosed herein. Examples disclosed herein improve the data reuse achieved by broadcasting activations and weights to rows and columns of a grid of MAC circuits. For example, while examples disclosed herein reuse activation and weight data by broadcasting such data to rows and columns of the grid of MAC circuits, disclosed methods, apparatus, and articles of manufacture also include storage within the MAC circuitry that enables each MAC circuit to work on an increased number of points of an output tensor (e.g., up to 64 points of an output tensor) in parallel via a time sliced architecture. Additionally, examples disclosed herein include a data reuse technique that is configurable to increase (e.g., maximize) data reuse and reduce (e.g., minimize) memory bandwidth requirements on a per tensor basis. Disclosed methods, apparatus, and articles of manufacture determine how to configure the data reuse technique to reduce (e.g., minimize) the required memory bandwidth and increase (e.g., maximize) sparse acceleration using the activation and weight data. For example, if sparsity is asymmetric (e.g., if the activation data has more sparsity than the weight data or the weight data has more sparsity than the activation data), then examples disclosed herein utilize the asymmetric sparsity to improve (e.g., optimize) the data reuse configuration. As used herein, sparsity refers to a measure of an amount of zeros in data. Thus, if a 100-bit dataset include 25 bits that are non-zero, the dataset has a sparsity of 25% (e.g., the dataset is 25% sparse). In examples disclosed herein the level of sparsity of weight data is determined during training of an NN and the level of sparsity in activation data is determined by a rectified linear unit (ReLU) function on the input tensor.

FIG. 1 is a block diagram of an example system on a chip (SoC) 100 including an example central processor unit (CPU) 102, an example system memory 104, example direct memory access (DMA) circuitry 106, and example artificial intelligence (AI) accelerator circuitry 108. In the example of FIG. 1, the CPU 102 includes an example compiler 110. Additionally, in the example of FIG. 1, the AI accelerator circuitry 108 includes an example local memory 112, example data read circuitry 114, example multiply and accumulate (MAC) circuitry 116, and example data write circuitry 118.

In the illustrated example of FIG. 1, the CPU 102 is coupled to the DMA circuitry 106. In the example of FIG. 1, the CPU 102 is implemented by one or more general purpose semiconductor-based electrical circuits programmed with instructions to perform specific operations and including one or more semiconductor-based logic devices (e.g., electrical hardware implemented by one or more transistors). For example, the CPU 102 is programmed with instructions to perform the operations of the compiler 110. Additionally, the CPU 102 may obtain data (e.g., input tensors and/or one or more weight kernels) that are to be stored or used in computations to perform one or more AI or image processing related functions. For example, the SoC 100 may include interface circuitry to access one or more input tensors representative of images to be processed and the CPU 102 may obtain the one or more input tensors from the interface circuitry. Thus, the CPU 102 may receive multidimensional arrays (e.g., tensors or rows of vectors) including data corresponding to one or more images. In the example of FIG. 1, the CPU 102 causes storage of data (e.g., one or more tensors and associated weight sets) to be processed by the AI accelerator circuitry 108 in the system memory 104 via the DMA circuitry 106. When the CPU 102 stores data to be processed by the AI accelerator circuitry 108 in the system memory 104, the data is stored in a sparse format including one or more sparsity bitmaps (discussed further herein). Additionally, the CPU 102 offloads one or more AI workloads (e.g., compiled by the compiler 110) to the AI accelerator circuitry 108 for processing.

In the illustrated example of FIG. 1, the system memory 104 is coupled to the DMA circuitry 106. In the example of FIG. 1, the system memory 104 stores input data (e.g., input tensors) for AI workloads and output data (e.g., output tensors) from AI workloads. For example, input data for an AI workload includes one or more activation tensors and one or more weight sets. Weight sets may additionally or alternatively be referred to as weight kernels. In the example of FIG. 1, the system memory 104 is implemented by DRAM. In additional or alternative examples, the system memory 104 is implemented by other volatile memory (e.g., Synchronous Dynamic Random-Access Memory (SDRAM), RAMBUS Dynamic Random-Access Memory (RDRAM), etc.) and/or a non-volatile memory (e.g., flash memory). The example system memory 104 may additionally or alternatively be implemented by one or more double data rate (DDR) memories, such as DDR, DDR2, DDR3, DDR4, mobile DDR (mDDR), etc. In additional or alternative examples, the example system memory 104 may be implemented by one or more mass storage devices such as hard disk drive(s), compact disk drive(s), digital versatile disk drive(s), solid-state disk drive(s), etc., that are external to the SoC 100.

In the illustrated example of FIG. 1, data stored in the system memory 104 is stored as sparse data such as a sparse tensor. As defined herein, sparse data (e.g., a sparse tensor) is data that includes all non-zero elements of dense data in the same order as the dense data but excludes all zero elements of the dense data. As defined herein, dense data (e.g., a dense tensor) is data that includes both zero and non-zero elements. As such, a dense vector [0, 0, 5, 0, 18, 0, 4, 0] corresponds to the sparse vector [5, 18, 4]. In some examples, dense data may be referred to as unpacked data and/or uncompressed data. Additionally, in some examples, sparse data may be referred to as packed data and/or compressed data.

Dense data may be generated and/or determined based on the corresponding sparse data and a sparsity bitmap. As defined herein, a sparsity bitmap is a vector that includes one-bit elements identifying whether respective elements of dense data are zero or non-zero. Thus, a sparsity bitmap may map non-zero values of the dense data to '1' and may map the zero values of the dense data to '0'. For the above-dense vector of [0, 0, 5, 0, 18, 0, 4, 0], the sparsity bitmap may be [0, 0, 1, 0, 1, 0, 1, 0] (e.g., because the third, fifth, and seventh elements of the dense vector are non-zero). The combination of sparse data and a sparsity bitmap represents a corresponding dense data (e.g., the dense data could be generated and/or reconstructed based on the corresponding sparse data and sparsity bitmap).

In the example of FIG. 1, the DMA circuitry 106 is coupled to the CPU 102, the system memory 104, and the local memory 112. In the example of FIG. 1, the DMA circuitry 106 is implemented by one or more special purpose electrical circuits structured to perform specific operation(s) and including one or more semiconductor-based logic devices (e.g., electrical hardware implemented by one or more transistors). In the example of FIG. 1, the DMA circuitry 106 operates as a controller for accessing the system memory 104 (e.g., to read and/or write data thereto). In this manner, the CPU 102 and the AI accelerator circuitry 108 may access the system memory 104 independently of one another. For example, the AI accelerator circuitry 108 communicates with the local memory 112 directly to obtain input activation tensors and/or weight sets. The local memory 112 may obtain the input tensors and/or weight sets from the system memory 104 as needed. Additionally, for example, the AI accelerator circuitry 108 can communicate with the local memory 112 directly to store output tensors. The local memory 112 may transfer storage of such output tensors to the system memory 104 and/or feed such output tensors back to the MAC circuitry 116 as they become available.

In the illustrated example of FIG. 1, the AI accelerator circuitry 108 is coupled to the DMA circuitry 106. In the example of FIG. 1, the AI accelerator circuitry 108 is implemented by one or more special purpose electrical circuits structured to perform specific operation(s) and including one or more semiconductor-based logic devices (e.g., electrical hardware implemented by one or more transistors). In the example of FIG. 1, the AI accelerator circuitry 108 improves performance of processing AI workloads by implementing sparsity aware data reuse for power optimization. For example, the AI accelerator circuitry 108 implements protocols to increase the reuse of activation and weight data depending on the sparsity of the activation and weight data and the symmetry and/or asymmetry of the data reuse.

In the illustrated example of FIG. 1, the CPU 102 includes the example compiler 110. In the example of FIG. 1, the compiler 110 is implemented by one or more instructions (e.g., software) to perform specific operations on one or more general purpose semiconductor-based electrical circuits and including one or more semiconductor-based logic devices (e.g., electrical hardware implemented by one or more transistors). In the example of FIG. 1, the compiler 110 compiles outputs from AI and/or other NN program(s) such as TensorFlow, Keras, PyTorch, among others, for implementation on the AI accelerator circuitry 108. The example compiler 110 processes the variables of the AI program(s) to determine how to configure the AI accelerator circuitry 108 to reduce (e.g., minimize) accesses to the system memory 104 and/or the local memory 112. For example, the compiler 110 processes dimensions of one or more tensors to be processed, dimensions of one or more filters to be processed, and/or one or more levels of sparsity of the one or more tensors. As mentioned above the level of sparsity of weight data is determined during training of an NN and the level of sparsity in activation data is determined by a rectified linear unit (ReLU) function on the input tensor. As such, the compiler 110 considers these levels of sparsity when determining how to configure the AI accelerator circuitry 108 to reduce accesses to the system memory 104 and/or the local memory 112. In some examples, a programming manual associated with the AI accelerator circuitry 108 describes how to configure the AI accelerator circuitry 108 to increase (e.g., maximize) data reuse.

Storing compressed data (e.g., a sparse tensor and corresponding sparsity bitmap) in the system memory 104 and the local memory 112 instead of uncompressed data saves memory and processing resources (e.g., provided there are sufficient zeros in the uncompressed data). For example, if each element of the above-dense vector (e.g., [0, 0, 5, 0, 18, 0, 4, 0]) was 8 bits of information, the amount of memory (e.g., the system memory 104 and/or the local memory 112) required to store the dense vector is 64 bits (e.g., 8 elements×8 bits). However, the amount of memory (e.g., the system memory 104 and/or the local memory 112) required to store the corresponding sparse vector (e.g., [5, 18, 4]) and the sparsity bitmap (e.g., 0, 0, 1, 0, 1, 0, 1, 0]) is 32 bits (e.g., (the 3 elements of the sparse vector×8 bits)+(8 elements of the sparsity bitmap×1 bit)). Accordingly, storing the sparse vector and sparsity bitmap in the local memory 112 instead of a corresponding dense vector reduces the amount of the local memory 112 needed to store such vectors. Additionally, utilizing compressed data (e.g., sparse data and sparsity bitmaps) improves bandwidth requirements because the amount of data being delivered into the AI accelerator circuitry 108 is decreased to increase the delivery speed to the AI accelerator circuitry 108.

In the illustrated example of FIG. 1, the AI accelerator circuitry 108 includes the local memory 112. The example local memory 112 is coupled to the DMA circuitry 106, the data read circuitry 114, and the data write circuitry 118. In the example of FIG. 1, the local memory 112 stores compressed input data (e.g., compressed input tensors, compressed activation tensors, compressed weight sets, etc.) for AI workloads as well as output data (e.g., output tensors). The local memory 112 is comparatively much smaller than the system memory 104. For example, the local memory 112 is typically between one and two megabytes (MB). In the example of FIG. 1, the local memory 112 is implemented by SRAM. In additional or alternative examples, the local memory 112 is implemented by other volatile memory (e.g., DRAM, SDRAM, RDRAM, etc.) and/or a non-volatile memory (e.g., flash memory). The example local memory 112 may additionally or alternatively be implemented by one or more DDR memories, such as DDR, DDR2, DDR3, DDR4, mDDR, etc. In the illustrated example of FIG. 1, data stored in the local memory 112 is stored as compressed data including sparse data and a corresponding sparsity bitmap.

In the illustrated example of FIG. 1, the AI accelerator circuitry 108 includes the data read circuitry 114. The example data read circuitry 114 is coupled to the local memory 112 and the MAC circuitry 116. In the example of FIG. 1, the data read circuitry 114 is implemented by one or more special purpose electrical circuits structured to perform specific operation(s) and including one or more semiconductor-based logic devices (e.g., electrical hardware implemented by one or more transistors). In the example of FIG. 1, the data read circuitry 114 reads the compressed data stored in the local memory 112. For example, the data read circuitry 114 reads a compressed weight set stored in the local memory 112 and reads a compressed activation tensor stored in the local memory 112. The example data read circuitry 114 maintains one or more buffers to store compressed data read from the local memory 112. For example, the data read circuitry 114 includes a buffer for the compressed weight set and a buffer for the compressed activation tensor. The one or more buffers maintained by the data read circuitry 114 are smaller (at least in terms of data storage capacity) than the local memory 112. In some examples, the amount of data stored in the one or more buffers varies based on the configuration of the AI accelerator circuitry 108. For example, in some examples a buffer maintained by the data read circuitry 114 may store one element (e.g., 16 bytes) of a tensor or weight set while in other examples, the buffer may store 64 elements (1.024 kilobytes (KB)) of a tensor or weight set where each element is 16 bytes.

In the illustrated example of FIG. 1, the AI accelerator circuitry 108 includes the MAC circuitry 116. The example MAC circuitry 116 is coupled to the data read circuitry 114 and the data write circuitry 118. In the example of FIG. 1, the MAC circuitry 116 is implemented by one or more special purpose electrical circuits structured to perform specific operation(s) and including one or more semiconductor-based logic devices (e.g., electrical hardware implemented by one or more transistors). For example, the MAC circuitry 116 includes one or more buffers, decompression circuitry, one or more MAC circuits, one or more accumulation storages, and control logic circuitry.

In the illustrated example of FIG. 1, the MAC circuitry 116 reads in one or more subsets of the compressed data stored in the one or more buffers of the data read circuitry 114. For example, when the data read circuitry 114 stores a compressed weight set in a first weight buffer, the MAC circuitry 116 reads a subset of the compressed weight set. Additionally, when the data read circuitry 114 stores a compressed activation tensor in a first activation buffer, the MAC circuitry 116 reads a subset of the compressed activation tensor.

In the illustrated example of FIG. 1, the MAC circuitry 116 includes decompression circuitry to decompress the one or more subsets of compressed data before the one or more subsets of compressed data are processed by MAC circuits of the MAC circuitry 116. For example, the MAC circuitry 116 maintains one or more buffers to store one or more subsets of compressed data read from the one or more buffers of the data read circuitry 114. For example, the MAC circuitry 116 includes a second weight buffer for the subset of the weight set and a second activation buffer for the subset of the activation tensor. The one or more buffers maintained by the MAC circuitry 116 are smaller (at least in terms of data storage capacity) than the one or more buffers of the data read circuitry 114. For example, a buffer maintained by the MAC circuitry 116 is 4 elements where each element is 16 bytes (e.g., 64 bytes).

In the illustrated example of FIG. 1, the one or more buffers maintained by the MAC circuitry 116 supply one or more contexts to the grid of MAC circuits of the MAC circuitry 116. For example, the second weight buffer maintained by the MAC circuitry 116 supplies respective sets of four or more weight contexts to each column of the MAC circuitry 116. Additionally, for example, the second activation buffer maintained by the MAC circuitry 116 supplies respective sets of four or more activation contexts to each row of the MAC circuitry 116. As used herein, a context refers to an element in a tensor and/or an element in a weight set. In examples disclosed herein, contexts are 16-byte values. The MAC circuits perform dot products on the received activation and weight contexts provided by the respective activation and weight buffers according to a protocol described further herein. After operating on the one or more tensors maintained by the buffers of the data read circuitry 114, the MAC circuitry 116 outputs the result to the data write circuitry 118.

In the illustrated example of FIG. 1, the AI accelerator circuitry 108 includes the data write circuitry 118. The example data write circuitry 118 is coupled to the MAC circuitry 116 and the local memory 112. In the example of FIG. 1, the data write circuitry 118 is implemented by one or more special purpose electrical circuits structured to perform specific operation(s) and including one or more semiconductor-based logic devices (e.g., electrical hardware implemented by one or more transistors). In the example of FIG. 1, the data write circuitry 118 writes the result generated by the MAC circuitry 116 to the local memory 112. For example, the data write circuitry 118 writes a compressed output tensor and corresponding sparsity bitmap to the local memory 112.

Figure 2A:
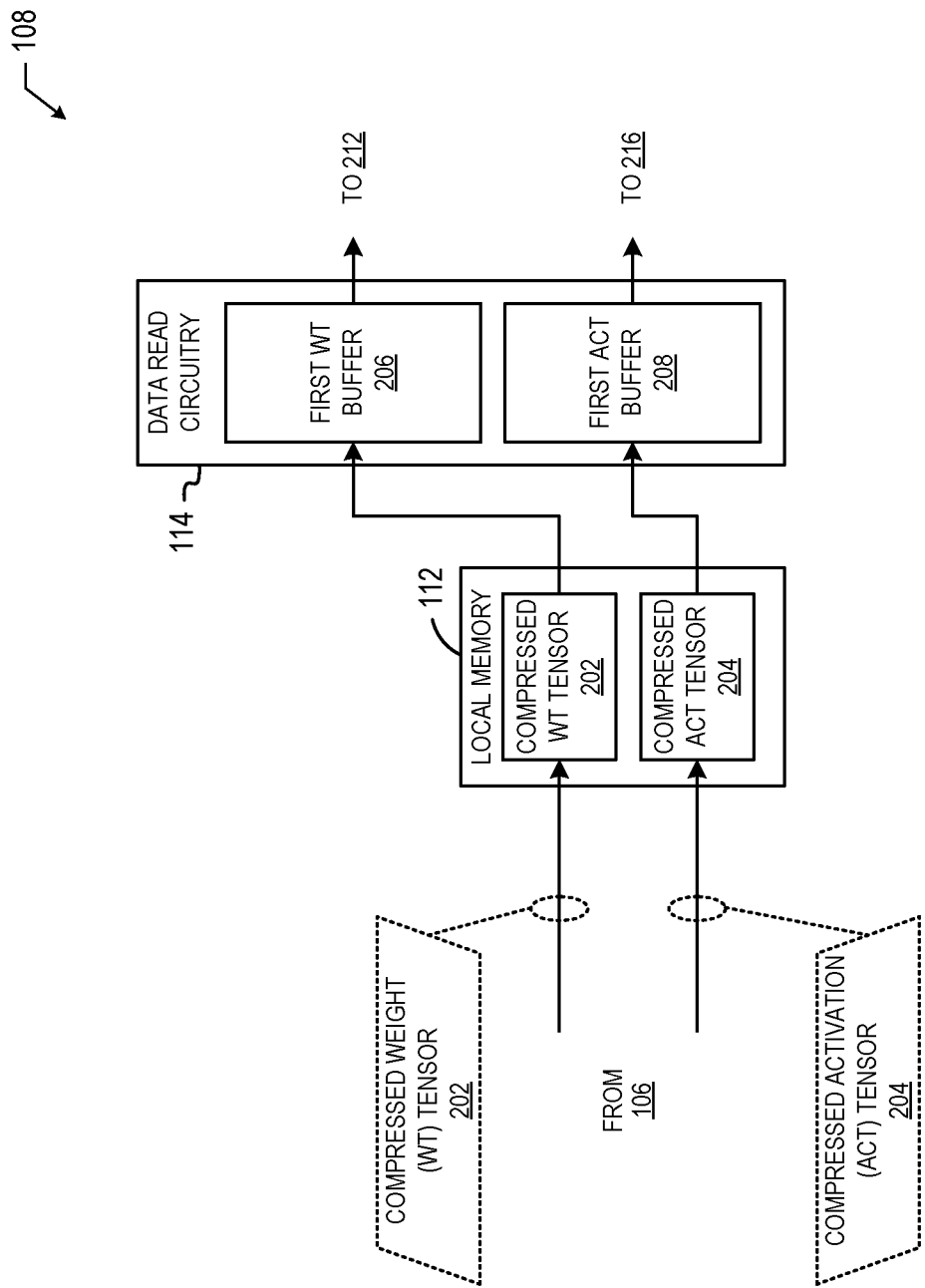
FIGS. 2A and 2B are a block diagram illustrating an example implementation of the AI accelerator circuitry of FIG. 1.
Figure 2B:
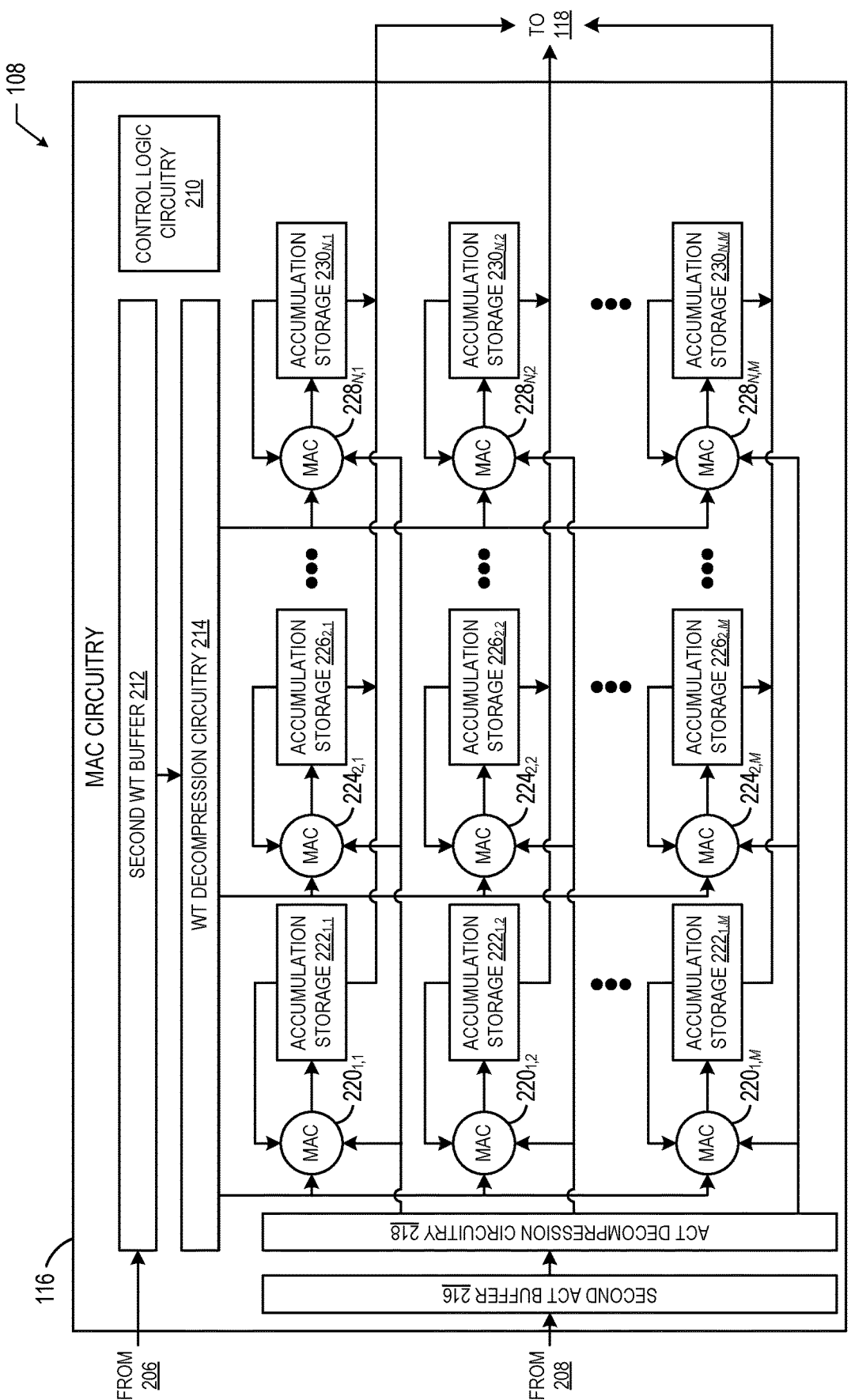

FIGS. 2A and 2B are a block diagram illustrating an example implementation of the AI accelerator circuitry 108 of FIG. 1. FIGS. 2A and 2B are referred to collectively as FIG. 2. The AI accelerator circuitry 108 of FIG. 2 includes the example local memory 112, the example data read circuitry 114, and the example MAC circuitry 116. In the example of FIG. 2, the local memory 112 receives an example compressed weight tensor 202 and an example compressed activation tensor 204. The example compressed weight tensor 202 includes a sparse weight set and a weight sparsity bitmap. The example compressed activation tensor 204 includes a sparse activation tensor and an activation sparsity bitmap.

In the example of FIG. 2, the example data read circuitry 114 includes an example first weight buffer 206 and an example first activation buffer 208. In the example of FIG. 2, each of the first weight buffer 206 and the first activation buffer 208 is implemented by SRAM In additional or alternative examples, each of the first weight buffer 206 and the first activation buffer 208 is implemented by other volatile memory (e.g., DRAM, SDRAM, RDRAM, etc.) and/or a non-volatile memory (e.g., flash memory). In the example of FIG. 2, each of the first weight buffer 206 and the first activation buffer 208 is sized to be large enough to decouple the second weight buffer 212 and the second activation buffer 216 from long access times to the local memory 112. In the example of FIG. 2, each of the first weight buffer 206 and the first activation buffer 208 is implemented by a 22 context buffer where each context is a 16-byte value (e.g., 352 bytes). In the example of FIG. 2, the example MAC circuitry 116 includes example control logic circuitry 210, an example second weight buffer 212, an example weight decompression circuitry 214, an example second activation buffer 216, example activation decompression circuitry 218, an example array of MAC circuits $220_{1,1}$-$220_{1,M}$, $224_{2,1}$-$224_{2,M}$, and $228_{N,1}$-$228_{N,M}$, and an example array of accumulation storages $222_{1,1}$-$222_{1,M}$, $226_{2,1}$-$226_{2,M}$, and $230_{N,1}$-$230_{N,M}$.

Figure 3:
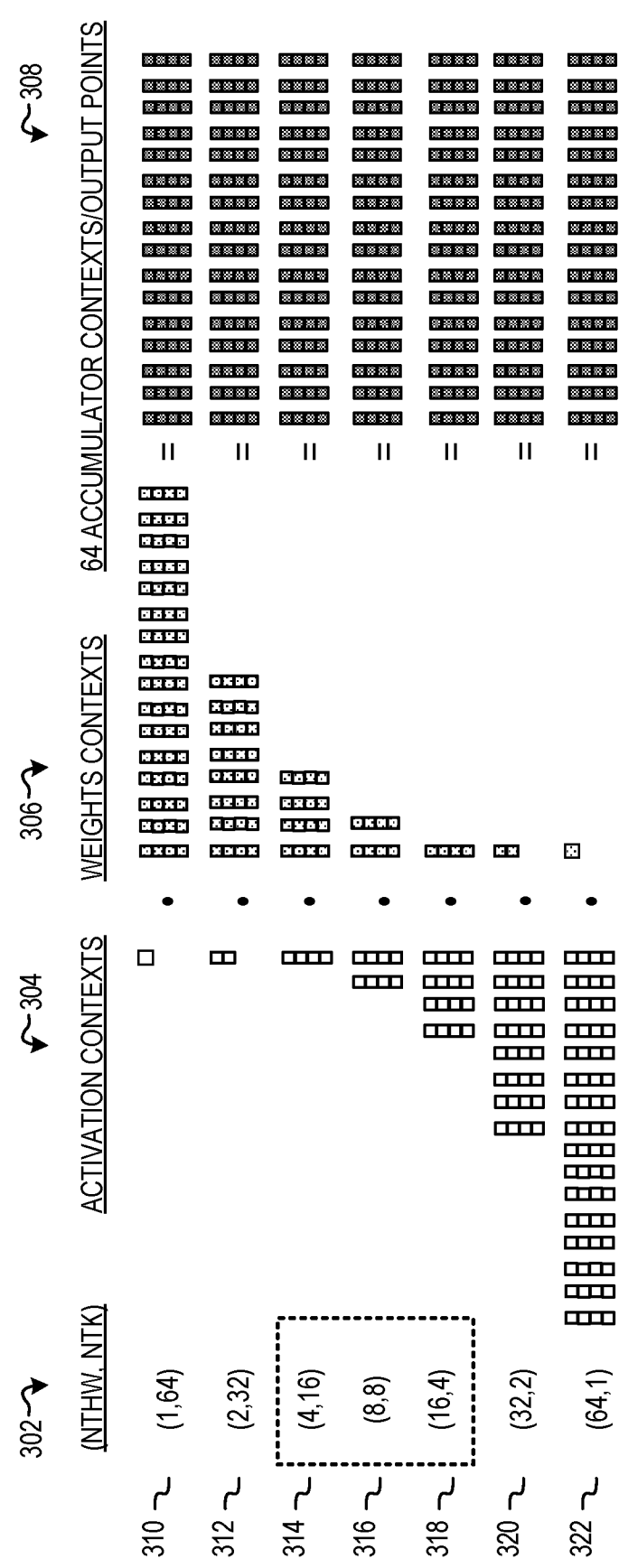
FIG. 3 is a table illustrating example activation context and example weight context reuse techniques.

In the illustrated example of FIG. 2, the first weight buffer 206 and the first activation buffer 208 are fixed in size but the data read circuitry 114 populates the example first weight buffer 206 and the example first activation buffer 208 based on the activation context and weight context reuse techniques (NTHW, NTK) selected by the compiler 110. In the example of FIG. 2, the compiler 110 selects the activation context and weight context reuse technique based on the sparsity of the weight set from which the compressed weight set 202 was generated, the sparsity of the activation tensor from which the compressed activation tensor 204 was generated, and the size of the accumulation storages $222_{1,1}$-$222_{1,M}$, $226_{2,1}$-$226_{2,M}$, and $230_{N,1}$-$230_{N,M}$. For example, the product of the number of activation contexts stored first activation buffer 208 (e.g., NTHW) and the number of weight contexts stored in the first weight buffer 206 (e.g., NTK) should equal the size of the accumulation storages $222_{1,1}$-$222_{1,M}$, $226_{2,1}$-$226_{2,M}$, and $230_{N,1}$-$230_{N,M}$ (in terms of contexts). In the example of FIG. 2, each of the accumulation storages $222_{N,1}$-$222_{1,M}$, $226_{2,1}$-$226_{2,M}$, and $230_{N,1}$-$230_{N,M}$ store 64 contexts where each context is 4-bytes. As such, the data read circuitry 114 may populate the first weight buffer 206 and the first activation buffer 208 as shown in FIG. 3. However, the data read circuitry 114 may populate the first weight buffer 206 and the first activation buffer 208 differently for different sizes of the accumulation storages $222_{1,1}$-$222_{1,M}$, $226_{2,1}$-$226_{2,M}$, and $230_{N,1}$-$230_{N,M}$.

FIG. 3 is a table 300 illustrating example activation context and example weight context reuse techniques. For example, the table 300 includes a first column 302 showing different activation context and weight context reuse techniques (NTHW, NTK). The table 300 includes a second column 304 illustrating activation contexts and a third column 306 illustrating weight contexts. The table 300 includes a fourth column 308 illustrating output contexts that result from the dot product of the activation contexts of the second column 304 and the weights of the third column 306.

In the illustrated example of FIG. 3, the different combinations of activation contexts and weight contexts illustrated in the first column 302 represent the different activation context and weight context reuse techniques that can be used with a 64 context accumulation storage, such as the accumulation storages $222_{1,1}$-$222_{1,M}$, $226_{2,1}$-$226_{2,M}$, and $230_{N,1}$-$230_{N,M}$ of FIG. 2. The MAC circuitry 116 convolves the activation contexts (NTHW) with the weight contexts (NTK) to produce 64 output contexts (e.g., one output context per accumulation storage entry). To maximize the usage of the available storage in the accumulation storages $222_{1,1}$-$222_{1,M}$, $226_{2,1}$-$226_{2,M}$, and $230_{N,1}$-$230_{N,M}$, the product of the activation contexts and weight contexts (e.g., NTHW*NTK) should equal 64.

In the illustrated example of FIG. 3, the table 300 includes seven rows representative of different combinations of the number of activation contexts per convolution (NTHW) and the number of weight contexts per convolution (NTK). For example, the table 300 includes a first row 310 representative of a data reuse technique with one activation context and 64 weight contexts (NTHW, NTK=1, 64); a second row 312 representative of a data reuse technique with two activation contexts and 32 weight contexts (NTHW, NTK=2, 32); a third row 314 representative of a data reuse technique with four activation contexts and 16 weight contexts (NTHW, NTK=4, 16); a fourth row 316 representative of a data reuse technique with eight activation contexts and eight weight contexts (NTHW, NTK=8, 8); a fifth row 318 representative of a data reuse technique with 16 activation contexts and four weight contexts (NTHW, NTK=16, 4); a sixth row 320 representative of a data reuse technique with 32 activation contexts and two weight contexts (NTHW, NTK=32, 2); and a seventh row 322 representative of a data reuse technique with 64 activation contexts and one weight context (NTHW, NTK=64, 1).

In the illustrated example of FIG. 3, the activation context and weight context combinations illustrated in the first column 302 range from the most asymmetric case where the MAC circuitry 116 convolves a single activation context with 64 different weight contexts (or vice versa) (e.g., the first row 310 and the seventh row 322, respectively) to the most symmetric case where the MAC circuitry 116 convolves eight activation contexts with eight weight contexts (e.g., the fourth row 316). For each activation context, weight context combination illustrated in the table 300, the MAC circuitry 116 generates 64 output contexts as illustrated in the fourth column 308. For the sake of simplicity, FIG. 3 assumes that the tensor dimensions and the number of kernels are sufficient to utilize available contexts.

Returning to FIG. 2, the first weight buffer 206 is coupled to the local memory 112, the control logic circuitry 210 (not shown), and the second weight buffer 212. In the example of FIG. 2, depending on the activation context and weight context reuse technique selected by the compiler 110, the data read circuitry 114 populates the first weight buffer 206 with four contexts, eight contexts, or 16 contexts where each context corresponds to a 16-byte value. However, in additional or alternative examples, the data read circuitry 114 may populate the first weight buffer 206 with any number of contexts. For example, in some examples, the data read circuitry 114 populates the first weight buffer 206 with contexts ranging from one to 64. In the example of FIG. 2, the first weight buffer 206 reads the compressed weight set 202 stored in the local memory 112.

In the illustrated example of FIG. 2, for asymmetric data reuse techniques, the first weight buffer 206, and/or, more generally, the data read circuitry 114 transmits a start weight context signal and an end weight context signal with each compressed weight set and weight sparsity bitmap. For symmetric data reuse techniques, the first weight buffer 206, and/or, more generally, the data read circuitry 114 transmits a start weight context signal and an end weight context signal with each subset of weight contexts and the sparsity bitmap. In the example of FIG. 2, the first weight buffer 206 asserts the start weight context signal with the first byte of the weight set (or subset) for per processing round. The example first weight buffer 206 asserts the end weight context signal with the last byte of the weight set (or subset) per processing round.

In the example of FIG. 2, the first activation buffer 208 is coupled to the local memory 112, the control logic circuitry 210 (not shown), and the second activation buffer 216. In the example of FIG. 2, depending on the activation context and weight context reuse technique selected by the compiler 110, the data read circuitry 114 populates the first activation buffer 208 with four contexts, eight contexts, or 16 contexts where each context corresponds to a 16-byte value. However, in additional or alternative examples, the data read circuitry 114 may populate the first activation buffer 208 with any number of contexts. For example, in some examples, the data read circuitry 114 populates the first activation buffer 208 with contexts ranging from one to 64. In the example of FIG. 2, the first activation buffer 208 reads the compressed activation tensor 204 stored in the local memory 112.

In the illustrated example of FIG. 2, the first activation buffer 208, and/or, more generally, the data read circuitry 114 transmits a start activation context signal, an end activation context signal, and a last activation context signal with each compressed activation tensor and activation sparsity bitmap. In the example of FIG. 2, the first activation buffer 208 asserts the start activation context signal with the first byte of the activation tensor for per processing round. The example first activation buffer 208 asserts the end activation context signal with the last byte of the activation tensor per processing round. In the example of FIG. 2, the first activation buffer 208 asserts the last activation context signal with the last byte of the activation tensor for a convolution.

the data read circuitry 114 populates the example first weight buffer 206 and the example first activation buffer 208 based on the activation context and weight context reuse techniques The different activation context and weight reuse techniques according to which the data read circuitry 114 populates the first weight buffer 206 and the first activation buffer 208 are illustrated by the third row 314, the fourth row 316, and the fifth row 318 of the table 300. As such, the data read circuitry 114 supports one form of symmetric reuse (e.g., NTHW, NTK=8,8) and two forms of asymmetric reuse (e.g., NTHW, NTK=4,16; NTHW, NTK=16,4). As used herein, symmetric reuse refers to a reuse technique where the number of activation contexts and the number of weight contexts are equal. As used herein, asymmetric reuse refers to a reuse technique where the number of activation contexts and weight contexts are not equal.

In the illustrated example of FIG. 2, the MAC circuitry 116 includes the control logic circuitry 210. In the example of FIG. 2, the control logic circuitry 210 is implemented by one or more special purpose electrical circuits structured to perform specific operation(s) and including one or more semiconductor-based logic devices (e.g., electrical hardware implemented by one or more transistors). The example control logic circuitry 210 is coupled to the first weight buffer 206 (not shown), the second weight buffer 212 (not shown), the first activation buffer 208 (not shown), and the second activation buffer 216 (not shown). In the example of FIG. 2, the control logic circuitry 210 controls the data movement into and out of the second weight buffer 212 and the second activation buffer 216.

In the illustrated example of FIG. 2, the MAC circuitry 116 dominates the clock frequency of the AI accelerator circuitry 108. As such, the control logic circuitry 210 implements a lightweight protocol to manage the second weight buffer 212 and the second activation buffer 216. As such, the control logic circuitry 210 feeds data to the MAC circuits of FIG. 2 until an end context signal is received from activation contexts and/or weight contexts. In response to receiving an end context signal, the control logic circuitry 210 determines whether both the end activation context signal and the end weight context signal are asserted, and which data reuse technique is active. The data reuse technique is set by the compiler 110 as described above.

In the illustrated example of FIG. 2, based on whether both the end activation context signal and the end weight context signal are asserted, and which data reuse technique is active, the control logic circuitry 210 will dump (also referred to as flush) or reuse the contexts. If the control logic circuitry 210 dumps the data because the data has fully reused according to the active data reuse technique, then the control logic circuitry 210 fetches a new context while the MAC circuits of FIG. 2 continue to process other contexts. Dumping and refilling the second weight buffer 212 and the second activation buffer 216 while processing other contexts with the MAC circuits of FIG. 2 advantageously allows for higher utilization of the MAC circuitry 116. The control logic circuitry 210 is discussed further herein.

In the illustrated example of FIG. 2, the MAC circuitry 116 includes the second weight buffer 212 and the second activation buffer 216. In the example of FIG. 2, each of the second weight buffer 212 and the second activation buffer 216 is implemented by SRAM. In additional or alternative examples, each of the second weight buffer 212 and the second activation buffer 216 is implemented by other volatile memory (e.g., DRAM, SDRAM, RDRAM, etc.) and/or a non-volatile memory (e.g., flash memory). In the example of FIG. 2, the second weight buffer 212 is coupled to the first weight buffer 206, the control logic circuitry 210 (not shown), and the weight decompression circuitry 214. The example second weight buffer 212 implements a four context buffer where each context corresponds to a 16-byte value. However, in additional or alternative examples, the second weight buffer 212 may be any size. In the example of FIG. 2, the second weight buffer 212 reads a first subset of the compressed weight set 202.

In the illustrated example of FIG. 2, the second weight buffer 212 facilitates transmission of dense weight data to the first column of MAC circuits $220_{1,1}$-$220_{1,M}$, the second column of MAC circuits $224_{1,1}$-$224_{1,M}$, and the Nth column of MAC circuits $228_{N,1}$-$228_{N,M}$. For example, based on signals from the control logic circuitry 210, the second weight buffer 212 transmits a first weight contexts, via the weight decompression circuitry 214, to the first column of MAC circuits $220_{1,1}$-$220_{1,M}$, second weight contexts, via the weight decompression circuitry 214, to the second column of MAC circuits $224_{1,1}$-$224_{1,M}$, and Nth weight contexts to the Nth column of MAC circuits $228_{N,1}$-$228_{N,M}$. In such an example, (a) the first weight contexts are different than the second weight contexts and the Nth weight contexts and (b) the second weight contexts are different than the Nth weight contexts.

In the illustrated example of FIG. 2, the MAC circuitry 116 includes the weight decompression circuitry 214. The example weight decompression circuitry 214 is coupled to the second weight buffer 212, the first column of MAC circuits $220_{1,1}$-$220_{1,M}$, the second column of MAC circuits $224_{1,1}$-$224_{1,M}$, and the Nth column of MAC circuits $228_{N,1}$-$228_{N,M}$. In the example of FIG. 2, the weight decompression circuitry 214 is implemented by one or more special purpose electrical circuits structured to perform specific operation(s) and including one or more semiconductor-based logic devices (e.g., electrical hardware implemented by one or more transistors). In the example of FIG. 2, the example weight decompression circuitry 214 processes compressed weight data (e.g., sparse weight sets and a weight sparsity bitmap) and converts the sparse weight data into dense weight data. After decompressing the compressed weight data, the weight decompression circuitry 214 transmits the dense weight data to the first column of MAC circuits $220_{1,1}$-$220_{1,M}$, the second column of MAC circuits $224_{1,1}$-$224_{1,M}$, and the Nth column of MAC circuits $228_{N,1}$-$228_{N,M}$.

In the illustrated example of FIG. 2, the second activation buffer 216 is coupled to the first activation buffer 208, the control logic circuitry 210 (not shown), and the activation decompression circuitry 218. The example second activation buffer 216 implements a four context buffer where each context corresponds to a 16-byte value. However, in additional or alternative examples, the second activation buffer 216 may be any size. In the example of FIG. 2, the second activation buffer 216 reads a first subset of the compressed activation tensor 204.

In the illustrated example of FIG. 2, the second activation buffer 216 facilitates transmission of dense activation data to the first row of MAC circuits $220_{1,1}$, $224_{2,1}$, and $228_{N,1}$, the second row of MAC circuits $220_{1,2}$, $224_{2,2}$, and $228_{N,2}$, and the Mth row of MAC circuits $220_{1,M}$, $224_{2,M}$, and $228_{N,M}$. For example, based on signals from the control logic circuitry 210, the second activation buffer 216 transmits first activation contexts, via the activation decompression circuitry 218, to the first row of MAC circuits $220_{1,1}$, $224_{2,1}$, and $228_{N,1}$, second activation contexts, via the activation decompression circuitry 218, to the second row of MAC circuits $220_{1,2}$, $224_{2,2}$, and $228_{N,2}$, and Mth activation contexts, via the activation decompression circuitry 218, to the Mth row of MAC circuits $220_{1,M}$, $224_{2,M}$, and $228_{N,M}$. In such an example, (a) the first activation contexts are different than the second activation contexts and the Mth activation contexts and (b) the second activation contexts are different than the Mth activation contexts.

In the illustrated example of FIG. 2, the MAC circuitry 116 includes the activation decompression circuitry 218. The example activation decompression circuitry 218 is coupled to the second activation buffer 216, the first row of MAC circuits $220_{1,1}$, $224_{2,1}$, and $228_{N,1}$, the second row of MAC circuits $220_{1,2}$, $224_{2,2}$, and $228_{N,2}$, and the Mth row of MAC circuits $220_{1,M}$, $224_{2,M}$, and $228_{N,M}$. In the example of FIG. 2, the activation decompression circuitry 218 is implemented by one or more special purpose electrical circuits structured to perform specific operation(s) and including one or more semiconductor-based logic devices (e.g., electrical hardware implemented by one or more transistors). In the example of FIG. 2, the example activation decompression circuitry 218 processes compressed activation data (e.g., sparse activation tensors and an activation sparsity bitmap) and converts the sparse activation data into dense activation data. After decompressing the compressed activation data, the activation decompression circuitry 218 transmits the dense activation data to the first row of MAC circuits $220_{1,1}$, $224_{2,1}$, and $228_{N,1}$, the second row of MAC circuits $220_{1,2}$, $224_{2,2}$, and $228_{N,2}$, and the Mth row of MAC circuits $220_{1,M}$, $224_{2,M}$, and $228_{N,M}$.

In the illustrated example of FIG. 2, the first weight buffer 206, the first activation buffer 208, the second weight buffer 212, and the second activation buffer 216 implement a hierarchical local buffering structure that reduces (e.g., minimizes) the area of the AI accelerator circuitry 108. In the hierarchical local buffering structure, the first weight buffer 206 and the first activation buffer 208 decouple the operations to refill the second weight buffer 212 and the second activation buffer 216 from the long duration associated with accessing the local memory 112. In the hierarchical local buffering structure, the second weight buffer 212 and the second activation buffer 216 support sparse processing of activation contexts and weight contexts. Additionally, first weight buffer 206, the first activation buffer 208, the second weight buffer 212, and the second activation buffer 216 facilitate data reuse and reduce accesses to the system memory 104. In the example of FIG. 2, the second weight buffer 212 is illustrated as a single structure and the second activation buffer 216 is illustrated as a single structure for purposes of clarity. However, in physical implementations of the MAC circuitry 116, the second weight buffer 212 and the second activation buffer 216 are replicated throughout the MAC circuitry 116 to improve physical layout and timing of the AI accelerator circuitry 108.

In the illustrated example of FIG. 2, each of the MAC circuits $220_{1,1}$, $220_{1,2}$, $220_{1,M}$, $224_{2,1}$, $224_{2,2}$, $224_{2,M}$, $228_{N,1}$, $228_{N,2}$, and $228_{N,M}$ (collectively, the MAC circuits of FIG. 2) is implemented by one or more special purpose electrical circuits structured to perform specific operation(s) and including one or more semiconductor-based logic devices (e.g., electrical hardware implemented by one or more transistors). In the example of FIG. 2, each of the MAC circuits of FIG. 2 receives four or more weight contexts from the second weight buffer 212 (via the weight decompression circuitry 214) and four or more activation contexts from the second activation buffer 216 (via the activation decompression circuitry 218). As described above, MAC circuits in respective columns of the MAC circuitry 116 receive the same weight contexts but different activation contexts and MAC circuits in respective rows of the MAC circuitry 116 receive the same activation contexts but different weight contexts. As such, each of the MAC circuits of FIG. 2 receives a different combined activation and weight sparsity. In the example of FIG. 2, each of the example MAC circuits of FIG. 2 processes the four or more weight contexts and four or more activation contexts as described herein. For example, the first MAC circuit $220_{1,1}$ performs a multiplication operation and an addition operation to generate an output context for storage in the first accumulation storage $222_{1,1}$.

In the illustrated example of FIG. 2, to enable the processing of different activation contexts and weight contexts described above, each of the MAC circuits of FIG. 2 is configured to read (or skip) weight contexts from the second weight buffer 212 and activation contexts from the second activation buffer 216 independently of other ones of the MAC circuits of FIG. 2. As such, each of the second weight buffer 212 and the second activation buffer 216 includes independent read ports for each of the MAC circuits of FIG. 2 thereby allowing each of the MAC circuits of FIG. 2 to process activation contexts and weight contexts based on the unique combined sparsity of one or more of the MAC circuits of FIG. 2. As each of the MAC circuits of FIG. 2 processes the four or more weight contexts and four or more activation contexts, each of the example MAC circuits of FIG. 2 updates 64 output contexts in respective ones of the accumulation storages $222_{1,1}$-$222_{1,M}$, $226_{2,1}$-$226_{2,M}$, and $230_{N,1}$-$230_{N,M}$.

In the illustrated example of FIG. 2, each of the accumulation storages $222_{1,1}$, $222_{1,2}$, $222_{1,M}$, $226_{2,1}$, $226_{2,2}$, $226_{2,M}$, $230_{N,1}$, $230_{N,2}$, and $230_{N,M}$ (collectively, the accumulation storages of FIG. 2) is implemented by SRAM. In additional or alternative examples, each of the accumulation storages of FIG. 2 is implemented by other volatile memory (e.g., DRAM, SDRAM, RDRAM, etc.) and/or a non-volatile memory (e.g., flash memory). In the example of FIG. 2, each of the accumulation storages of FIG. 2 is coupled to one or more of the MAC circuits of FIG. 2 and the data write circuitry 118. Each of the accumulation storages of FIG. 2 implements a 64 context buffer where each context corresponds to a 4-byte value (e.g., a 32-bit value). However, in additional or alternative examples, each of the accumulation storages of FIG. 2 may be any size. In the example of FIG. 2, each of the accumulation storages of FIG. 2 stores output contexts generated by one or more of the MAC circuits of FIG. 2. After the accumulation storages of FIG. 2 are full, each of the accumulation storages of FIG. 2 outputs 64 output contexts to the data write circuitry 118.

In the illustrated example of FIG. 2, N and M equal 16. As such, the MAC circuits of FIG. 2 implement a 16 by 16 grid of MAC circuits where each of the MAC circuits of FIG. 2 is coupled to a respective one of the accumulation storages of FIG. 2. As each of the accumulation storages of FIG. 2 implements a 64 context buffer, the MAC circuitry 116 generates 16,384 (e.g., 64×16×16) output contexts per convolution. Existing technologies generate 256 output contexts per convolution. As such, examples disclosed herein increase the number of output contexts generated by MAC circuitry per convolution by a factor of 64.

Figure 4:
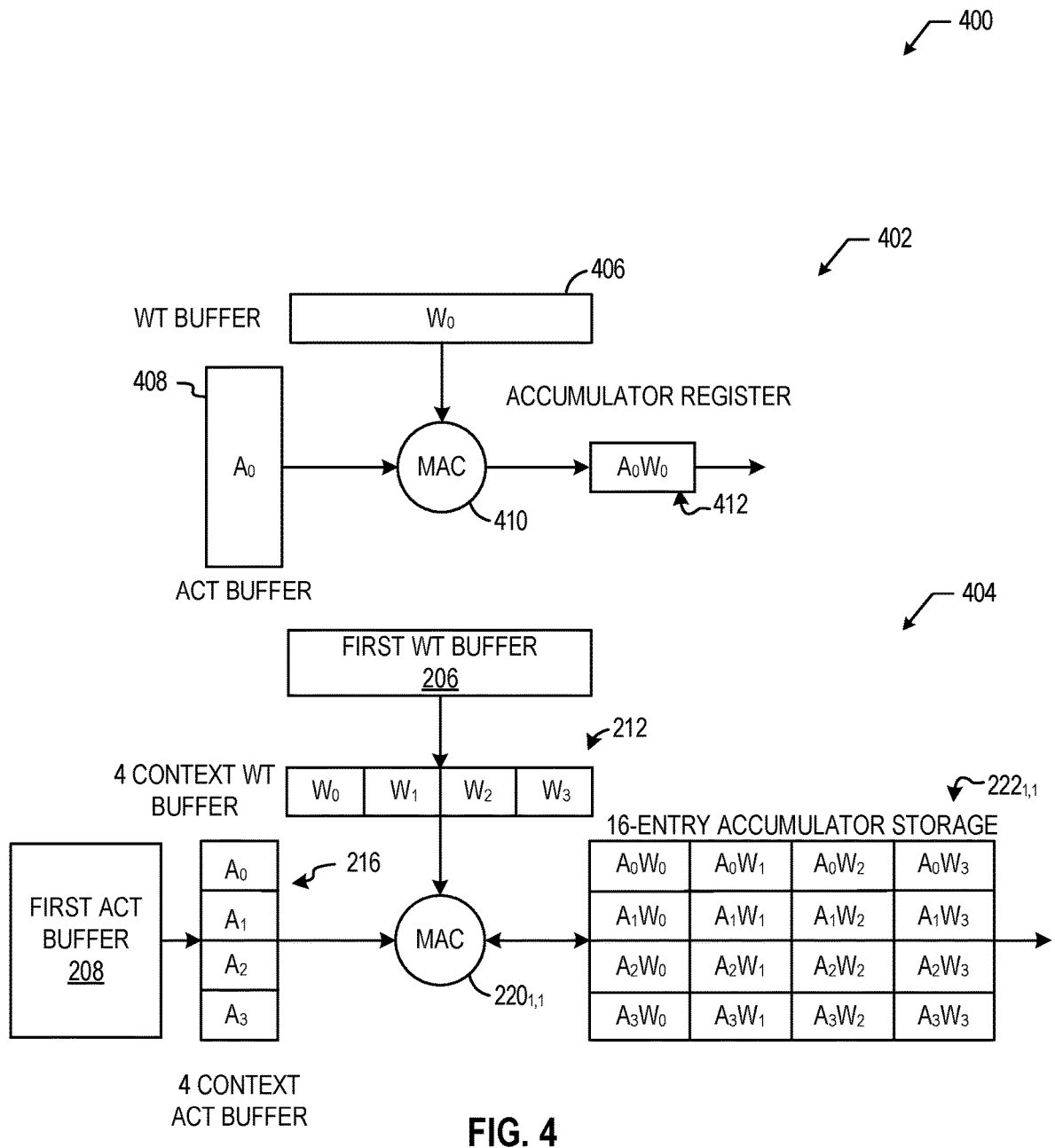
FIG. 4 is a dataflow diagram illustrating one or more differences between an example single context multiply and accumulate (MAC) operation and an example multi-context MAC operation as disclosed herein.

FIG. 4 is a dataflow diagram 400 illustrating one or more differences between an example single context MAC operation 402 and an example multi-context MAC operation 404 as disclosed herein. The example single context MAC operation 402 utilizes an example weight buffer 406, an example activation buffer 408, an example MAC circuit 410, and an example accumulation register 412. In the example single context MAC operation 402, the weight buffer 406 stores data for a single weight filter ($W_0$) and the activation buffer 408 stores data for single spatial activation ($A_0$). The MAC circuit 410 performs a dot product operation on the single weight filter ($W_0$) and the single spatial activation ($A_0$) to produce the convolution result for a single output context ($A_0W_0$). The MAC circuit 410 latches the single output context in the accumulation register 412. The accumulation register 412 then passes the single output context forward to (optionally) be post-processed before being written to memory.

In the example of FIG. 4, the example multi-context MAC operation 404 utilizes the first weight buffer 206, the first activation buffer 208, the second weight buffer 212, the second activation buffer 216, the first MAC circuit $220_{1,1}$, and the first accumulation storage $222_{1,1}$. The weight decompression circuitry 214 and the activation decompression circuitry 218 are omitted from FIG. 4 for purposes of clarity. In contrast to the single context MAC operation 402, in the example multi-context MAC operation 404, the second weight buffer 212 has been modified as disclosed herein to store four weight contexts, ($W_0$, $W_1$, $W_2$, $W_3$) at a time, from four different kernels and the second activation buffer 216 has been modified as disclosed herein to store four activation contexts, ($A_0$, $A_1$, $A_2$, $A_3$), where each context is from a separate spatial point. Thus, in the multi-context MAC operation 404, the control logic circuitry 210 loads the second weight buffer 212 with data from the first weight buffer 206 for four weight contexts, ($W_0$, $W_2$, $W_3$). Additionally, in the multi-context MAC operation 404, the control logic circuitry 210 loads the second activation buffer 216 with data from the first activation buffer 208 for four activation contexts, ($A_0$, $A_1$, $A_2$, $A_3$).

In the illustrated example of FIG. 4, the control logic circuitry 210 sequences the four activation contexts, ($A_0$, $A_1$, $A_2$, $A_3$), stored in the second activation buffer 216 and the four weight contexts, ($W_0$, $W_1$, $W_2$, $W_3$), stored in the second weight buffer 212 through the first MAC circuit $220_{1,1}$ to produce the dot product results for 16 output contexts ($A_0W_0$-$A_3W_3$). In the example multi-context MAC operation 404, each byte of activation data is used four times and each byte of weight data is used four times which delivers an increase in data reuse by four times compared to the data reuse that is already provided by broadcasting weight data to the columns of the MAC circuitry 116 and by broadcasting activation data to the rows of the MAC circuitry 116. By implementing multi-context MAC operations such as the multi-context MAC operation 404, the AI accelerator circuitry 108 increases data reuse to 64 ops/byte as compared to the 16 ops/byte achieved by existing technologies.

As described above, the data read circuitry 114, based on the data reuse technique selected by the compiler 110, populates each of the first weight buffer 206 and the first activation buffer 208 with four contexts, eight contexts, or 16 contexts where the product of the number of contexts stored in the first weight buffer 206 and the first activation buffer 208 should equal the size of the first accumulation storage $222_{1,1}$. Accordingly, the first activation buffer 208 and the first weight buffer 206 store eight activation contexts and eight weight contexts, respectively; four activation contexts and 16 weight contexts, respectively; or 16 activation contexts and four weight contexts, respectively, depending on the selected data reuse technique. In other examples, different combinations of activation and weight contexts are possible for differently sized accumulation storages. Table 2 illustrates the operations performed per byte read from local memory for existing technology, eight by eight symmetric activation and weight reuse, 16 by four asymmetric activation and weight reuse (weight biased), and four by 16 asymmetric activation and weight reuse (activation biased).

TABLE 2

| Configuration | Data Reuse Technique | Activation MAC Ops/Byte | Weight MAC Ops/Byte |
|---|---|---|---|
| Existing Technology | N/A | 16 | 16 |
| Symmetric Reuse | (8, 8) | 128 | 128 |
| Asymmetric Reuse (Weight Bias) | (16, 4) | 64 | 256 |
| Asymmetric Reuse (Activation Bias) | (4, 16) | 256 | 64 |

As shown in Table 2, existing technology provides 16 ops/byte reuse for activation contexts and weight contexts via spatial reuse. As used herein, spatial reuse refers to use of the same data by more than one MAC circuit. For example, existing technology implements a 16 by 16 grid of MAC circuits and distributes activation contexts across the rows of the grid and weight contexts along the columns of the grid to achieve this spatial reuse. Additionally, the addition of multiple contexts and the ability for each MAC circuit to generate more than a single output context enables temporal reuse in addition to spatial reuse. As used herein, temporal reuse refers to use of the same data more than once by the same MAC circuit. This temporal reuse increases the number of ops/byte from 16 in existing technology to up to 256 ops/byte as disclosed herein.

Returning to FIG. 2, to support multi-context MAC operations disclosed herein, the control logic circuitry 210 sequences activation contexts through the first weight buffer 206, the first activation buffer 208, the second weight buffer 212, and the second activation buffer 216 through the MAC circuits of FIG. 2 to produce the dot product results for the accumulation storages of FIG. 2. FIGS. 5A, 5B, 5C, and 5D are dataflow diagrams illustrating example multi-context MAC operations for a weight biased asymmetric data reuse technique. For example, FIGS. 5A, 5B, 5C, and 5D illustrate example multi-context MAC operations for a data reuse technique with 16 activation contexts and four weight contexts (NTHW, NTK=16, 4).

Figures 5A, 5B, 5C, 5D:
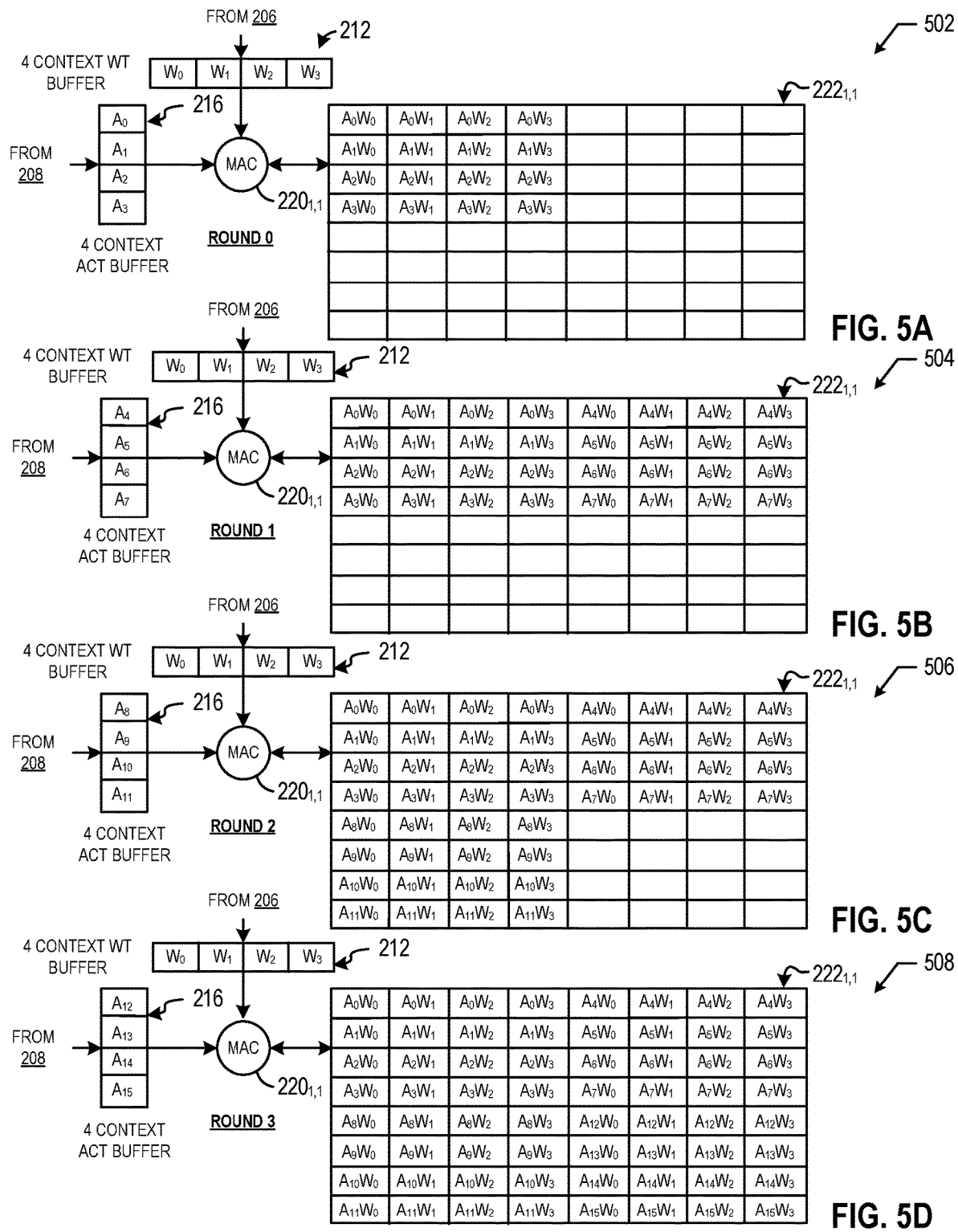
FIGS. 5A, 5B, 5C, and 5D are dataflow diagrams illustrating example multi-context MAC operations for a weight biased asymmetric data reuse technique.

FIG. 5A illustrates an example dataflow diagram 502 that utilizes the first weight buffer 206, the first activation buffer 208, the second weight buffer 212, the second activation buffer 216, the first MAC circuit $220_{1,1}$, and the first accumulation storage $222_{1,1}$. The weight decompression circuitry 214 and the activation decompression circuitry 218 are omitted from FIGS. 5A, 5B, 5C, and 5D for purposes of clarity. As described in connection with FIG. 4, in FIGS. 5A, 5B, 5C, and 5D, the second weight buffer 212 has been modified as disclosed herein to store four weight contexts at a time, from four different kernels and the second activation buffer 216 has been modified as disclosed herein to store four activation contexts where each context is from a separate spatial point.

In the illustrated example of FIG. 5A, at the beginning of the convolution including a set of 16 activation contexts and a set of four weight contexts, the first accumulation storage $222_{1,1}$ is empty or stores data that may be overwritten. Subsequently, the control logic circuitry 210 loads the second weight buffer 212 with data from the first weight buffer 206 for the set of four weight contexts, ($W_0$, $W_1$, $W_2$, $W_3$). Additionally, the control logic circuitry 210 loads the second activation buffer 216 with data from the first activation buffer 208 for a first subset of four activation contexts, ($A_0$, $A_1$, $A_2$, $A_3$). Subsequently, the control logic circuitry 210 flushes the set of four weight contexts, ($W_0$, $W_1$, $W_2$, $W_3$) from the first weight buffer 206, and flushes the first subset of four activation contexts, ($A_0$, $A_1$, $A_2$, $A_3$) from the first activation buffer 208.

In the illustrated example of FIG. 5A, the dataflow diagram 502 corresponds to an initial round of processing (e.g., Round 0). During Round 0, the control logic circuitry 210 sequences the set of four weight contexts ($W_0$, $W_1$, $W_2$, $W_3$) stored in the second weight buffer 212 and the first activation context ($A_0$) stored in the second activation buffer 216 so that the first MAC circuit $220_{1,1}$ performs calculations to determine the output context $A_0W_0$, followed by the output context $A_0W_1$, followed by the output context $A_0W_2$, and then the output context $A_0W_3$. After the first activation context ($A_0$) has been consumed (e.g., the first MAC circuit $220_{1,1}$ has multiplied $A_0$ by each of $W_0$, $W_1$, $W_2$, and $W_3$ and stored the respective output contexts in the first accumulation storage $222_{1,1}$), the control logic circuitry 210 removes the first activation context ($A_0$) from the second activation buffer 216. In some examples, the control logic circuitry 210 maintains the first activation context ($A_0$) in the second activation buffer 216 to be overwritten by additional activation contexts.

In the illustrated example of FIG. 5A, the control logic circuitry 210 subsequently sequences the set of four weight contexts ($W_0$, $W_1$, $W_2$, $W_3$) stored in the second weight buffer 212 and the second activation context ($A_1$) stored in the second activation buffer 216 so that the first MAC circuit $220_{1,1}$ performs calculations to determine the output contexts $A_1W_0$, $A_1W_1$, $A_1W_2$, and $A_1W_3$. While the first MAC circuit $220_{1,1}$ processes the second activation context ($A_1$) and the set of four weight contexts ($W_0$, $W_1$, $W_2$, and $W_3$) and after the control logic circuitry 210 has evicted the first activation context ($A_0$) from the second activation buffer 216, the control logic circuitry 210 fetches the fifth activation context ($A_4$) from the first activation buffer 208. As described above, in some examples, the control logic circuitry 210 overwrites the first activation context ($A_0$) with the fifth activation context ($A_4$). After Round 0, the first MAC circuit $220_{1,1}$ has consumed the first subset of four activation contexts ($A_0$, $A_1$, $A_2$, $A_3$) and generated 16 partial accumulations for storage in the first accumulation storage $222_{1,1}$.

As such, the control logic circuitry 210 achieves four times reuse of the first subset of four activation contexts and four times reuse of the set of four weight contexts. For example, the first MAC circuit $220_{1,1}$ multiplies each element the set of four weight contexts by a corresponding element of the first subset of four activation contexts and the products are accumulated in the first accumulation storage $222_{1,1}$. In such an example, if the first subset of four activation contexts are [5, 412, 27, 192] and the first set of four weight contexts are [2, 58, 52, 4], the first MAC circuit $220_{1,1}$ performs 16 multiplication operations (e.g., (5×2), (5×58), (5×52), (5×4), (412×2), (412×58), (412×52), (412×4), (27×2), (27×58), (27×52), (27×4), (192×2), (192×58), (192×52), (192×4)) and stores the products in the first accumulation storage $222_{1,1}$.

FIG. 5B illustrates an example dataflow diagram 504. In the example of FIG. 5B, the dataflow diagram 504 corresponds to a second round of processing (e.g., Round 1). At the beginning of Round 1, the first quadrant of the first accumulation storage $222_{1,1}$ stores the first 16 output contexts $A_0W_0$-$A_3W_3$ of the output tensor. Additionally, at the beginning of Round 1, the control logic circuitry 210 has replaced the first subset of four activation contexts ($A_0$, $A_1$, $A_2$, $A_3$) in the second activation buffer 216 with the second subset of four activation contexts ($A_4$, $A_5$, $A_6$, $A_7$) but has held the set of four weight contexts ($W_0$, $W_1$, $W_2$, $W_3$) in the second weight buffer 212 to be recycled. After loading the second subset of four activation contexts ($A_4$, $A_5$, $A_6$, $A_7$) into the second activation buffer 216, the control logic circuitry 210 flushes the second subset of four activation contexts from the first activation buffer 208. During Round 1, the control logic circuitry 210 sequences the set of four weight contexts ($W_0$, $W_1$, $W_2$, $W_3$) stored in the second weight buffer 212 and the fifth activation context ($A_4$) stored in the second activation buffer 216 so that the first MAC circuit $220_{1,1}$ performs calculations to determine the output contexts $A_4W_0$, $A_4W_1$, $A_4W_2$, and $A_4W_3$.

In the example of FIG. 5B, after the fifth activation context ($A_4$) has been consumed, the control logic circuitry 210 removes the fifth activation context ($A_4$) from the second activation buffer 216. In the example of FIG. 5B, the control logic circuitry 210 subsequently sequences the set of four weight contexts ($W_0$, $W_1$, $W_2$, $W_3$) stored in the second weight buffer 212 and the sixth activation context ($A_5$) stored in the second activation buffer 216 so that the first MAC circuit $220_{1,1}$ performs calculations to determine the output contexts $A_5W_0$, $A_5W_1$, $A_5W_2$, and $A_5W_3$. While the first MAC circuit $220_{1,1}$ processes the sixth activation context ($A_5$) and the set of four weight contexts ($W_0$, $W_1$, $W_2$, and $W_3$) and after the control logic circuitry 210 has evicted the fifth activation context ($A_4$) from the second activation buffer 216, the control logic circuitry 210 fetches the ninth activation context (As) from the first activation buffer 208. After Round 1, the first MAC circuit $220_{1,1}$ has consumed the second subset of four activation contexts ($A_4$, $A_5$, $A_6$, $A_7$) and generated 32 total partial accumulations for storage in the first accumulation storage $222_{1,1}$. As such, the control logic circuitry 210 achieves four times reuse of the second subset of four activation contexts and eight times reuse of the set of four weight contexts.

FIG. 5C illustrates an example dataflow diagram 506. In the example of FIG. 5C, the dataflow diagram 506 corresponds to a third round of processing (e.g., Round 2). At the beginning of Round 2, the first and second quadrants of the first accumulation storage $222_{1,1}$ store the first 32 output contexts $A_0W_0$-$A_7W_3$ of the output tensor. Additionally, at the beginning of Round 2, the control logic circuitry 210 has replaced the second subset of four activation contexts ($A_4$, $A_5$, $A_6$, $A_7$) in the second activation buffer 216 with a third subset of four activation contexts ($A_8$, $A_9$, $A_{10}$, $A_{11}$) but has held the set of four weight contexts ($W_0$, $W_1$, $W_2$, $W_3$) in the second weight buffer 212 to be recycled. After loading the third subset of four activation contexts ($A_8$, $A_9$, $A_{10}$, $A_{11}$) into the second activation buffer 216, the control logic circuitry 210 flushes the third subset of four activation contexts from the first activation buffer 208. During Round 2, the control logic circuitry 210 sequences the set of four weight contexts ($W_0$, $W_1$, $W_2$, $W_3$) stored in the second weight buffer 212 and the ninth activation context (As) stored in the second activation buffer 216 so that the first MAC circuit $220_{1,1}$ performs calculations to determine the output contexts $A_8W_0$, $A_8W_1$, $A_8W_2$, and $A_8W_3$.

In the example of FIG. 5C, after the ninth activation context (As) has been consumed, the control logic circuitry 210 removes the ninth activation context (As) from the second activation buffer 216. In the example of FIG. 5C, the control logic circuitry 210 subsequently sequences the set of four weight contexts ($W_0$, $W_1$, $W_2$, $W_3$) stored in the second weight buffer 212 and the tenth activation context ($A_9$) stored in the second activation buffer 216 so that the first MAC circuit $220_{1,1}$ performs calculations to determine the output contexts $A_9W_0$, $A_9W_1$, $A_9W_2$, and $A_9W_3$. While the first MAC circuit $220_{1,1}$ processes the tenth activation context ($A_9$) and the set of four weight contexts ($W_0$, $W_1$, $W_2$, and $W_3$) and after the control logic circuitry 210 has evicted the ninth activation context (As) from the second activation buffer 216, the control logic circuitry 210 fetches the thirteenth activation context ($A_{11}$) from the first activation buffer 208. After Round 2, the first MAC circuit $220_{1,1}$ has consumed the third subset of four activation contexts ($A_8$, $A_9$, $A_{10}$, $A_{11}$) and generated 48 total partial accumulations for storage in the first accumulation storage $222_{1,1}$. As such, the control logic circuitry 210 achieves four times reuse of the third subset of four activation contexts and 12 times reuse of the set of four weight contexts.

FIG. 5D illustrates an example dataflow diagram 508. In the example of FIG. 5D, the dataflow diagram 508 corresponds to a fourth round of processing (e.g., Round 3). At the beginning of Round 3, the first, second, and third quadrants of the first accumulation storage $222_{1,1}$ store the first 48 output contexts $A_0W_0$-$A_{11}W_3$ of the output tensor. Additionally, at the beginning of Round 3, the control logic circuitry 210 has replaced the third subset of four activation contexts ($A_8$, $A_9$, $A_{10}$, $A_{11}$) in the second activation buffer 216 with a fourth subset of four activation contexts ($A_{12}$, $A_{13}$ $A_{14}$, $A_{15}$) but has held the set of four weight contexts ($W_0$, $W_1$, $W_2$, $W_3$) in the second weight buffer 212 to be recycled. After loading the fourth subset of four activation contexts ($A_{12}$, $A_{13}$, $A_{14}$, $A_{15}$) into the second activation buffer 216, the control logic circuitry 210 flushes the fourth subset of four activation contexts from the first activation buffer 208. During Round 3, the control logic circuitry 210 sequences the set of four weight contexts ($W_0$, $W_1$, $W_2$, $W_3$) stored in the second weight buffer 212 and the thirteenth activation context ($A_{12}$) stored in the second activation buffer 216 so that the first MAC circuit $220_{1,1}$ performs calculations to determine the output contexts $A_{12}W_0$, $A_{12}W_1$, $A_{12}W_2$, and $A_{12}W_3$.

In the example of FIG. 5D, after the thirteenth activation context ($A_{12}$) has been consumed, the control logic circuitry 210 removes the thirteenth activation context ($A_{12}$) from the second activation buffer 216. In the example of FIG. 5D, the control logic circuitry 210 subsequently sequences the set of four weight contexts ($W_0$, $W_1$, $W_2$, $W_3$) stored in the second weight buffer 212 and the fourteenth activation context ($A_{13}$) stored in the second activation buffer 216 so that the first MAC circuit $220_{1,1}$ performs calculations to determine the output contexts $A_{13}W_0$, $A_{13}W_1$, $A_{13}W_2$, and $A_{13}W_3$. During Round 3, the first MAC circuit $220_{1,1}$ flushes the four weight contexts ($W_0$, $W_1$, $W_2$, $W_3$) from the second weight buffer 212 as they are consumed. After Round 3, the first MAC circuit $220_{1,1}$ has consumed the fourth subset of four activation contexts ($A_{12}$, $A_{13}$, $A_{14}$, $A_{15}$) and generated 64 total partial accumulations for storage in the first accumulation storage $222_{1,1}$. As such, the control logic circuitry 210 achieves four times reuse of the fourth subset of four activation contexts and 16 times reuse of the set of four weight contexts.

As described above, in the example dataflow diagrams 502, 504, 506, and 508 of FIGS. 5A, 5B, 5C, and 5D, the set of weight contexts stored in the second weight buffer 212 remain constant while the control logic circuitry 210 sequences 16 different activation contexts through the second activation buffer 216. In this manner, each weight context is reused 16 times per MAC circuit while each activation context is reused four times per MAC circuit. The data reuse described in connection with FIGS. 5A, 5B, 5C, and 5D is multiplied by 16 times when implemented in conjunction with broadcasting activation contexts across rows of the MAC circuitry 116 and broadcasting weight contexts along columns of the MAC circuitry 116. As such, when implementing a data reuse technique with 16 activation contexts and four weight contexts and broadcasting activation contexts and weight contexts, examples disclosed herein achieve 256 ops/byte reuse of weight data and 64 ops/byte reuse of activation data.

In the examples of FIGS. 5A, 5B, 5C, and 5D, the control logic circuitry 210 advances to the next round of processing (e.g., Round 0, Round 1, Round 2, and Round 3) along a portion of the input channels for a given spatial point or kernel. As such, the values stored in the first accumulation storage $222_{1,1}$ are partial sums until the entire input channel dimensions are traversed. In the examples of FIGS. 5A, 5B, 5C, and 5D, each round of processing corresponds to the control logic circuitry 210 advancing 16 steps along the input channels. Different implementations are possible. For example, if the number of input channels was 256, then the control logic circuitry 210 would iterate through each round (e.g., Round 0, Round 1, Round 2, Round 3) 16 times to traverse all the input channels for all contexts.

FIGS. 5A, 5B, 5C, and 5D illustrate example multi-context MAC operations for a data reuse technique with a set of 16 activation contexts and a set of four weight contexts. To implement a data reuse technique with a set of four activation contexts and a set of 16 weight contexts, the control logic circuitry 210 operates similarly to load activation contexts and weight contexts as in the examples of FIGS. 5A, 5B, 5C, and 5D except the control logic circuitry 210 maintains the set of four activation contexts in the second activation buffer 216 and cycles subsets of the set of 16 weights through the second weight buffer 212. As such, when implementing a data reuse technique with a set of four activation contexts and a set of 16 weight contexts and broadcasting activation contexts and weight contexts, examples disclosed herein achieve 64 ops/byte reuse of weight data and 256 ops/byte reuse of activation data.

When implementing an example data reuse technique with symmetric activation contexts and weight contexts, the control logic circuitry 210 implements different processing and delivers up to 128 ops/byte reuse of weight data and 128 ops/byte reuse of activation data. For example, at the beginning of the convolution including a set of eight activation contexts and a set of eight weight contexts, the control logic circuitry 210 loads the second weight buffer 212 with data from the first weight buffer 206 for a first subset of four weight contexts, ($W_0$, $W_1$, $W_2$, $W_3$). Additionally, the control logic circuitry 210 loads the second activation buffer 216 with data from the first activation buffer 208 for a first subset of four activation contexts, ($A_0$, $A_1$, $A_2$, $A_3$). Subsequently, the control logic circuitry 210 flushes the first subset of four weight contexts, ($W_0$, $W_1$, $W_2$, $W_3$) from the first weight buffer 206 but maintains the first set of four activation contexts, ($A_0$, $A_1$, $A_2$, $A_3$) in the first activation buffer 208.

In the example data reuse technique with symmetric activation contexts and weight contexts, during an initial round of processing (e.g., Round 0), the control logic circuitry 210 sequences the first subset of four weight contexts ($W_0$, $W_1$, $W_2$, $W_3$) stored in the second weight buffer 212 and the first activation context ($A_0$) stored in the second activation buffer 216 so that the first MAC circuit $220_{1,1}$ performs calculations to determine the output context $A_0W_0$, followed by the output context $A_0W_1$, followed by the output context $A_0W_2$, and then the output context $A_0W_3$. After the first activation context ($A_0$) has been consumed, the control logic circuitry 210 removes the first activation context ($A_0$) from the second activation buffer 216. In some examples, the control logic circuitry 210 maintains the first activation context ($A_0$) in the second activation buffer 216 to be overwritten by additional activation contexts.

In the example data reuse technique with symmetric activation contexts and weight contexts, the control logic circuitry 210 subsequently sequences the first subset of four weight contexts ($W_0$, $W_1$, $W_2$, $W_3$) stored in the second weight buffer 212 and the second activation context ($A_1$) stored in the second activation buffer 216 so that the first MAC circuit $220_{1,1}$ performs calculations to determine the output contexts $A_1W_0$, $A_1W_1$, $W_1$, $A_1W_2$, and $A_1W_3$. While the first MAC circuit $220_{1,1}$ processes the second activation context ($A_1$) and the first subset of four weight contexts ($W_0$, $W_1$, $W_2$, and $W_3$) and after the control logic circuitry 210 has evicted the first activation context ($A_0$) from the second activation buffer 216, the control logic circuitry 210 fetches the fifth activation context ($A_4$) from the first activation buffer 208. As described above, in some examples, the control logic circuitry 210 overwrites the first activation context ($A_0$) with the fifth activation context ($A_4$). After Round 0, the first MAC circuit $220_{1,1}$ has consumed the first subset of four activation contexts ($A_0$, $A_1$, $A_2$, $A_3$) and generated 16 partial accumulations for storage in the first accumulation storage $222_{1,1}$. As such, the control logic circuitry 210 achieves four times reuse of the first subset of four activation contexts and four times reuse of the first subset of four weight contexts.

In the example data reuse technique with symmetric activation contexts and weight contexts, during a second round of processing (e.g., Round 1), the control logic circuitry 210 has replaced the first subset of four activation contexts ($A_0$, $A_1$, $A_2$, $A_3$) in the second activation buffer 216 with the second subset of four activation contexts ($A_4$, $A_5$, $A_6$, $A_7$) but has held the first subset of four weight contexts ($W_0$, $W_1$, $W_2$, $W_3$) in the second weight buffer 212 to be recycled. After loading the second subset of four activation contexts ($A_4$, $A_5$, $A_6$, $A_7$) into the second activation buffer 216, the control logic circuitry 210 maintains the second subset of four activation contexts in the first activation buffer 208. During Round 1, the control logic circuitry 210 sequences the first subset of four weight contexts ($W_0$, $W_1$, $W_2$, $W_3$) stored in the second weight buffer 212 and the fifth activation context ($A_4$) stored in the second activation buffer 216 so that the first MAC circuit $220_{1,1}$ performs calculations to determine the output contexts $A_4W_0$, $A_4W_1$, $A_4W_2$, and $A_4W_3$.

In the example data reuse technique with symmetric activation contexts and weight contexts, after the fifth activation context ($A_4$) has been consumed, the control logic circuitry 210 removes the fifth activation context ($A_4$) from the second activation buffer 216. In the example data reuse technique with symmetric activation contexts and weight contexts, the control logic circuitry 210 subsequently sequences the first subset of four weight contexts ($W_0$, $W_1$, $W_2$, $W_3$) stored in the second weight buffer 212 and the sixth activation context (As) stored in the second activation buffer 216 so that the first MAC circuit $220_{1,1}$ performs calculations to determine the output contexts $A_5W_0$, $A_5W_1$, $A_5W_2$, and $A_5W_3$. While the first MAC circuit $220_{1,1}$ processes the sixth activation context (As) and the first subset of four weight contexts ($W_0$, W $W_2$, and $W_3$) and after the control logic circuitry 210 has evicted the fifth activation context ($A_4$) from the second activation buffer 216, the control logic circuitry 210 fetches the first activation context ($A_0$) from the first activation buffer 208. After Round 1, the first MAC circuit $220_{1,1}$ has consumed the second subset of four activation contexts ($A_4$, $A_5$, $A_6$, $A_7$) and generated 32 total partial accumulations for storage in the first accumulation storage $222_{1,1}$. As such, the control logic circuitry 210 achieves four times reuse of the second subset of four activation contexts and eight times reuse of the first subset of four weight contexts.

In the example data reuse technique with symmetric activation contexts and weight contexts, at the beginning of a third round of processing (e.g., Round 2), the control logic circuitry 210 loads the second weight buffer 212 with data from the first weight buffer 206 for a second subset of four weight contexts, ($W_4$, $W_5$, $W_6$, $W_7$). Additionally, at the beginning of Round 2, the control logic circuitry 210 has reloaded the second activation buffer 216 with data from the first activation buffer 208 for the first subset of four activation contexts, ($A_0$, $A_1$, $A_2$, $A_3$). Subsequently, the control logic circuitry 210 flushes the second subset of four weight contexts, ($W_4$, $W_5$, $W_6$, $W_7$) from the first weight buffer 206 and flushes the first subset of four activation contexts, ($A_0$, $A_1$, $A_2$, $A_3$) from the first activation buffer 208. Although the control logic circuitry 210 flushes the second subset of four weight contexts ($W_4$, $W_5$, $W_6$, $W_7$) from the first weight buffer 206, the control logic circuitry 210 maintains the second subset of four weight contexts ($W_4$, $W_5$, $W_6$, $W_7$) in the second weight buffer 212 for use in Round 3.

In the example data reuse technique with symmetric activation contexts and weight contexts, during Round 2, the control logic circuitry 210 sequences the second subset of four weight contexts ($W_4$, $W_5$, $W_6$, $W_7$) stored in the second weight buffer 212 and the first activation context ($A_0$) stored in the second activation buffer 216 so that the first MAC circuit $220_{1,1}$ performs calculations to determine the output contexts $A_0W_4$, $A_0W_5$, $A_0W_6$, and $A_0W_7$. After the first activation context ($A_0$) has been consumed, the control logic circuitry 210 removes the first activation context ($A_0$) from the second activation buffer 216. In some examples, the control logic circuitry 210 maintains the first activation context ($A_0$) in the second activation buffer 216 to be overwritten by additional activation contexts.

In the example data reuse technique with symmetric activation contexts and weight contexts, the control logic circuitry 210 subsequently sequences the second subset of four weight contexts ($W_4$, $W_5$, $W_6$, $W_7$) stored in the second weight buffer 212 and the second activation context ($A_1$) stored in the second activation buffer 216 so that the first MAC circuit $220_{1,1}$ performs calculations to determine the output contexts $A_1W_4$, $A_1W_5$, $A_1W_6$, and $A_1W_7$. While the first MAC circuit $220_{1,1}$ processes the second activation context ($A_1$) and the second subset of four weight contexts ($W_4$, $W_5$, $W_6$, and $W_7$) and after the control logic circuitry 210 has evicted the first activation context ($A_0$) from the second activation buffer 216, the control logic circuitry 210 fetches the fifth activation context ($A_4$) from the first activation buffer 208. As described above, in some examples, the control logic circuitry 210 overwrites the first activation context ($A_0$) with the fifth activation context ($A_4$). After Round 3, the first MAC circuit $220_{1,1}$ has re-consumed the first subset of four activation contexts ($A_0$, $A_1$, $A_2$, $A_3$) and generated 48 partial accumulations for storage in the first accumulation storage $222_{1,1}$. As such, the control logic circuitry 210 achieves eight times reuse of the first subset of four activation contexts and four times reuse of the second subset of four weight contexts.

In the example data reuses technique with symmetric activation contexts and weight contexts, at the beginning of a fourth round of processing (e.g., Round 3), the control logic circuitry 210 maintains the second subset of four weight contexts ($W_4$, $W_5$, $W_6$, $W_7$) in the second weight buffer 212 to be recycled. Additionally, at the beginning of Round 3, the control logic circuitry 210 has reloaded the second activation buffer 216 with data from the first activation buffer 208 for the second subset of four activation contexts, ($A_4$, $A_5$, $A_6$, $A_7$). Subsequently, the control logic circuitry 210 flushes the second subset of four activation contexts, ($A_4$, $A_5$, $A_6$, $A_7$) from the first activation buffer 208. During Round 3, the control logic circuitry 210 sequences the second subset of four weight contexts ($W_4$, $W_5$, $W_6$, $W_7$) stored in the second weight buffer 212 and the fifth activation context ($A_4$) stored in the second activation buffer 216 so that the first MAC circuit $220_{1,1}$ performs calculations to determine the output contexts $A_4W_4$, $A_4W_5$, $A_4W_6$, and $A_4W_7$.

In the example data reuse techniques with symmetric activation contexts and weight contexts, after the fifth activation context ($A_4$) has been consumed, the control logic circuitry 210 removes the fifth activation context ($A_4$) from the second activation buffer 216. The control logic circuitry 210 subsequently sequences the second subset of four weight contexts ($W_4$, $W_5$, $W_6$, $W_7$) stored in the second weight buffer 212 and the sixth activation context ($A_5$) stored in the second activation buffer 216 so that the first MAC circuit $220_{1,1}$ performs calculations to determine the output contexts $A_5W_4$, $A_5W_5$, $A_5W_6$, and $A_5W_7$. After Round 3, the first MAC circuit $220_{1,1}$ has consumed the second subset of four activation contexts ($A_4$, $A_5$, $A_6$, $A_7$) and generated 64 total partial accumulations for storage in the first accumulation storage $222_{1,1}$. As such, the control logic circuitry 210 achieves eight times reuse of the second subset of four activation contexts and eight times reuse of the second subset of four weight contexts.

FIG. 6 is an illustration 600 showing one or more differences between transformation of an example single context MAC stencil 602 (MAC_GRID_STENCIL) to an example output tensor 604 and transformation of an example multi-context MAC stencil 606 (CONTEXT_STENCIL) to the example output tensor 604. In the example of FIG. 6, the number of output contexts in the single context MAC stencil 602 is equal to the product of the number of rows and the number of columns of existing MAC circuitry (e.g., MAC_GRID_STENCIL=NUM_COL*NUM_ROW). Additionally, the depth of the single context MAC stencil 602 is equal to the number of columns of the MAC circuitry (e.g., $Z_{MAC\_GRID\_STENCIL}$=NUM_COL). In the example of FIG. 6, the height and width of the single context MAC stencil 602 is adjustable such that the product of the height and width equals the number of rows of the MAC circuitry (e.g., NUM_ROW=$X_{MAC\_GRID\_STENCIL}$*$Y_{MAC\_GRID\_STENCIL}$).

As described above, existing MAC circuitry has 16 rows and 16 columns (e.g., NUM_ROW=16 and NUM_COL=16). As such, in the example of FIG. 6, the single context MAC stencil 602 represents 256 output contexts of the output tensor 604. Existing MAC circuitry generates the 256 output contexts using spatial reuse (e.g., by broadcasting activation contexts to rows of the MAC circuitry and by broadcasting weights to columns of the MAC circuitry). Thus, the reuse factor of activation contexts is equal to the number of columns of the MAC circuitry (NUM_COL) and the reuse factor of weight contexts is equal to the number of rows of the MAC circuitry (NUM_ROW). Multiple iterations of the single context MAC stencil 602 are calculated to generate the output tensor 604. For each iteration of the single context MAC stencil 602, activation contexts and weight contexts must be read into existing MAC circuitry.

In contrast to existing MAC circuitry, the MAC circuitry 116 includes the second weight buffer 212, the second activation buffer 216, and the accumulation storages of FIG. 2 which are sized to accommodate for multiple weight contexts, multiple activation contexts, and multiple output contexts, respectively. Each weight context and each activation context maps to O output contexts in the multi-context MAC stencil 606 where O is equal to the product of the number of rows of the MAC circuitry 116 and the number of columns of the MAC circuitry 116 (e.g., 0=NUM_COL*NUM-ROW). Thus, the number of points in the multi-context MAC stencil 606 is equal to the product of the number of rows of the MAC circuitry 116, the number of columns of the MAC circuitry 116, and the number of contexts that can be stored in the accumulation storage (NUM_CONTEXT) (e.g., CONTEXT_STENCIL=NUM_ROW*NUM_COL*NUM_CONTEXT). Thus, the multi-context MAC stencil 606 is a multiple of the single context MAC stencil 602 defined by the number of contexts that can be stored in the accumulation storage.

As described above, the MAC circuitry 116 has 16 rows and 16 columns (e.g., NUM_ROW=M=16 and NUM_COL=N=16) and each of the accumulation storages of FIG. 2 stores 64 output contexts. As such, in the example of FIG. 6, the multi-context MAC stencil 606 represents 16,384 output contexts of the output tensor 604 (e.g., 16×16×64). The MAC circuitry 116 generates the 16,384 output contexts using spatial reuse (e.g., by broadcasting multiple activation contexts to rows of the MAC circuitry 116 and by broadcasting multiple weight contexts to columns of the MAC circuitry 116) and temporal reuse (e.g., by reusing the activation contexts and weight contexts at each MAC circuit). As such, the MAC circuitry 116 reduces the number of convolutions required to generate the output tensor 604.

In the example of FIG. 6, the reuse factor of activation contexts (ACT_REUSE) for the multi-context MAC stencil 606 is equal to the product of (a) the number of columns of the MAC circuitry 116 and (b) the quotient of the depth of the multi-context MAC stencil 606 and the number of columns of the MAC circuitry 116 (e.g., ACT_REUSE=NUM_COL*$Z_{CONTEXT\_STENCIL}$/NUM_COL). The number of columns of the MAC circuitry 116 represents the spatial reuse of the MAC circuitry 116 and the quotient of the depth of the multi-context MAC stencil 606 and the number of columns of the MAC circuitry 116 represents the temporal reuse of the MAC circuitry 116. In the example of FIG. 6, the reuse factor of weight contexts (WT_REUSE) for the multi-context MAC stencil 606 is equal to the product of (a) the number of rows of the MAC circuitry 116 and (b) the quotient of (1) the product of the height of the multi-context MAC stencil 606 and the width of the multi-context MAC stencil 606 and (2) the number of rows of the MAC circuitry 116 (e.g., WT_REUSE=NUM_ROW*$X_{CONTEXT\_STENCIL}$*$Y_{CONTEXT\_STENCIL}$/NUM_ROW). The number of rows of the MAC circuitry 116 represents the spatial reuse of the MAC circuitry 116 and the quotient of the product of the height of the multi-context MAC stencil 606 and the width of the multi-context MAC stencil 606 and the number of rows of the MAC circuitry 116 represents the temporal reuse of the MAC circuitry 116.

Multiple iterations of the multi-context MAC stencil 606 are calculated to generate the output tensor 604. For each iteration of the multi-context MAC stencil 606, activation contexts and weight contexts are read into the MAC circuitry 116. However, as the multi-context MAC stencil 606 corresponds to many more output contexts of the output tensor 604 than the single context MAC stencil 602 (e.g., 16,384>>256), less activation contexts and weight contexts are read into the AI accelerator circuitry 108 as compared to existing technology thereby reducing the power consumption of the AI accelerator circuitry 108.

In practice there may be output tensor sizes that result in suboptimal utilization of the MAC circuitry 116. For example, if any dimensions of the output tensor 604 are less than the corresponding dimensions of the multi-context MAC stencil 606, then not all of the accumulation storage of respective MAC circuits of the MAC circuitry 116 can be utilized. The size of the multi-context MAC stencil 606 should be chosen to increase (e.g., maximize) overlap between the multi-context MAC stencil 606 and the output tensor 604. Table 3 shows how the size of the multi-context MAC stencil 606 may be derived for different data reuse techniques.

In the example of FIG. 6, the shape of the multi-context MAC stencil 606 is calculated per tensor to reduce (e.g., minimize) memory bandwidth and increase (e.g., maximize) utilization of the MAC circuitry 116. The sparsity of activation tensors and the sparsity of weight sets should be considered when determining the configuration of the multi-context MAC stencil 606 to reduce (e.g., minimize) memory bandwidth and increase (e.g., maximize) utilization of the MAC circuitry 116. Additionally, the number of activation contexts and weight contexts and the amount of reuse per context varies based on the data reuse technique (e.g., NTHW, NTK=8, 8; NTHW, NTK=4, 16; NTHW, NTK=16, 4; etc.). Also, the number of contexts used can vary based on the shape of the input tensor or the number of weights. To improve (e.g., maximize) utilization of the MAC circuitry 116, all 64 contexts of each of the accumulation storages of FIG. 2 should be utilized. Certain tensors do not have enough spatial data or weight data to make full usage of the 64 contexts.

As described above, because data stored in the system memory 104 is compressed and does not include zeros, the activation data or the weight data stored in the local memory 112 is similarly compressed and does not include zeros. As a result, when the data read circuitry 114 reads activation data and/or weight data from the local memory 112, the data read circuitry 114 reads the activation and/or weight data as packed, sparse, and/or otherwise compressed data where all elements are non-zero. Additionally, the first weight buffer 206, the first activation buffer 208, the second weight buffer 212, the second activation buffer 216, and the accumulation storages of FIG. 2 operate as data reuse resources to facilitate increased (e.g., maximum) reuse of the compressed data stored in the local memory 112. FIGS. 7A and 7B illustrate different implementations of these data reuse resources in the presence of compressed data.

FIG. 7A is a block diagram 700 illustrating an example multi-context MAC operation 702 with symmetric compression and symmetric data reuse. In the example of FIG. 7A, the multi-context MAC operation 702 utilizes the example local memory 112, an example reuse local buffer 704, and example MAC circuitry 706 to convolve an example first tensor 708 (Tensor A) and an example first weight set 710 (Tensor B) to generate an example second tensor 712 (Tensor C). In the example of FIG. 7A, the MAC circuitry 706 includes example decompression circuitry 714 and example dot product circuitry 716.

In the example of FIG. 7A, the reuse local buffer 704 represents the first weight buffer 206, the first activation buffer 208, the second weight buffer 212, and the second activation buffer 216. Additionally, in the example of FIG. 7A, the decompression circuitry 714 represents the weight decompression circuitry 214 and the activation decompression circuitry 218. The dot product circuitry 716 represents

TABLE 3

| NTHW, NTK | NUM_ROW | NUM_COL | $X_{CONTEXT\_STENCIL}$ | $Y_{CONTEXT\_STENCIL}$ | $Z_{CONTEXT\_STENCIL}$ |
|---|---|---|---|---|---|
| 1, 64 | 16 | 16 | 4 | 4 | 1024 |
| 2, 32 | 16 | 16 | 8 | 4 | 512 |
| 4, 16 | 16 | 16 | 8 | 8 | 256 |
| 8, 8 | 16 | 16 | 16 | 8 | 128 |
| 16, 4 | 16 | 16 | 16 | 16 | 64 |
| 32, 2 | 16 | 16 | 32 | 16 | 32 |
| 64, 1 | 16 | 16 | 32 | 32 | 16 | the MAC circuits of FIG. 2 and the accumulation storages of FIG. 2. For purposes of clarity, the example of FIG. 7A does not refer to the dimension of the first tensor 708 (Tensor A) or the dimension of the first weight set 710 (Tensor B) but instead, the first tensor 708 and the first weight set 710 are considered in terms of the number of operations required to write the first tensor 708 to and read the first tensor 708 from the local memory 112 and the number of operations required to write the first weight set 710 to and read the first weight set 710 from the local memory 112.

In the example of FIG. 7A, the addition of compression, the reuse local buffer 704, and the decompression circuitry 714 reduces the number of write and read operations required to convolve two tensors. For example, in the absence of compression, the reuse local buffer 704, and the decompression circuitry 714, the DMA circuitry 106 would require 2,048 operations to write each of the first tensor 708 and the first weight set 710 to the local memory 112. Additionally, in such an example, in the absence of compression, the reuse local buffer 704, and the decompression circuitry 714, the MAC circuitry 706 would require 2,048 operations to read each of the first tensor 708 and the first weight set 710 from the local memory 112.

By implementing compression (and adding the decompression circuitry 714), examples disclosed herein reduce the number of read and write operations required to process the first tensor 708 and the first weight set 710. For example, assuming each of the first tensor 708 and the first weight set 710 is fifty percent (50%) sparse (e.g., the first tensor 708 includes 50% zeros and the first weight set 710 includes 50% zeros), compression reduces the first tensor 708 and the first weight set 710 by half the original size before storage in the local memory 112. As such, compression reduces the number of operations required write the first tensor 708 and the first weight set 710 to the local memory 112 from 2,048 operations per tensor to 1,024 operations per tensor. For example, the first tensor 708 may be compressed to generate the compressed first tensor 718 and the first weight set 710 may be compressed to generate the compressed first weight set 720. Additionally, the addition of the decompression circuitry 714 reduces the number of read operations of the MAC circuitry 706 from 4,096 (e.g., 2,048 reads per tensor/weight set without compression) to 2,048 (e.g., 1,024 per tensor/weight set with compression).

By adding the reuse local buffer 704, examples disclosed herein further reduce the number of read and write operations required to process the first tensor 708 and the first weight set 710. In the example of FIG. 7A, the reuse local buffer 704 is populated based on a selected data reuse technique (e.g., selected by the compiler 110) for symmetric reuse. For example, the reuse local buffer 704 is populated (e.g., by the data read circuitry 114) with eight contexts from the compressed first tensor 718 and eight contexts from the compressed first weight set 720. As such, the reuse local buffer 704 allows for eight times reuse of each byte of data read from the local memory 112 for each of the compressed first tensor 718 and the compressed first weight set 720. The reuse local buffer 704 handles much than 8 contexts for activations and weights in operation. However, as the MAC circuitry 706 processes the activation and weight contexts in groups of 8, the reuse local buffer 704 is populated as the MAC circuitry 706 consumes the data.

In the example of FIG. 7A, read operations from the reuse local buffer 704 consume less power than read operations from the local memory 112, implementing the reuse local buffer 704 reduces power consumption of example AI accelerator circuitry. The addition of the reuse local buffer 704 to the decompression circuitry 714, reduces the number of operations to read the compressed first tensor 718 and the compressed first weight set 720 from the local memory 112 from 2,048 (1,024 reads per tensor with compression and without reuse) to 256 (128 reads per tensor with compression and with reuse). The 256 operations to read the compressed first tensor 718 and the compressed first weight set 720 from the local memory 112 to the reuse local buffer 704 are complemented with 2,048 (1,024 per tensor) operations to read the compressed first tensor 718 and the compressed first weight set 720 from the reuse local buffer 704. However, because the reuse local buffer 704 is physically closer to the MAC circuitry 706, the operations to read data from the reuse local buffer 704 typically consume less power than operations to read data from the local memory 112. As such, examples disclosed herein achieve less data movement and reduce the overall power consumption of AI accelerator circuitry.

FIG. 7B is a block diagram 722 illustrating an example multi-context MAC operation 724 with asymmetric compression and asymmetric data reuse with reuse bias towards the densest data. In the example of FIG. 7B, the multi-context MAC operation 724 utilizes the example local memory 112, the example reuse local buffer 704, and the example MAC circuitry 706 to convolve an example first tensor 726 (Tensor A) and an example first weight set 728 (Tensor B) to generate an example second tensor 730 (Tensor C). In the example of FIG. 7B, the MAC circuitry 706 includes the example decompression circuitry 714 and the example dot product circuitry 716.

As in FIG. 7A, for purposes of clarity, the example of FIG. 7B does not refer to the dimension of the first tensor 726 (Tensor A) or the dimension of the first weight set 728 (Tensor B) but instead, the first tensor 726 and the first weight set 728 are considered in terms of the number of operations required to write the first tensor 726 to and read the first tensor 726 from the local memory 112 and the number of operations required to write the first weight set 728 to and read the first weight set 728 from the local memory 112. Additionally, in the example of FIG. 7B, the addition of compression, the reuse local buffer 704, and the decompression circuitry 714 reduce the number of write and read operations required to convolve two tensors in the same manner as described in FIG. 7A. Additionally, as in FIG. 7A, the example of FIG. 7B assumes that in the absence of compression, the reuse local buffer 704, and the decompression circuitry 714, the DMA circuitry 106 would require 2,048 operations to write each of the first tensor 726 and the first weight set 728 to the local memory 112.

In the illustrated example of FIG. 7B, the first tensor 726 is seventy-five percent (75%) sparse and the first weight set 728 is twenty-five percent (25%) sparse (e.g., the first tensor 726 includes 75% non-zero data and the first weight set 728 includes 25% zeros). As such, in the example of FIG. 7B, the first tensor 726 may be reduced (via compression) by one quarter the original size before storage in the local memory 112 to generate an example compressed first tensor 732. Additionally, in the example of FIG. 7B, the first weight set 728 may be reduced (via compression) by three quarters the original size before storage in the local memory 112 to generate an example compressed first weight set 734. As such, compression reduces the number of operations required write the first tensor 726 to the local memory 112 from 2,048 operations to 1,536 operations. Additionally, compression reduces the number of operations required to write the first weight set 728 to the local memory 112 from 2,048 operations to 256 operations.

In the illustrated example of FIG. 7B, the compressed first weight set 734 occupies much less space in the local memory 112 compared to the compressed first tensor 732. In the example of FIG. 7B, the reuse local buffer 704 is populated based on a selected reuse technique (e.g., selected by the compiler 110) for asymmetric reuse. For example, the reuse local buffer 704 is populated (e.g., by the data read circuitry 114) with 16 contexts from the compressed first tensor 732 and four contexts from the compressed first weight set 734. Because the first tensor 726 and the first weight set 728 are asymmetrically sparse, the asymmetric data reuse technique advantageously increases data reuse.

For example, by implementing an asymmetric data reuse technique, the data read circuitry 114 further reduces the number of read and write operations required to read the compressed first tensor 732 and the compressed first weight set 734 from the reuse local buffer 704. For example, because the first weight set 728 is 75% sparse, if the data read circuitry 114 were configured to populate the reuse local buffer 704 symmetrically, the low amount of dense data in the first weight set 728 (e.g., 25%) would prevent the compressed first weight set 734 from filling the symmetrically allocated portion of the reuse local buffer 704. As such, when the first tensor 726 and the first weight set 728 are asymmetrically sparse, configuring the data read circuitry 114 to populate the reuse local buffer 704 asymmetrically increases the amount of data stored in the reuse local buffer 704.

Symmetric data reuse in combination with asymmetric sparsity provides improvements over implementations with no data reuse, but examples disclosed herein provide additional improvements through asymmetric data reuse with asymmetric sparsity. For example, with symmetric data reuse and asymmetric sparsity, the number of operations to read the compressed first tensor 732 and the compressed first weight set 734 from the local memory 112 is reduced from 1,792 (1,536 reads of the compressed first tensor 732 and 256 reads of the compressed first weight set 734) operations to 224 (192 reads of the compressed first tensor 732 and 32 reads of the compressed first weight set 734) operations. With symmetric data reuse and asymmetric sparsity, the 224 operations to read the compressed first tensor 732 and the compressed first weight set 734 from the local memory 112 is complimented by 1,792 (1,536 reads of the compressed first tensor 732 and 256 reads of the compressed first weight set 734) operations to read the compressed first tensor 732 and the compressed first weight set 734 from the reuse local buffer 704.

However, as described above, by implementing asymmetric data reuse with asymmetric sparsity, examples disclosed herein further reduce the number of read and write operations required to process the first tensor 726 and the first weight set 728. With asymmetric data reuse and asymmetric sparsity, the number of operations to read the compressed first tensor 732 and the compressed first weight set 734 from the local memory 112 is reduced from 1,792 (1,536 reads of the compressed first tensor 732 and 256 reads of the compressed first weight set 734) operations to 160 (96 reads of the compressed first tensor 732 and 64 reads of the compressed first weight set 734) operations. With asymmetric data reuse and asymmetric sparsity, the 160 operations to read the compressed first tensor 732 and the compressed first weight set 734 from the local memory 112 are complimented by 1,792 (1,536 reads of the compressed first tensor 732 and 256 reads of the compressed first weight set 734) operations to read the compressed first tensor 732 and the compressed first weight set 734 from the reuse local buffer 704.

As mentioned above, the reuse local buffer 704 is physically closer to the MAC circuitry 706 and therefore operations to read data from the reuse local buffer 704 consume less power than operations to read data from the local memory 112. As such, while the number of read operations from the reuse local buffer 704 has remained the same as with symmetric reuse and asymmetric sparsity, the number of higher power consumption read operations from the local memory 112 has dropped from 224 to 160. As such, examples disclosed herein achieve higher ops/byte to convolve asymmetrically sparse tensors, reduced data movement, reduced power consumption, and reduced memory bandwidth at the interface of example MAC circuitry.

Configuring the example data read circuitry 114 to populate the example reuse local buffer 704 for optimal data reuse depends on the sparsity of the data. For example, simply because the volume of an input tensor is much larger than the volume of weight filters (or vice versa), does not necessarily mean that biasing data reuse towards the activations (e.g., NTHW, NTK=4, 16) will yield the best data reuse possible for the input tensor and weight filters. Additionally, simply because an input tensor and weight filters have similar volume does not necessarily mean that symmetric reuse may be most applicable. Rather, the sparsity inherent in the activation data and weight data should be considered when configuring the data read circuitry 114 to populate the reuse local buffer 704.

As illustrated in FIGS. 7A and 7B, there are advantages of symmetric data reuse and asymmetric data reuse depending on the sparsity of the data. For example, if the activation data and weight data have similar levels of sparsity, it may be advantageous to configure the example data read circuitry 114 to populate the reuse local buffer 704 for symmetric data reuse. Additionally, for example, if the activation data and weight data have very different levels of sparsity, it may be advantageous to configure the example data read circuitry 114 to populate the reuse local buffer 704 for asymmetric data reuse biased towards the denser one of the activation data and the weight data.

In examples disclosed herein, the sparsity of weight data for each layer of an NN or other AI model can be calculated offline, ahead of time, and the sparsity of activation data for each layer can be profiled based on a sample set of typical inputs to the NN or other AI model. As mentioned above, the compiler 110 can process this sparsity information, dimensions of one or more activation tensors to be processed, and dimensions of one or more weight filters to be processed to select the appropriate activation context and weight context configuration (e.g., NTHW, NTK) that will yield the lowest power and best performance for each layer given the input parameters. Accordingly, examples disclosed herein include sparsity-aware data reuse for power optimized neural network accelerators.

Table 4 shows how the number of memory reads varies based on the different reuse techniques for a given sparsity profile.

TABLE 4

|  | Symmetric Data Reuse | Asymmetric Data Reuse-First Sparsity Profile | Asymmetric Data Reuse-Second Sparsity Profile |
| --- | --- | --- | --- |
| Sparse Activation Reads | 32,768 | 32,768 | 32,768 |
| Sparse Weight Reads | 32,768 | 32,768 | 32,768 |
| Activation Sparsity | 80% | 80% | 80% |
| Weight Sparsity | 10% | 10% | 10% |
| $X_{CONTEXT\_STENCIL}$ | 16 | 8 | 16 |
| $Y_{CONTEXT\_STENCIL}$ | 8 | 8 | 16 |
| $Z_{CONTEXT\_STENCIL}$ | 128 | 256 | 64 |
| NUM_COL | 16 | 16 | 16 |
| NUM_ROW | 16 | 16 | 16 |
| Activation Memory Reads | 51 | 26 | 102 |

TABLE 4-continued

|  | Symmetric Data Reuse | Asymmetric Data Reuse-First Sparsity Profile | Asymmetric Data Reuse-Second Sparsity Profile |
|---|---|---|---|
| Weight Memory Reads | 230 | 461 | 115 |
| Total Memory Access | 282 | 486 | 218 |

FIG. 8A is a timing diagram 800 illustrating an example interface protocol for a data reuse technique with symmetric activation contexts and weight contexts. The timing diagram 800 includes an example activation plot 802 and an example weight plot 804. The timing diagram 800 represents a data reuse technique with eight activation contexts and eight weight contexts (NTHW, NTK=8, 8) for a 16 by 8 multi-context MAC stencil. As described above, the data read circuitry 114 transmits a start activation context signal, an end activation context signal, and a last activation context signal with each compressed activation tensor and activation sparsity bitmap. Additionally, as described above, the data read circuitry 114 transmits a start weight context signal and an end weight context signal with each compressed subset of weight contexts and weight sparsity bitmap.

In the illustrated example of FIG. 8A, the example activation plot 802 includes a start activation context signal (labelled "start"), an end activation context signal (labelled "end"), and an activation tensor signal (labelled "act_cxt"). The example weight plot 804 includes a start weight context signal (labelled "start"), an end weight context signal (labelled "end"), and a weight context signal (labelled "wt_cxt").

In the illustrated example of FIG. 8A, the start activation context signal is asserted (e.g., is a logic '1,' is five volts (V), etc.) with the first byte of the activation tensor signal per processing round. Thus, as the data reuse technique includes eight activation contexts, the start activation context signal is asserted every eight activation contexts. In the example of FIG. 8A, the start activation context signal is a pulse train lasting the length of the first activation context ('A0'). In the example of FIG. 8A, the end activation context signal is asserted (e.g., is a logic '1,' is 5V, etc.) with the last byte of the activation tensor signal per processing round. Thus, as the data reuse technique includes eight activation contexts, the end activation context signal is asserted every eight activation contexts. In the example of FIG. 8A, the end activation context signal is a pulse train lasting the length of the eighth activation context ('A7').

In the illustrated example of FIG. 8A, the start weight context signal is asserted (e.g., is a logic '1,' is 5V, etc.) with the first byte of each subset of the weight set signal per processing round. Thus, as the data reuse technique includes eight weight contexts and each subset of the weight set includes four weight contexts, the start weight context signal is asserted every four weight contexts. In the example of FIG. 8A, the start weight context signal is a pulse lasting the length of the first weight context (e.g., 'W0', 'W4', etc.) of each subset. In the example of FIG. 8A, the end weight context signal is asserted (e.g., is a logic '1,' is 5V, etc.) with the last byte of each subset of the weight set signal per processing round. Thus, as the data reuse technique includes eight weight contexts and each subset of the weight set includes four weight contexts, the end weight context signal is asserted every four weight contexts. In the example of FIG. 8A, the end activation context signal is a pulse lasting the length of the fourth weight context (e.g., 'W3', 'W7', etc.) of each subset of the weight set.

FIG. 8B is a timing diagram 806 illustrating an example interface protocol for a data reuse technique with asymmetric activation contexts and weight contexts with weight context reuse bias. The timing diagram 806 includes an example activation plot 808 and an example weight plot 810. The timing diagram 806 represents a data reuse technique with 16 activation contexts and four weight contexts (NTHW, NTK=16, 4) for a 16 by 16 multi-context MAC stencil. As described above, the data read circuitry 114 transmits a start activation context signal, an end activation context signal, and a last activation context signal with each compressed activation tensor and activation sparsity bitmap. Additionally, as described above, the data read circuitry 114 transmits a start weight context signal and an end weight context signal with each compressed weight set and weight sparsity bitmap.

In the illustrated example of FIG. 8B, the example activation plot 808 includes a start activation context signal (labelled "start"), an end activation context signal (labelled "end"), and an activation tensor signal (labelled "act_cxt"). The example weight plot 810 includes a start weight context signal (labelled "start"), an end weight context signal (labelled "end"), and a weight context signal (labelled "wt_cxt").

In the illustrated example of FIG. 8B, the start activation context signal is asserted (e.g., is a logic '1,' is 5V, etc.) with the first byte of the activation tensor signal per processing round. Thus, as the data reuse technique includes 16 activation contexts, the start activation context signal is asserted every 16 activation contexts. In the example of FIG. 8B, the start activation context signal is a pulse train lasting the length of the first activation context ('A0'). In the example of FIG. 8B, the end activation context signal is asserted (e.g., is a logic '1,' is 5V, etc.) with the last byte of the activation tensor signal per processing round. Thus, as the data reuse technique includes 16 activation contexts, the end activation context signal is asserted every 16 activation contexts. In the example of FIG. 8B, the end activation context signal is a pulse train lasting the length of the sixteenth activation context ('A15').

In the illustrated example of FIG. 8B, the start weight context signal is asserted (e.g., is a logic '1,' is 5V, etc.) with the first byte of the weight set signal per processing round. Thus, as the data reuse technique includes four weights, the start weight context signal is asserted every four weight contexts. In the example of FIG. 8B, the start weight context signal is a pulse lasting the length of the first weight context ('W0'). In the example of FIG. 8B, the end weight context signal is asserted (e.g., is a logic '1,' is 5V, etc.) with the last byte of the weight set signal per processing round. Thus, as the data reuse technique includes four weight contexts, the end weight context signal is asserted every four weight contexts. In the example of FIG. 8B, the end weight context signal is a pulse lasting the length of the fourth weight context ('W3').

As illustrated in FIGS. 8A and 8B, examples disclosed herein include a protocol that allows the MAC circuitry 116 to manage the second weight buffer 212 and the second activation buffer 216 without counting the number of times a context has been reused. In some examples, the number of contexts utilized by each MAC circuit may not be uniform across the MAC circuitry 116. For example, a MAC circuit in the first row of the MAC circuitry 116 may utilize 64 contexts while a MAC circuit in the Mth row of the MAC circuitry 116 may utilize eight contexts due to lack of input data. Example protocol disclosed herein advantageously allows the MAC circuitry 116 to manage the second weight buffer 212 and the second activation buffer 216 without being aware of the number contexts that are active for a given MAC circuit.

Figure 9A:
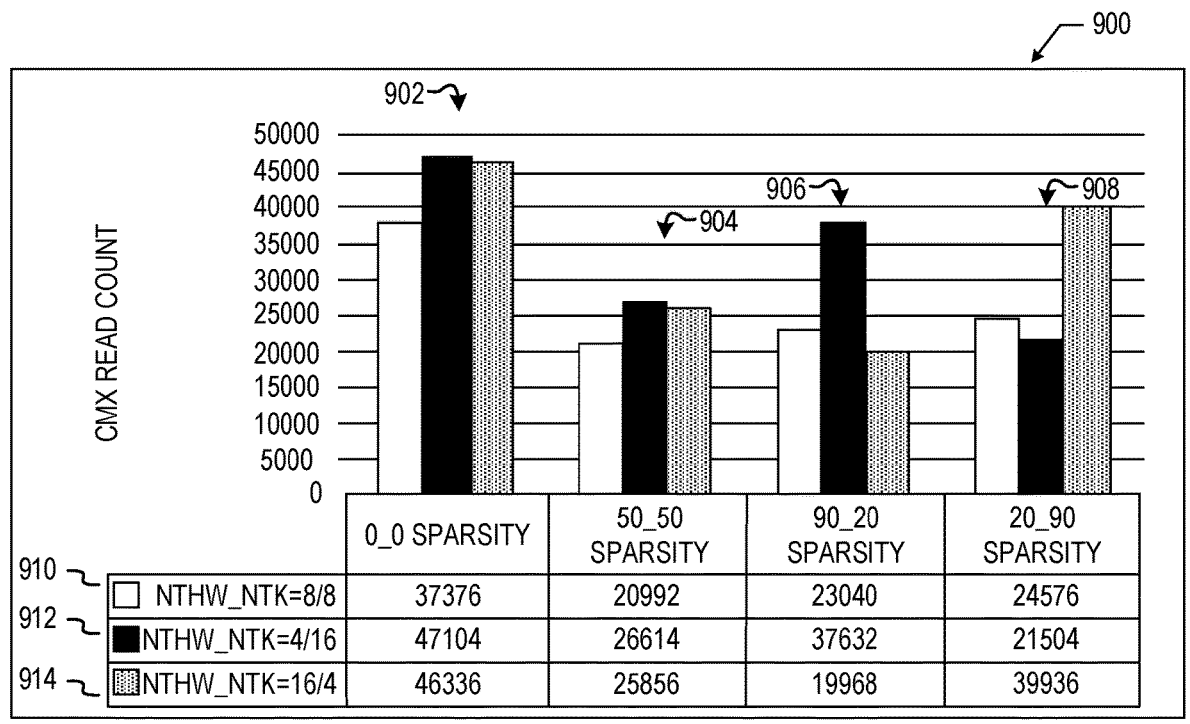
FIG. 9A is a graphical illustration showing example memory read counts for example sparsity and data reuse combinations.

FIG. 9A is a graphical illustration 900 showing example memory read counts for example sparsity and data reuse combinations. In the graphical illustration 900, lower values correspond to better performance. The graphical illustration 900 includes an example first column 902, an example second column 904, an example third column 906, and an example fourth column 908. In the example of FIG. 9A, the graphical illustration 900 includes an example first row 910, an example second row 912, and an example third row 914.

In the illustrated example of FIG. 9A, the first column 902 corresponds to uncompressed data. In the example of FIG. 9A, the second column 904 corresponds to symmetrically sparse data with activation contexts having 50% sparsity and weight contexts having 50% sparsity. The example third column 906 corresponds to asymmetrically sparse data with activation contexts having 90% sparsity and weight contexts having 20% sparsity. In the example of FIG. 9A, the fourth column 908 corresponds to asymmetrically sparse data with activation contexts having 20% sparsity and weight contexts having 90% sparsity.

In the illustrated example of FIG. 9A, the first row 910 corresponds to a symmetric data reuse technique with eight activation contexts and eight weight contexts (NTHW, NTK=8, 8). In the example of FIG. 9A, the second row 912 corresponds to an asymmetric data reuse technique with four activation contexts and 16 weight contexts (NTHW, NTK=4, 16). The example third row 914 corresponds to an asymmetric data reuse technique with 16 activation contexts and four weight contexts (NTHW, NTK=16, 4).

In the illustrated example of FIG. 9A, to increase (e.g., maximize) reuse and the number of ops/byte for the third column 906, biasing activation contexts and weight contexts towards weight contexts (e.g., the third row 914) provides the best performance (e.g., the least amount of memory read operations). For example, the memory read count for the third row 914 is less than the memory read count for the first row 910 which is less than the memory read count for the second row 912 (e.g., 19,968<23,040<37,632). Biasing activation contexts and weight contexts towards weight contexts provides the best performance for asymmetrically sparse data with activation contexts having 90% sparsity and weight contexts having 20% sparsity because weight contexts are more dense than activation contexts.

In the example of FIG. 9A, to increase (e.g., maximize) reuse and the number of ops/byte for the fourth column 908, biasing activation contexts and weight contexts towards activation contexts (e.g., the second row 912) provides the best performance (e.g., the least amount of memory read operations). For example, the memory read count for the second row 912 is less than the memory read count for the first row 910 which is less than the memory read count for the third row 914 (e.g., 21,504<24,576<39,936). Thus, as illustrated in FIG. 9A, biasing the activation context and weight context reuse towards the densest data provides the best performance for a given combination of sparsity and data reuse combinations.

Figure 9B:
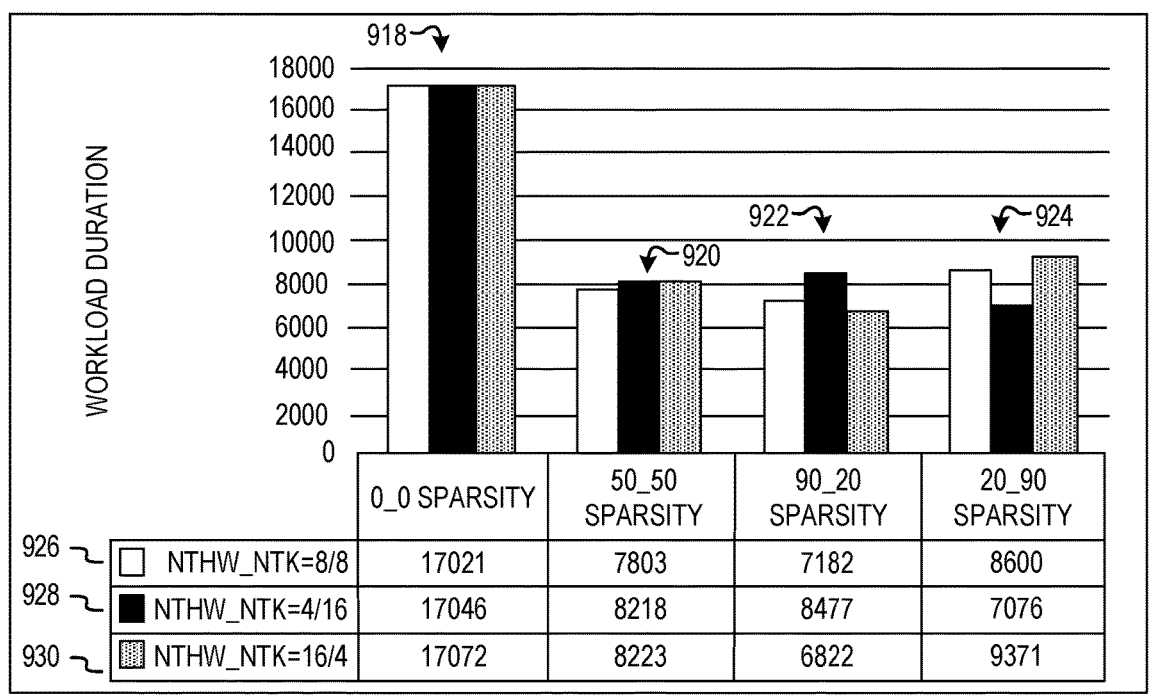
FIG. 9B is a graphical illustration showing example workload duration for example sparsity and data reuse combinations.

FIG. 9B is a graphical illustration 916 showing example workload duration for example sparsity and data reuse combinations. In the graphical illustration 916, lower values correspond to better performance. The graphical illustration 916 includes an example first column 918, an example second column 920, an example third column 922, and an example fourth column 924. In the example of FIG. 9B, the graphical illustration 916 includes an example first row 926, an example second row 928, and an example third row 930.

In the illustrated example of FIG. 9B, the first column 918 corresponds to uncompressed data. In the example of FIG. 9B, the second column 920 corresponds to symmetrically sparse data with activation contexts having 50% sparsity and weight contexts having 50% sparsity. The example third column 922 corresponds to asymmetrically sparse data with activation contexts having 90% sparsity and weight contexts having 20% sparsity. In the example of FIG. 9B, the fourth column 924 corresponds to asymmetrically sparse data with activation contexts having 20% sparsity and weight contexts having 90% sparsity.

In the illustrated example of FIG. 9B, the first row 926 corresponds to a symmetric data reuse technique with eight activation contexts and eight weight contexts (NTHW, NTK=8, 8). In the example of FIG. 9B, the second row 928 corresponds to an asymmetric data reuse technique with four activation contexts and 16 weight contexts (NTHW, NTK=4, 16). The example third row 930 corresponds to an asymmetric data reuse technique with 16 activation contexts and four weight contexts (NTHW, NTK=16, 4).

In the illustrated example of FIG. 9B, to reduce the workload duration (measured in clock cycles) for the third column 922, biasing activation contexts and weight contexts towards weight contexts (e.g., the third row 930) provides the best performance (e.g., the shortest workload duration). For example, the number of clock cycles for the third row 930 is less than the number of clock cycles for the first row 926 which is less than the number of clock cycles for the second row 928 (e.g., 6,822<7,182<8,477). Biasing activation contexts and weight contexts towards weight contexts provides the best performance asymmetrically sparse data with activation contexts having 90% sparsity and weight contexts having 20% sparsity because the weight contexts are denser than the activation contexts.

In the example of FIG. 9B, to reduce the workload duration for the fourth column 924, biasing activation contexts and weight contexts towards activation contexts (e.g., the second row 928) provides the best performance (e.g., the shortest workload duration). For example, the number of clock cycles for the second row 928 is less than the number of clock cycles for the first row 926 which is less than the number of clock cycles for the third row 930 (e.g., 7,076<8, 600<9,371). Thus, as illustrated in FIG. 9B, biasing the activation context and weight context reuse towards the densest data reduces (e.g., minimizes) the number of clock cycles to complete a workload and increases (e.g., maximizes) the achievable sparse acceleration.

In AI models the rectified linear unit (ReLU) activation function clamps all negative convolution results to zero. As such, activation context sparsity is generally much greater than weight context sparsity. Additionally, activation context sparsity is generally low in the earlier layers of an AI model but increases as for deeper layers of the AI model. For example, it is not uncommon for activation contexts to be 70-80% sparse towards the end of an AI model. Conversely, weight contexts typically have a low level of natural sparsity. However, in some examples, weight contexts can be pruned by forcing all values below a threshold to zero thereby achieving a higher level of sparsity. For example, implementing such a pruning technique can yield up to 80% sparsity without substantial loss in accuracy. As such, asymmetric sparsity is not uncommon in practice. Thus, the configurable nature of AI accelerator circuitry disclosed herein allows improved performance and efficiency.

In some examples, the AI accelerator circuitry 108 includes means for controlling one or more buffers. For example, the means for controlling one or more buffers may be implemented by the control logic circuitry 210. In some examples, the control logic circuitry 210 may be implemented by machine executable instructions such as that implemented by at least blocks 1002, 1004, 1006, 1008, 1012, 1014, 1016, 1018, 1020, and/or 1022 of FIG. 10; at least blocks 1102, 1104, 1106, 1108, 1112, 1114, 1116, 1118, 1120, and/or 1122 of FIG. 11; at least blocks 1202, 1204, 1206, 1208, 1212, 1214, 1216, 1218, 1220, and/or 1222 of FIG. 12; at least blocks 1302, 1304, 1306, 1308, 1312, 1314, 1316, 1318, 1320, and/or 1322 of FIG. 13; at least blocks 1402, 1404, 1406, 1410, 1412, 1414, 1416, 1418, 1420, 1422, 1424, 1426, and/or 1428 of FIG. 14; and/or at least blocks 1502, 1504, 1506, 1508, 1512, 1514, 1516, 1518, 1520, and/or 1522 of FIG. 15 executed by processor circuitry, which may be implemented by the example processor circuitry 1612 of FIG. 16, the example microprocessor 1700 of FIG. 17, and/or the example Field Programmable Gate Array (FPGA) circuitry 1800 of FIG. 18. In other examples, the control logic circuitry 210 is implemented by other hardware logic circuitry, hardware implemented state machines, and/or any other combination of hardware, software, and/or firmware. For example, the control logic circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the AI accelerator circuitry 108 includes means for performing multiply and accumulate (MAC) operations. For example, the means for performing MAC operations may be implemented by one or more of the MAC circuits of FIG. 2. In some examples, one or more of the MAC circuits of FIG. 2 may be implemented by machine executable instructions such as that implemented by at least block 1010 of FIG. 10; at least block 1110 of FIG. 11; at least block 1210 of FIG. 12; at least block 1310 of FIG. 13; at least block 1410 of FIG. 14; and/or at least block 1510 of FIG. 15 executed by processor circuitry, which may be implemented by the example processor circuitry 1612 of FIG. 16, the example microprocessor 1700 of FIG. 17, and/or the example Field Programmable Gate Array (FPGA) circuitry 1800 of FIG. 18. In other examples, one or more of the MAC circuits of FIG. 2 is implemented by other hardware logic circuitry, hardware implemented state machines, and/or any other combination of hardware, software, and/or firmware. For example, one or more of the MAC circuits of FIG. 2 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the AI accelerator circuitry 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example local memory 112, the example data read circuitry 114, the example MAC circuitry 116, the example data write circuitry 118, the example first weight buffer 206, the example first activation buffer 208, the example control logic circuitry 210, the example second weight buffer 212, the example weight decompression circuitry 214, the example second activation buffer 216, the example activation decompression circuitry 218, the example first column of MAC circuits $220_{1,1}$-$220_{1,M}$, the example second column of MAC circuits $224_{1,1}$-$224_{1,M}$, the example Nth column of MAC circuits $228_{N,1}$-$228_{N,M}$, the example accumulation storages $222_{1,1}$-$222_{1,M}$, the example accumulation storages $226_{2,1}$-$226_{2,M}$, the example accumulation storages $230_{N,1}$-$230_{N,M}$, and/or, more generally, the example AI accelerator circuitry 108 of FIG. 2, may be implemented by hardware alone or by hardware in combination with software and/or firmware. Thus, for example, any of the example local memory 112, the example data read circuitry 114, the example MAC circuitry 116, the example data write circuitry 118, the example first weight buffer 206, the example first activation buffer 208, the example control logic circuitry 210, the example second weight buffer 212, the example weight decompression circuitry 214, the example second activation buffer 216, the example activation decompression circuitry 218, the example first column of MAC circuits $220_{1,1}$-$220_{1,M}$, the example second column of MAC circuits $224_{1,1}$-$224_{1,M}$, the example Nth column of MAC circuits $228_{N,1}$-$228_{N,M}$, the example accumulation storages $222_{1,1}$-$222_{1,M}$, the example accumulation storages $226_{2,1}$-$226_{2,M}$, the example accumulation storages $230_{N,1}$-$230_{N,M}$, and/or, more generally, the example AI accelerator circuitry 108 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example AI accelerator circuitry 108 of FIG. 2 may include one or more elements, processes, and/or devices in addition to, or instead of, those illustrated in FIG. 2, and/or may include more than one of any or all of the illustrated elements, processes, and devices.

Flowcharts representative of example hardware logic circuitry, machine-readable instructions, hardware implemented state machines, and/or any combination thereof for implementing the AI accelerator circuitry 108 of FIG. 2 are shown in FIGS. 10, 11, 12, 13, 14, and/or 15. The machine-readable instructions may be one or more executable and/or instantiate-able programs or portion(s) of an executable and/or instantiate-able program for execution and/or instantiation by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a CD, a floppy disk, a hard disk drive (HDD), a DVD, a Blu-ray disk, a volatile memory (e.g., Random-Access Memory (RAM) of any type, etc.), or a non-volatile memory (e.g., FLASH memory, an HDD, etc.) associated with processor circuitry located in one or more hardware devices, but the entire program and/or parts thereof could alternatively be executed and/or instantiated by one or more hardware devices other than the processor circuitry and/or embodied in firmware or dedicated hardware. The machine-readable instructions may be distributed across multiple hardware devices, executed by two or more hardware devices (e.g., a server and a client hardware device), and/or instantiated by two or more hardware devices. For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10, 11, 12, 13, 14, and/or 15, many other methods of implementing the example AI accelerator circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable and/or instantiate-able instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, executable, and/or instantiate-able by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable and/or instantiate-able instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed and/or instantiated in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10, 11, 12, 13, 14, and/or 15 may be implemented using executable and/or instantiate-able instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10:
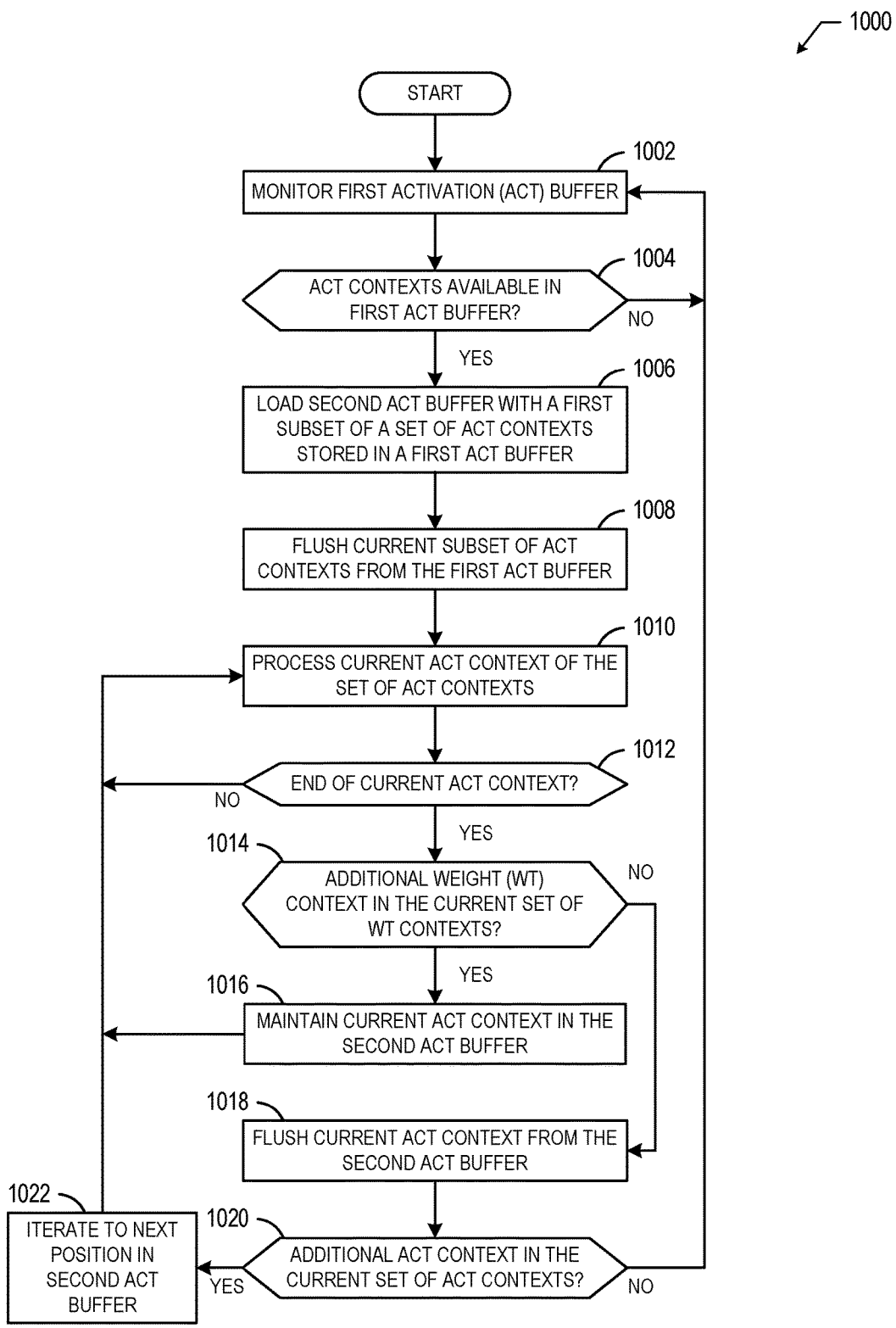
FIG. 10 is a flowchart representative of example machine-readable instructions and/or example operations that may be executed and/or instantiated by example processor circuitry to implement the example AI accelerator circuitry of FIGS. 1, 2A, and/or 2B to perform activation context processing for a weight biased asymmetric data reuse technique.

FIG. 10 is a flowchart representative of example machine-readable instructions and/or example operations 1000 that may be executed and/or instantiated by example processor circuitry to implement the example AI accelerator circuitry 108 of FIGS. 1 and/or 2 to perform activation context processing for a weight biased asymmetric data reuse technique. For example, processor circuitry may execute and/or instantiate the machine-readable instructions and/or operations 1000 for a data reuse technique with 16 activation contexts (e.g., a first type of contexts) and four weight contexts (e.g., a second type of contexts) (NTHW, NTK=16, 4).

In the illustrated example of FIG. 10, the machine-readable instructions and/or operations 1000 begin at block 1002 where the control logic circuitry 210 monitors the first activation buffer 208. At block 1004, the control logic circuitry 210 determines whether there are activation contexts available in the first activation buffer 208. In response to the control logic circuitry 210 determining that there are not contexts available in the first activation buffer 208 (block 1004: NO), the machine-readable instructions and/or operations 1000 return to block 1002. In response to the control logic circuitry 210 determining that there are contexts available in the first activation buffer 208 (block 1004: YES), the machine-readable instructions and/or operations 1000 proceed to block 1006. At block 1006, the control logic circuitry 210 loads the second activation buffer 216 with a first subset of a set of activation contexts stored in the first activation buffer 208. For example, at block 1006, the control logic circuitry 210 loads the second activation buffer 216 with a first subset of four activation contexts of a set of 16 activation contexts.

In the illustrated example of FIG. 10, at block 1008, the control logic circuitry 210 causes the first activation buffer 208 to flush the current subset of activation contexts. For example, at block 1008, the control logic circuitry 210 causes the first activation buffer 208 to delete the current subset of activation contexts. At block 1010, one or more of the MAC circuits of FIG. 2 process the current activation context of the set of activation contexts. For example, on a first iteration, at block 1010, one or more of the MAC circuits of FIG. 2 process the first activation context of the set of 16 activation contexts. As such, example MAC circuits are configured to process activation contexts.

In the illustrated example of FIG. 10, at block 1012, the control logic circuitry 210 determines if the current activation context has ended. In response to the control logic circuitry 210 determining that the current activation context has not ended (block 1012: NO), the machine-readable instructions and/or operations 1000 return to block 1010. In response to the control logic circuitry 210 determining that the current activation context has ended (block 1012: YES), the machine-readable instructions and/or operations 1000 proceed to block 1014.

In the illustrated example of FIG. 10, at block 1014, the control logic circuitry 210 determines if there are additional weight contexts (e.g., at least one additional context) to be processed in the current set of weight contexts. For example, at block 1014, the control logic circuitry 210 determines if there are additional weight contexts in the set of four weight contexts.

In such an example, at block 1014, to determine if there are additional weight contexts in the current set of weight contexts being processed, the control logic circuitry 210 determines whether the end weight context signal has been asserted. In response to the control logic circuitry 210 determining that there are additional weight contexts in the current set of weight contexts being processed (block 1014: YES), the machine-readable instructions and/or operations 1000 proceed to block 1016. At block 1016, the control logic circuitry 210 maintains the current activation context in the second activation buffer 216 to be reused by one or more of the MAC circuits of FIG. 2.

Returning to block 1014, in response to the control logic circuitry 210 determining that there are not additional weight contexts in the current set of weight contexts being processed (block 1014: NO), the machine-readable instructions and/or operations 1000 proceed to block 1018. In the example of FIG. 10, at block 1018, the control logic circuitry 210 flushes the current activation context from the second activation buffer 216. At block 1020 the control logic circuitry 210 determines if there are additional activation contexts (e.g., at least one additional context) to be processed in the current set of activation contexts. For example, at block 1020, the control logic circuitry 210 determines if there are additional activation contexts in the set of 16 activation contexts. In such an example, at block 1020, to determine if there are additional activation contexts in the current set of activation contexts being processed, the control logic circuitry 210 determines whether the end activation context signal has been asserted.

In the illustrated example of FIG. 10, in response to the control logic circuitry 210 determining that there are additional activation contexts in the current set of activation contexts being processed (block 1020: YES), the machine-readable instructions and/or operations 1000 proceed to block 1022. In the example of FIG. 10, at block 1022, the control logic circuitry 210 iterates the pointer of the second activation buffer 216 to the next position. If the pointer of the second activation buffer 216 is at the end of the second activation buffer 216, at block 1022, the control logic circuitry 210 iterates the pointer of the second activation buffer 216 to the beginning of the second activation buffer 216. After block 1022, the machine-readable instructions and/or operations 1000 return to block 1010 where one or more of the MAC circuits of FIG. 2 process the next activation context stored in the second activation buffer 216. For example, on a second iteration, at block 1010, one or more of the MAC circuits of FIG. 2 process the second activation context of the set of 16 activation contexts.

In the illustrated example of FIG. 10, while one or more of the MAC circuits of FIG. 2 process the next activation context stored in the second activation buffer 216, the control logic circuitry 210 loads the second activation buffer 216 with the next activation context (e.g., a next context) that is after the current subset of activation contexts stored in the second activation buffer 216. For example, on a first iteration, the control logic circuitry 210 loads the fifth activation context of the set of 16 activation contexts as the second activation buffer 216 currently stores the second activation context, the third activation context, and the fourth activation context. In the example of FIG. 10, after loading the next activation context that is after the current subset of activation contexts into the second activation buffer 216, the control logic circuitry 210 flushes the next activation context that is after the current subset of activation contexts from the first activation buffer 208. Returning to block 1020, in response to the control logic circuitry 210 determining that there are not additional activation contexts in the current set of activation contexts being processed (block 1020: NO), the machine-readable instructions and/or operations 1000 return to block 1002.

Figure 11:
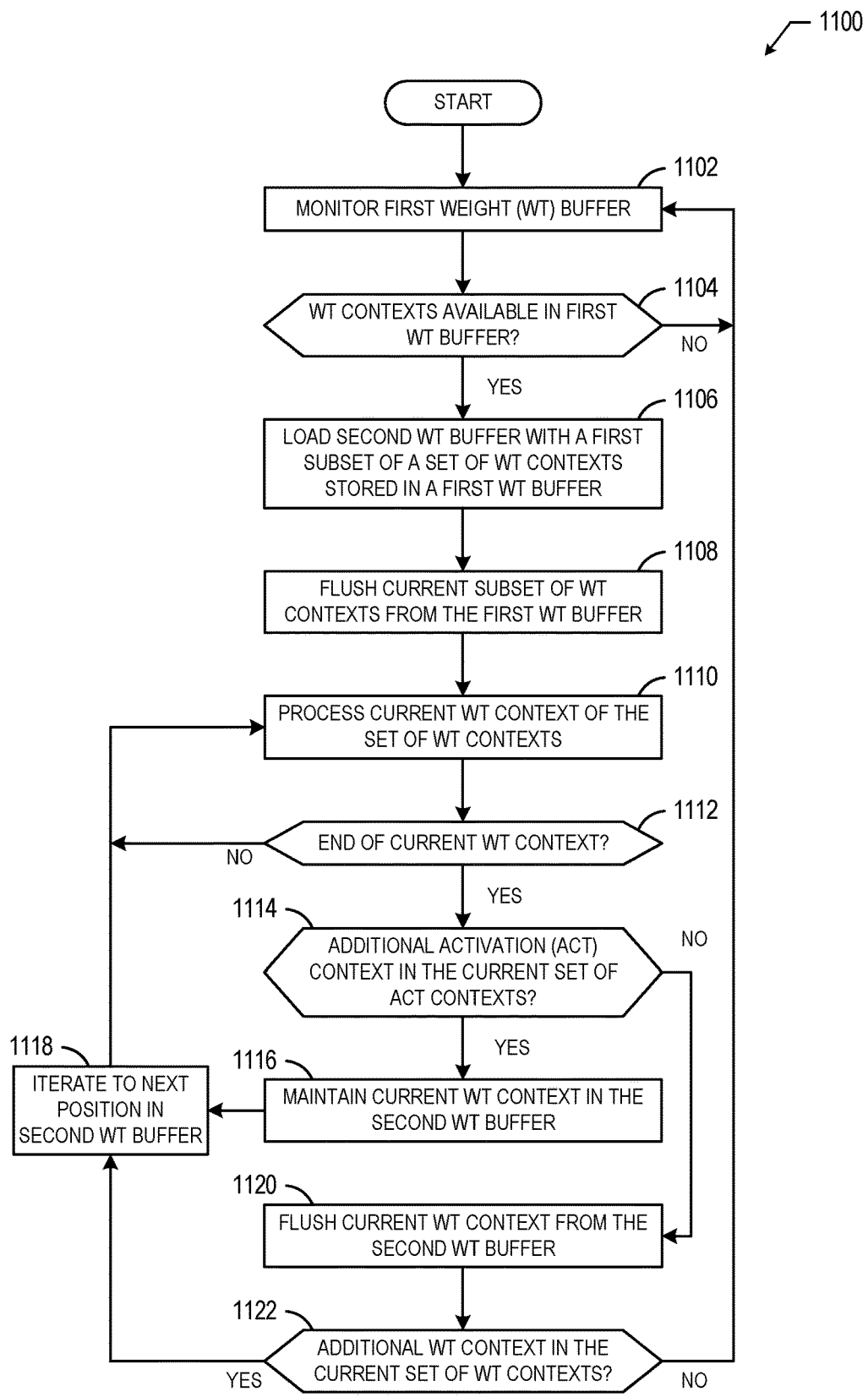
FIG. 11 is a flowchart representative of example machine-readable instructions and/or example operations that may be executed and/or instantiated by example processor circuitry to implement the example AI accelerator circuitry of FIGS. 1, 2A, and/or 2B to perform weight context processing for a weight biased asymmetric data reuse technique.

FIG. 11 is a flowchart representative of example machine-readable instructions and/or example operations 1100 that may be executed and/or instantiated by example processor circuitry to implement the example AI accelerator circuitry 108 of FIGS. 1 and/or 2 to perform weight context processing for a weight biased asymmetric data reuse technique. For example, processor circuitry may execute and/or instantiate the machine-readable instructions and/or operations 1100 for a data reuse technique with 16 activation contexts (e.g., a first type of contexts) and four weight contexts (e.g., a second type of contexts) (NTHW, NTK=16, 4).

In the illustrated example of FIG. 11, the machine-readable instructions and/or operations 1100 begin at block 1102 where the control logic circuitry 210 monitors the first weight buffer 206. At block 1104, the control logic circuitry 210 determines whether there are weight contexts available in the first weight buffer 206. In response to the control logic circuitry 210 determining that there are not contexts available in the first weight buffer 206 (block 1104: NO), the machine-readable instructions and/or operations 1100 return to block 1102. In response to the control logic circuitry 210 determining that there are contexts available in the first weight buffer 206 (block 1104: YES), the machine-readable instructions and/or operations 1100 proceed to block 1106. At block 1106, the control logic circuitry 210 loads the second weight buffer 212 with a first subset of a set of weight contexts stored in the first weight buffer 206. For example, at block 1106, the control logic circuitry 210 loads the second weight buffer 212 with a first subset of four weight contexts of a set of four weight contexts. In such an example, the subset of the weight contexts is equal to the set of weight contexts.

In the illustrated example of FIG. 11, at block 1108, the control logic circuitry 210 causes the first weight buffer 206 to flush the current subset of weight contexts. For example, at block 1108, the control logic circuitry 210 causes the first weight buffer 206 to delete the current subset of weight contexts. At block 1110, one or more of the MAC circuits of FIG. 2 process the current weight context of the set of weight contexts. For example, on a first iteration, at block 1110, one or more of the MAC circuits of FIG. 2 process the first weight context of the set of four weight contexts. As such, example MAC circuits are configured to process weight contexts.

In the illustrated example of FIG. 11, at block 1112, the control logic circuitry 210 determines if the current weight context has ended. In response to the control logic circuitry 210 determining that the current weight context has not ended (block 1112: NO), the machine-readable instructions and/or operations 1100 return to block 1110. In response to the control logic circuitry 210 determining that the current weight context has ended (block 1112: YES), the machine-readable instructions and/or operations 1100 proceed to block 1114.

In the illustrated example of FIG. 11, at block 1114, the control logic circuitry 210 determines if there are additional activation contexts (e.g., at least one additional context) to be processed in the current set of activation contexts. For example, at block 1114, the control logic circuitry 210 determines if there are additional activation contexts in the set of 16 activation contexts. In such an example, at block 1114, to determine if there are additional activation contexts in the current set of activation contexts being processed, the control logic circuitry 210 determines whether the end activation context signal has been asserted. In response to the control logic circuitry 210 determining that there are additional activation contexts in the current set of activation contexts being processed (block 1114: YES), the machine-readable instructions and/or operations 1100 proceed to block 1116. At block 1116, the control logic circuitry 210 maintains the current weight context in the second weight buffer 212. After block 1116, the machine-readable instructions and/or operations 1100 proceed to block 1118 where the control logic circuitry 210 iterates the pointer of the second weight buffer 212 to the next position. If the pointer of the second weight buffer 212 is at the end of the second weight buffer 212, at block 1118, the control logic circuitry 210 iterates the pointer of the second weight buffer 212 to the beginning of the second weight buffer 212.

Returning to block 1114, in response to the control logic circuitry 210 determining that there are not additional activation contexts in the current set of activation contexts being processed (block 1114: NO), the machine-readable instructions and/or operations 1100 proceed to block 1120. In the example of FIG. 11, at block 1120, the control logic circuitry 210 flushes the current weight context from the second weight buffer 212. At block 1122, the control logic circuitry 210 determines if there are additional weight contexts (e.g., at least one additional context) to be processed in the current set of weight contexts. For example, at block 1122, the control logic circuitry 210 determines if there are additional weight contexts in the set of four weight contexts. In such an example, at block 1122, to determine if there are additional weight contexts in the current set of weight contexts being processed, the control logic circuitry 210 determines whether the end weight context signal has been asserted.

In the illustrated example of FIG. 11, in response to the control logic circuitry 210 determining that there are additional weight contexts in the current set of weight contexts being processed (block 1122: YES), the machine-readable instructions and/or operations 1100 return to block 1118. In response to the control logic circuitry 210 determining that there are not additional weight contexts in the current set of weight contexts being processed (block 1122: NO), the machine-readable instructions and/or operations 1100 return to block 1102.

Figure 12:
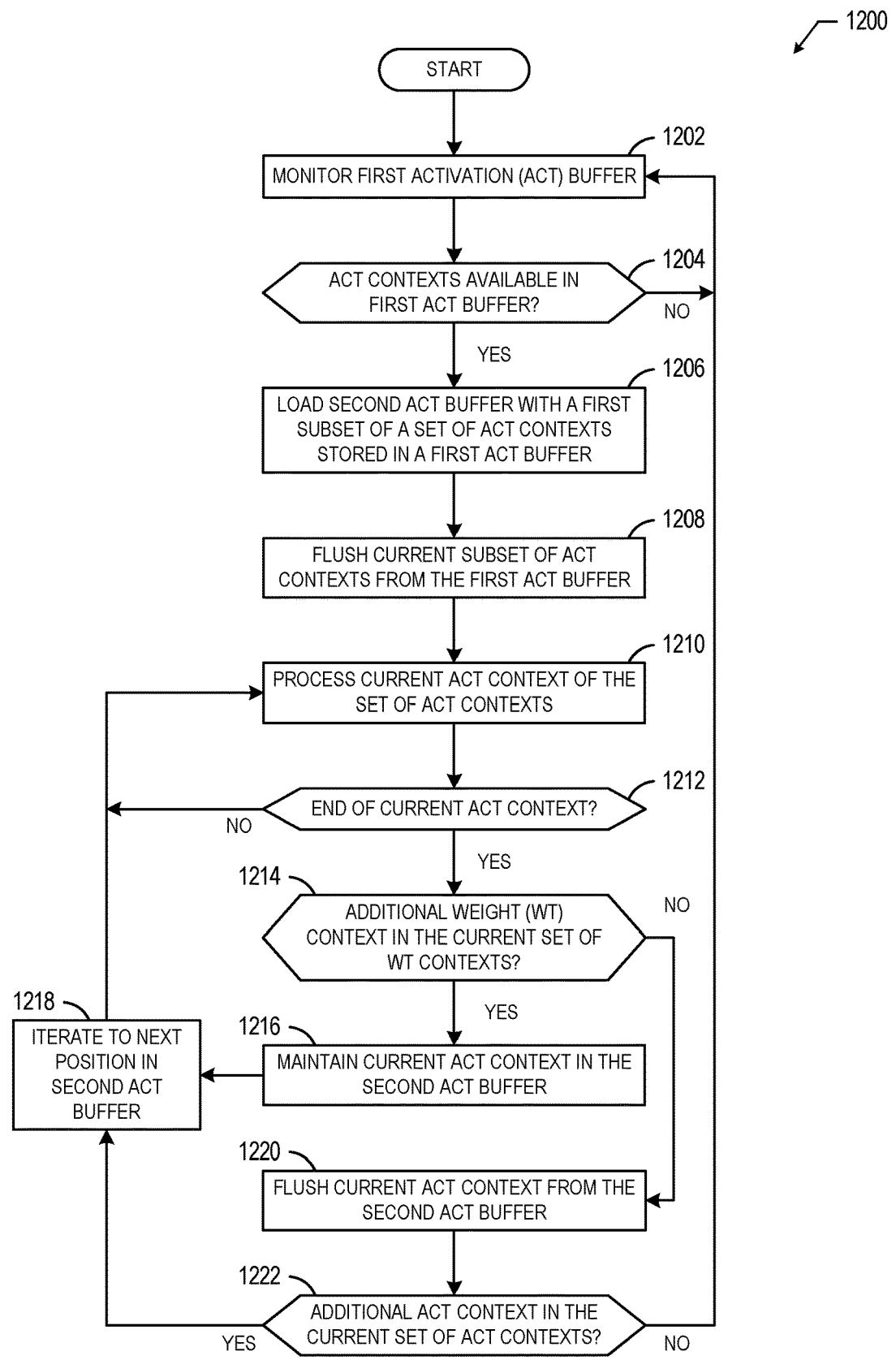
FIG. 12 is a flowchart representative of example machine-readable instructions and/or example operation that may be executed and/or instantiated by example processor circuitry to implement the example AI accelerator circuitry of FIGS. 1, 2A, and/or 2B to perform activation context processing for an activation biased asymmetric data reuse technique.

FIG. 12 is a flowchart representative of example machine-readable instructions and/or example operation 1200 that may be executed and/or instantiated by example processor circuitry to implement the example AI accelerator circuitry 108 of FIGS. 1 and/or 2 to perform activation context processing for an activation biased asymmetric data reuse technique. For example, processor circuitry may execute and/or instantiate the machine-readable instructions and/or operations 1200 for a data reuse technique with four activation contexts (e.g., a second type of contexts) and 16 weight contexts (e.g., a first type of contexts) (NTHW, NTK=4, 16).

In the illustrated example of FIG. 12, the machine-readable instructions and/or operations 1200 begin at block 1202 where the control logic circuitry 210 monitors the first activation buffer 208. At block 1204, the control logic circuitry 210 determines whether there are activation contexts available in the first activation buffer 208. In response to the control logic circuitry 210 determining that there are not contexts available in the first activation buffer 208 (block 1204: NO), the machine-readable instructions and/or operations 1200 return to block 1202. In response to the control logic circuitry 210 determining that there are contexts available in the first activation buffer 208 (block 1204: YES), the machine-readable instructions and/or operations 1200 proceed to block 1206. At block 1206, the control logic circuitry 210 loads the second activation buffer 216 with a first subset of a set of activation contexts stored in the first activation buffer 208. For example, at block 1206, the control logic circuitry 210 loads the second activation buffer 216 with a first subset of four activation contexts of a set of four activation contexts. In such an example, the subset of the activation contexts is equal to the set of activation contexts.

In the illustrated example of FIG. 12, at block 1208, the control logic circuitry 210 causes the first activation buffer 208 to flush the current subset of activation contexts. For example, at block 1208, the control logic circuitry 210 causes the first activation buffer 208 to delete the current subset of activation contexts. At block 1210, one or more of the MAC circuits of FIG. 2 process the current activation context of the set of activation contexts. For example, on a first iteration, at block 1210, one or more of the MAC circuits of FIG. 2 process the first activation context of the set of four activation contexts. As such, example MAC circuits are configured to process activation contexts.

In the illustrated example of FIG. 12, at block 1212, the control logic circuitry 210 determines if the current activation context has ended. In response to the control logic circuitry 210 determining that the current activation context has not ended (block 1212: NO), the machine-readable instructions and/or operations 1200 return to block 1210. In response to the control logic circuitry 210 determining that the current activation context has ended (block 1212: YES), the machine-readable instructions and/or operations 1200 proceed to block 1214.

In the illustrated example of FIG. 12, at block 1214, the control logic circuitry 210 determines if there are additional weight contexts (e.g., at least one additional context) to be processed in the current set of weight contexts. For example, at block 1214, the control logic circuitry 210 determines if there are additional weight contexts in the set of 16 weight contexts. In such an example, at block 1214, to determine if there are additional weight contexts in the current set of weight contexts being processed, the control logic circuitry 210 determines whether the end weight context signal has been asserted. In response to the control logic circuitry 210 determining that there are additional weight contexts in the current set of weight contexts being processed (block 1214: YES), the machine-readable instructions and/or operations 1200 proceed to block 1216. At block 1216, the control logic circuitry 210 maintains the current activation context in the second activation buffer 216. After block 1216, the machine-readable instructions and/or operations 1200 proceed to block 1218 where the control logic circuitry 210 iterates the pointer of the second activation buffer 216 to the next position. If the pointer of the second activation buffer 216 is at the end of the second activation buffer 216, at block 1218, the control logic circuitry 210 iterates the pointer of the second activation buffer 216 to the beginning of the second activation buffer 216.

Returning to block 1214, in response to the control logic circuitry 210 determining that there are not additional weight contexts in the current set of weight contexts being processed (block 1214: NO), the machine-readable instructions and/or operations 1200 proceed to block 1220. In the example of FIG. 12, at block 1220, the control logic circuitry 210 flushes the current activation context from the second activation buffer 216. At block 1222, the control logic circuitry 210 determines if there are additional activation contexts (e.g., at least one additional context) to be processed in the current set of activation contexts. For example, at block 1222, the control logic circuitry 210 determines if there are additional activation contexts in the set of four activation contexts. In such an example, at block 1222, to determine if there are additional activation contexts in the current set of activation contexts being processed, the control logic circuitry 210 determines whether the end activation context signal has been asserted.

In the illustrated example of FIG. 12, in response to the control logic circuitry 210 determining that there are additional activation contexts in the current set of activation contexts being processed (block 1222: YES), the machine-readable instructions and/or operations 1200 return to block 1218. In response to the control logic circuitry 210 determining that there are not additional activation contexts in the current set of activation contexts being processed (block 1222: NO), the machine-readable instructions and/or operations 1200 return to block 1102.

Figure 13:
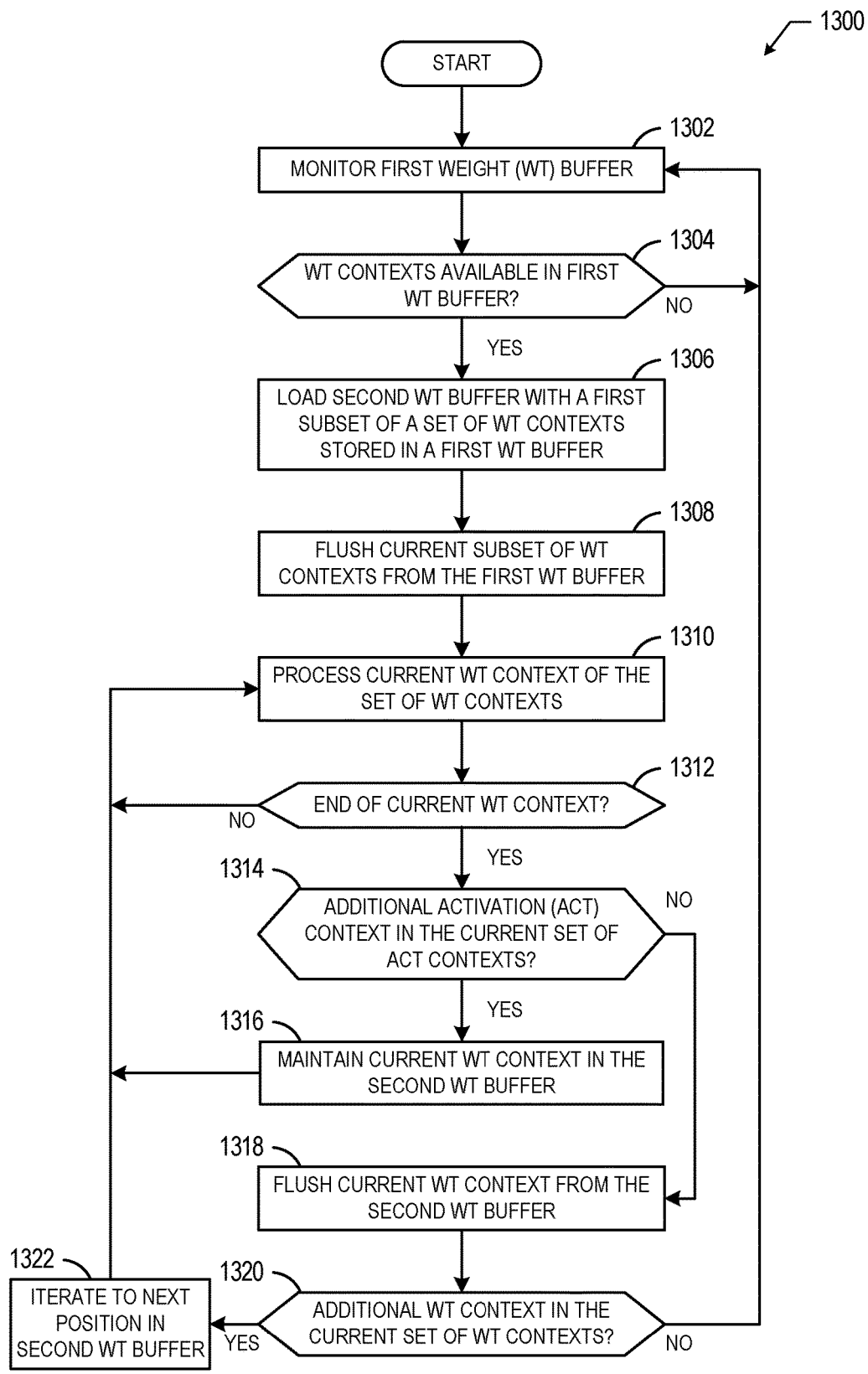
FIG. 13 is a flowchart representative of example machine-readable instructions and/or example operations that may be executed and/or instantiated by example processor circuitry to implement the example AI accelerator circuitry of FIGS. 1, 2A, and/or 2B to perform weight context processing for an activation biased asymmetric data reuse technique.

FIG. 13 is a flowchart representative of example machine-readable instructions and/or example operations 1300 that may be executed and/or instantiated by example processor circuitry to implement the example AI accelerator circuitry 108 of FIGS. 1 and/or 2 to perform weight context processing for an activation biased asymmetric data reuse technique. For example, processor circuitry may execute and/or instantiate the machine-readable instructions and/or operations 1300 for a data reuse technique with four activation contexts (e.g., a second type of contexts) and sixteen weight contexts (e.g., a first type of contexts) (NTHW, NTK=4, 16).

In the illustrated example of FIG. 13, the machine-readable instructions and/or operations 1300 begin at block 1302 where the control logic circuitry 210 monitors the first weight buffer 206. At block 1304, the control logic circuitry 210 determines whether there are weight contexts available in the first weight buffer 206. In response to the control logic circuitry 210 determining that there are not contexts available in the first weight buffer 206 (block 1304: NO), the machine-readable instructions and/or operations 1300 return to block 1302. In response to the control logic circuitry 210 determining that there are contexts available in the first weight buffer 206 (block 1304: YES), the machine-readable instructions and/or operations 1300 proceed to block 1306. At block 1306, the control logic circuitry 210 loads the second weight buffer 212 with a first subset of a set of weight contexts stored in the first weight buffer 206. For example, at block 1306, the control logic circuitry 210 loads the second weight buffer 212 with a first subset of four weight contexts of a set of 16 weight contexts.

In the illustrated example of FIG. 13, at block 1308, the control logic circuitry 210 causes the first weight buffer 206 to flush the current subset of weight contexts. For example, at block 1308, the control logic circuitry 210 causes the first weight buffer 206 to delete the current subset of weight contexts. At block 1310, one or more of the MAC circuits of FIG. 2 process the current weight context of the set of weight contexts. For example, on a first iteration, at block 1310, one or more of the MAC circuits of FIG. 2 process the first weight context of the set of 16 weight contexts. As such, example MAC circuits are configured to process weight contexts.

In the illustrated example of FIG. 13, at block 1312, the control logic circuitry 210 determines if the current weight context has ended. In response to the control logic circuitry 210 determining that the current weight context has not ended (block 1312: NO), the machine-readable instructions and/or operations 1300 return to block 1310. In response to the control logic circuitry 210 determining that the current weight context has ended (block 1312: YES), the machine-readable instructions and/or operations 1300 proceed to block 1314.

In the illustrated example of FIG. 13, at block 1314, the control logic circuitry 210 determines if there are additional activation contexts (e.g., at least one additional context) to be processed in the current set of activation contexts. For example, at block 1314, the control logic circuitry 210 determines if there are additional activation contexts in the set of four activation contexts. In such an example, at block 1314, to determine if there are additional activation contexts in the current set of activation contexts being processed, the control logic circuitry 210 determines whether the end activation context signal has been asserted. In response to the control logic circuitry 210 determining that there are additional activation contexts in the current set of activation contexts being processed (block 1314: YES), the machine-readable instructions and/or operations 1300 proceed to block 1316. At block 1316, the control logic circuitry 210 maintains the current weight context in the second weight buffer 212 to be reused by one or more of the MAC circuits of FIG. 2.

Returning to block 1314, in response to the control logic circuitry 210 determining that there are not additional activation contexts in the current set of activation contexts being processed (block 1314: NO), the machine-readable instructions and/or operations 1300 proceed to block 1318. In the example of FIG. 13, at block 1318, the control logic circuitry 210 flushes the current weight context from the second weight buffer 212. At block 1320 the control logic circuitry 210 determines if there are additional weight contexts (e.g., at least one additional context) to be processed in the current set of weight contexts. For example, at block 1320, the control logic circuitry 210 determines if there are additional weight contexts in the set of 16 weight contexts. In such an example, at block 1320, to determine if there are additional weight contexts in the current set of weight contexts being processed, the control logic circuitry 210 determines whether the end weight context signal has been asserted.

In the illustrated example of FIG. 13, in response to the control logic circuitry 210 determining that there are additional weight contexts in the current set of weight contexts being processed (block 1320: YES), the machine-readable instructions and/or operations 1300 proceed to block 1322. In the example of FIG. 13, at block 1322, the control logic circuitry 210 iterates the pointer of the second weight buffer 212 to the next position. If the pointer of the second weight buffer 212 is at the end of the second weight buffer 212, at block 1322, the control logic circuitry 210 iterates the pointer of the second weight buffer 212 to the beginning of the second weight buffer 212. After block 1322, the machine-readable instructions and/or operations 1300 return to block 1310 where one or more of the MAC circuits of FIG. 2 process the next weight context stored in the second weight buffer 212. For example, on a second iteration, at block 1310, one or more of the MAC circuits of FIG. 2 process the second weight context of the set of 16 weight contexts.

In the illustrated example of FIG. 13, while one or more of the MAC circuits of FIG. 2 process the next weight context (e.g., a next context) stored in the second weight buffer 212, the control logic circuitry 210 loads the second weight buffer 212 with the next weight context that is after the current subset of weight contexts stored in the second weight buffer 212. For example, on a first iteration, the control logic circuitry 210 loads the fifth weight context of the set of 16 weight contexts as the second weight buffer 212 currently stores the second weight context, the third weight context, and the fourth weight context. In the example of FIG. 13, after the control logic circuitry 210 loads the next weight context that is after the current subset of weight contexts stored in the second weight buffer 212, the control logic circuitry 210 flushes the next weight context that is after the current subset of weight contexts from the first weight buffer 206. Returning to block 1320, in response to the control logic circuitry 210 determining that there are not additional weight contexts in the current set of weight contexts being processed (block 1320: NO), the machine-readable instructions and/or operations 1300 return to block 1102.

Figure 14:
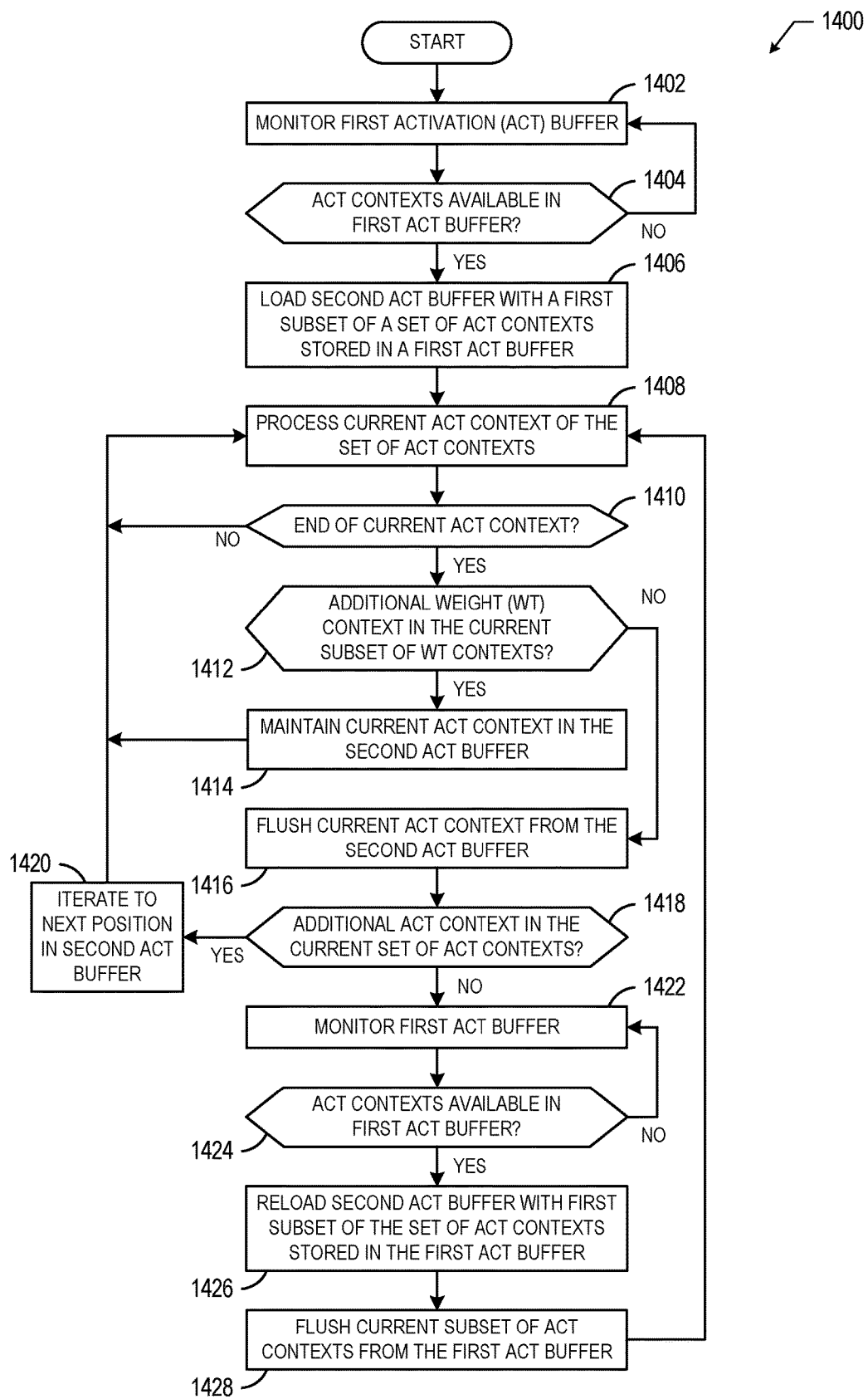
FIG. 14 is a flowchart representative of example machine-readable instructions and/or example operations that may be executed by example processor circuitry to implement the example AI accelerator circuitry of FIGS. 1, 2A, and/or 2B to perform activation context processing for a symmetric data reuse technique.

FIG. 14 is a flowchart representative of example machine-readable instructions and/or example operations 1400 that may be executed by example processor circuitry to implement the example AI accelerator circuitry 108 of FIGS. 1 and/or 2 to perform activation context processing for a symmetric data reuse technique. For example, processor circuitry may execute and/or instantiate the machine-readable instructions and/or operations 1400 for a data reuse technique with eight activation contexts and eight weight contexts (NTHW, NTK=8, 8).

In the illustrated example of FIG. 14, the machine-readable instructions and/or operations 1400 begin at block 1402 where the control logic circuitry 210 monitors the first activation buffer 208. At block 1404, the control logic circuitry 210 determines whether there are activation contexts available in the first activation buffer 208. In response to the control logic circuitry 210 determining that there are not contexts available in the first activation buffer 208 (block 1404: NO), the machine-readable instructions and/or operations 1400 return to block 1402. In response to the control logic circuitry 210 determining that there are contexts available in the first activation buffer 208 (block 1404: YES), the machine-readable instructions and/or operations 1400 proceed to block 1406. At block 1406, the control logic circuitry 210 loads the second activation buffer 216 with a first subset of a set of activation contexts stored in the first activation buffer 208. For example, at block 1406, the control logic circuitry 210 loads the second activation buffer 216 with a first subset of four activation contexts of a set of eight activation contexts.

In the illustrated example of FIG. 14, at block 1408, one or more of the MAC circuits of FIG. 2 process the current activation context of the set of activation contexts. For example, on a first iteration, at block 1408, one or more of the MAC circuits of FIG. 2 process the first activation context of the set of eight activation contexts. In the example of FIG. 14, at block 1410, the control logic circuitry 210 determines if the current activation context has ended. In response to the control logic circuitry 210 determining that the current activation context has not ended (block 1410: NO), the machine-readable instructions and/or operations 1400 return to block 1408. In response to the control logic circuitry 210 determining that the current activation context has ended (block 1410: YES), the machine-readable instructions and/or operations 1400 proceed to block 1412.

In the illustrated example of FIG. 14, at block 1412, the control logic circuitry 210 determines if there is an additional weight context in the current subset of weight contexts being processed. For example, at block 1412, the control logic circuitry 210 determines if there is an additional weight context in the subset of eight weight contexts. As described above, in symmetric reuse configurations, the data read circuitry 114 transmits a start weight context signal and an end weight context signal with each subset of four weight contexts and the corresponding sparsity bitmap. In such an example, at block 1412, to determine if there is an additional weight context in the current subset of weight contexts being processed, the control logic circuitry 210 determines whether the end weight context signal has been asserted. In response to the control logic circuitry 210 determining that there is an additional weight context in the current subset of weight contexts being processed (block 1412: YES), the machine-readable instructions and/or operations 1400 proceed to block 1414. At block 1414, the control logic circuitry 210 maintains the current activation context in the second activation buffer 216 to be reused by one or more of the MAC circuits of FIG. 2. After block 1414, the machine-readable instructions and/or operations 1400 return to block 1408.

Returning to block 1412, in response to the control logic circuitry 210 determining that there is not an additional weight context in the current subset of weight contexts being processed (block 1412: NO), the machine-readable instructions and/or operations 1400 proceed to block 1416. In the example of FIG. 14, at block 1416, the control logic circuitry 210 flushes the current activation context from the second activation buffer 216. At block 1418, the control logic circuitry 210 determines if there are additional activation contexts in the current set of activation contexts being processed. For example, at block 1418, the control logic circuitry 210 determines if there are additional activation contexts in the set of eight activation contexts. In such an example, at block 1418, to determine if there are additional activation contexts in the current set of activation contexts being processed, the control logic circuitry 210 determines whether the end activation context signal has been asserted.

In the illustrated example of FIG. 14, in response to the control logic circuitry 210 determining that there are additional activation contexts in the current set of activation contexts being processed (block 1418: YES), the machine-readable instructions and/or operations 1400 proceed to block 1420. In the example of FIG. 14, at block 1420, the control logic circuitry 210 iterates the pointer of the second activation buffer 216 to the next position. If the pointer of the second activation buffer 216 is at the end of the second activation buffer 216, at block 1420, the control logic circuitry 210 iterates the pointer of the second activation buffer 216 to the beginning of the second activation buffer 216. After block 1420, the machine-readable instructions and/or operations 1400 return to block 1408 where one or more of the MAC circuits of FIG. 2 process the next activation context stored in the second activation buffer 216. For example, on a second iteration, at block 1408, one or more of the MAC circuits of FIG. 2 process the second activation context of the set of eight activation contexts.

In the illustrated example of FIG. 14, while one or more of the MAC circuits of FIG. 2 process the next activation context stored in the second activation buffer 216, the control logic circuitry 210 loads the second activation buffer 216 with the next activation context that is after the current subset of activation contexts stored in the second activation buffer 216. For example, on a first iteration, the control logic circuitry 210 loads the fifth activation context of the set of eight activation contexts as the second activation buffer 216 currently stores the second activation context, the third activation context, and the fourth activation context. Returning to block 1418, in response to the control logic circuitry 210 determining that there are not additional activation contexts in the current set of activation contexts being processed (block 1418: NO), the machine-readable instructions and/or operations 1400 proceed to block 1422.

In the illustrated example of FIG. 14, at block 1422, the control logic circuitry 210 monitors the first activation buffer 208. At block 1424, the control logic circuitry 210 determines whether there are activation contexts available in the first activation buffer 208. In response to the control logic circuitry 210 determining that there are not contexts available in the first activation buffer 208 (block 1424: NO), the machine-readable instructions and/or operations 1400 return to block 1422. In response to the control logic circuitry 210 determining that there are contexts available in the first activation buffer 208 (block 1424: YES), the machine-readable instructions and/or operations 1400 proceed to block 1428. At block 1426, the control logic circuitry 210 reloads the second activation buffer 216 with the first subset of the set of activation contexts stored in the first activation buffer 208. For example, at block 1426, the control logic circuitry 210 loads the second activation buffer 216 with the first subset of four activation contexts of the set of eight activation contexts. At block 1428, the control logic circuitry 210 causes the first activation buffer 208 to flush the current subset of activation contexts. For example, at block 1428, the control logic circuitry 210 causes the first activation buffer 208 to delete the current subset of activation contexts. After block 1428, the machine-readable instructions and/or operations 1400 return to block 1408 where one or more of the MAC circuits of FIG. 2 process the current activation context of the set of activation contexts. For example, on a first iteration, at block 1424, one or more of the MAC circuits of FIG. 2 process the first activation context of the set of eight activation contexts.

Figure 15:
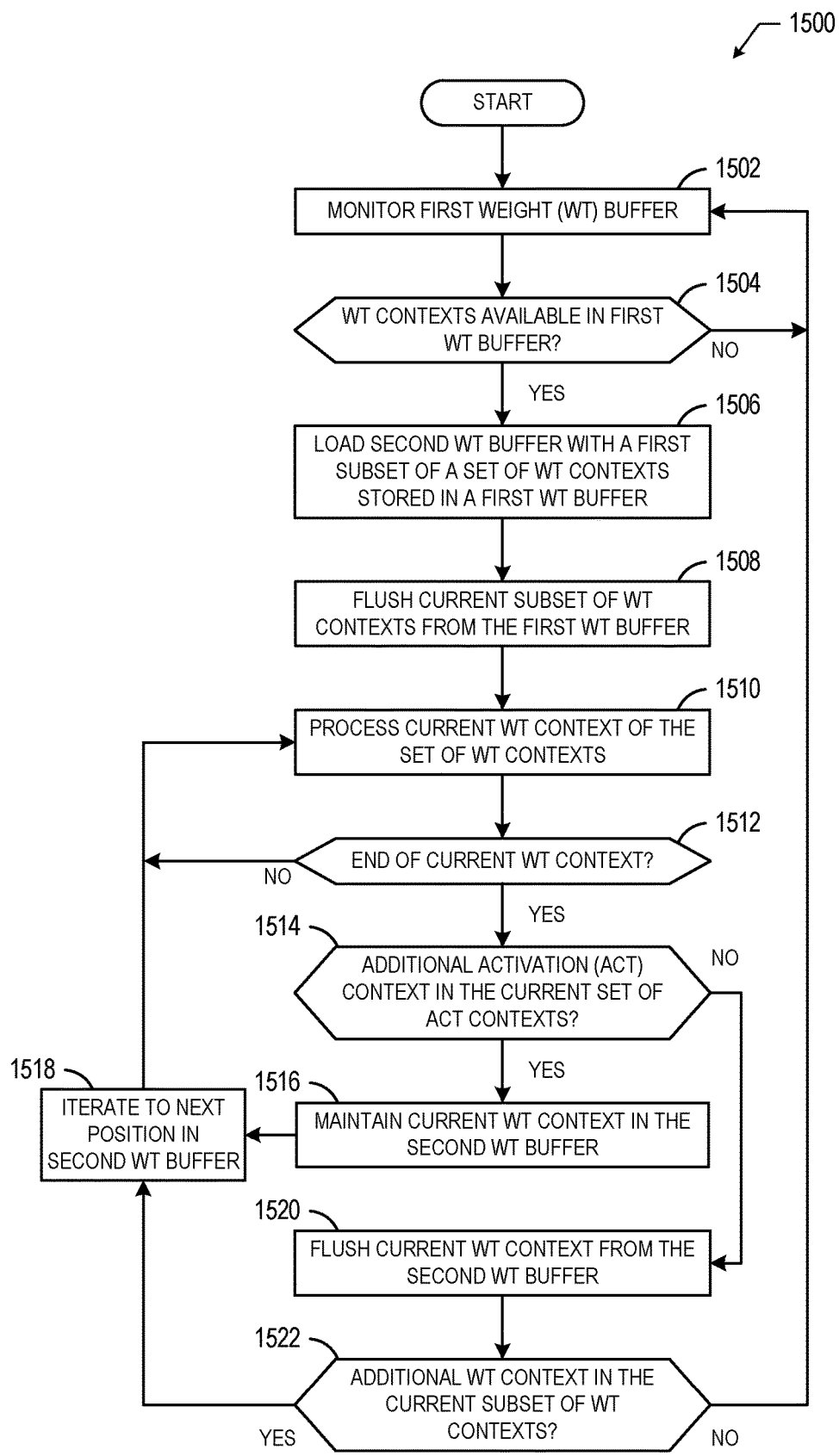
FIG. 15 is a flowchart representative of example machine-readable instructions and/or example operations that may be executed by example processor circuitry to implement the example AI accelerator circuitry of FIGS. 1, 2A, and/or 2B to perform weight context processing for a symmetric data reuse technique.

FIG. 15 is a flowchart representative of example machine-readable instructions and/or example operations 1500 that may be executed by example processor circuitry to implement the example AI accelerator circuitry 108 of FIGS. 1 and/or 2 to perform weight context processing for a symmetric data reuse technique. For example, processor circuitry may execute and/or instantiate the machine-readable instructions and/or operations 1500 for a data reuse technique with eight activation contexts and eight weight contexts (NTHW, NTK=8, 8).

In the illustrated example of FIG. 15, the machine-readable instructions and/or operations 1500 begin at block 1502 where the control logic circuitry 210 monitors the first weight buffer 206. At block 1504, the control logic circuitry 210 determines whether there are weight contexts available in the first weight buffer 206. In response to the control logic circuitry 210 determining that there are not contexts available in the first weight buffer 206 (block 1504: NO), the machine-readable instructions and/or operations 1500 return to block 1502. In response to the control logic circuitry 210 determining that there are contexts available in the first weight buffer 206 (block 1504: YES), the machine-readable instructions and/or operations 1500 proceed to block 1506. At block 1506, the control logic circuitry 210 loads the second weight buffer 212 with a first subset of a set of weight contexts stored in the first weight buffer 206. For example, at block 1506, the control logic circuitry 210 loads the second weight buffer 212 with a first subset of four weight contexts of a set of eight weight contexts. In the example of FIG. 15, at block 1508, the control logic circuitry 210 causes the first weight buffer 206 to flush the current subset of weight contexts. For example, at block 1508, the control logic circuitry 210 causes the first weight buffer 206 to delete the current subset of weight contexts. At block 1510, one or more of the MAC circuits of FIG. 2 process the current weight context of the set of weight contexts. For example, on a first iteration, at block 1510, one or more of the MAC circuits of FIG. 2 process the first weight context of the set of eight weight contexts.

In the illustrated example of FIG. 15 at block 1512, the control logic circuitry 210 determines if the current weight context has ended. In response to the control logic circuitry 210 determining that the current weight context has not ended (block 1512: NO), the machine-readable instructions and/or operations 1500 return to block 1510. In response to the control logic circuitry 210 determining that the current weight context has ended (block 1512: YES), the machine-readable instructions and/or operations 1500 proceed to block 1514.

In the illustrated example of FIG. 15, at block 1514, the control logic circuitry 210 determines if there are additional activation contexts in the current set of activation contexts being processed. For example, at block 1514, the control logic circuitry 210 determines if there are additional activation contexts in the set of eight activation contexts. In such an example, at block 1514, to determine if there are additional activation contexts in the current set of activation contexts being processed, the control logic circuitry 210 determines whether the end activation context signal has been asserted. In response to the control logic circuitry 210 determining that there are additional activation contexts in the current set of activation contexts being processed (block 1514: YES), the machine-readable instructions and/or operations 1500 proceed to block 1516. At block 1516, the control logic circuitry 210 maintains the current weight context in the second weight buffer 212. After block 1516, the machine-readable instructions and/or operations 1500 proceed to block 1518 where the control logic circuitry 210 iterates the pointer of the second weight buffer 212 to the next position. If the pointer of the second weight buffer 212 is at the end of the second weight buffer 212, at block 1518, the control logic circuitry 210 iterates the pointer of the second weight buffer 212 to the beginning of the second weight buffer 212.

Returning to block 1514, in response to the control logic circuitry 210 determining that there are not additional activation contexts in the current set of activation contexts being processed (block 1514: NO), the machine-readable instructions and/or operations 1500 proceed to block 1520. In the example of FIG. 15, at block 1520, the control logic circuitry 210 flushes the current weight context from the second weight buffer 212. At block 1522, the control logic circuitry 210 determines if there are additional weight contexts in the current subset of weight contexts being processed. For example, at block 1522, the control logic circuitry 210 determines if there are additional weight contexts in the current subset of four weight contexts. In such an example, at block 1522, to determine if there are additional weight contexts in the current subset of weight contexts being processed, the control logic circuitry 210 determines whether the end weight context signal has been asserted.

In the illustrated example of FIG. 15, in response to the control logic circuitry 210 determining that there are additional weight contexts in the current subset of weight contexts being processed (block 1522: YES), the machine-readable instructions and/or operations 1500 return to block 1518. As described above, at block 1518, the control logic circuitry 210 iterates the pointer of the second weight buffer 212 to the next position. Additionally, as described above, if the pointer of the second weight buffer 212 is at the end of the second weight buffer 212, at block 1518, the control logic circuitry 210 iterates the pointer of the second weight buffer 212 to the beginning of the second weight buffer 212. After block 1518, the machine-readable instructions and/or operations 1500 return to block 1510 where one or more of the MAC circuits of FIG. 2 process next weight context stored in the second weight buffer 212.

In the illustrated example of FIG. 15, while one or more of the MAC circuits of FIG. 2 process the next weight context stored in the second weight buffer 212, the control logic circuitry 210 loads the second weight buffer 212 with the next weight context that is after the current subset of weight contexts stored in the second weight buffer 212. For example, on a first iteration, the control logic circuitry 210 loads the fifth weight context of the set of eight weight contexts as the second weight buffer 212 currently stores the second weight context, the third weight context, and the fourth weight context. In the illustrated example of FIG. 15, after the control logic circuitry 210 has loaded the second weight buffer 212 with the next weight context that is after the current subset of weight contexts stored in the second weight buffer 212, the control logic circuitry 210 flushes the next weight context that is after the current subset of weight contexts from the first weight buffer 206. Returning to block 1522, in response to the control logic circuitry 210 determining that there are not additional weight contexts in the current subset of weight contexts being processed (block 1522: NO), the machine-readable instructions and/or operations 1500 return to block 1502.

Figure 16:
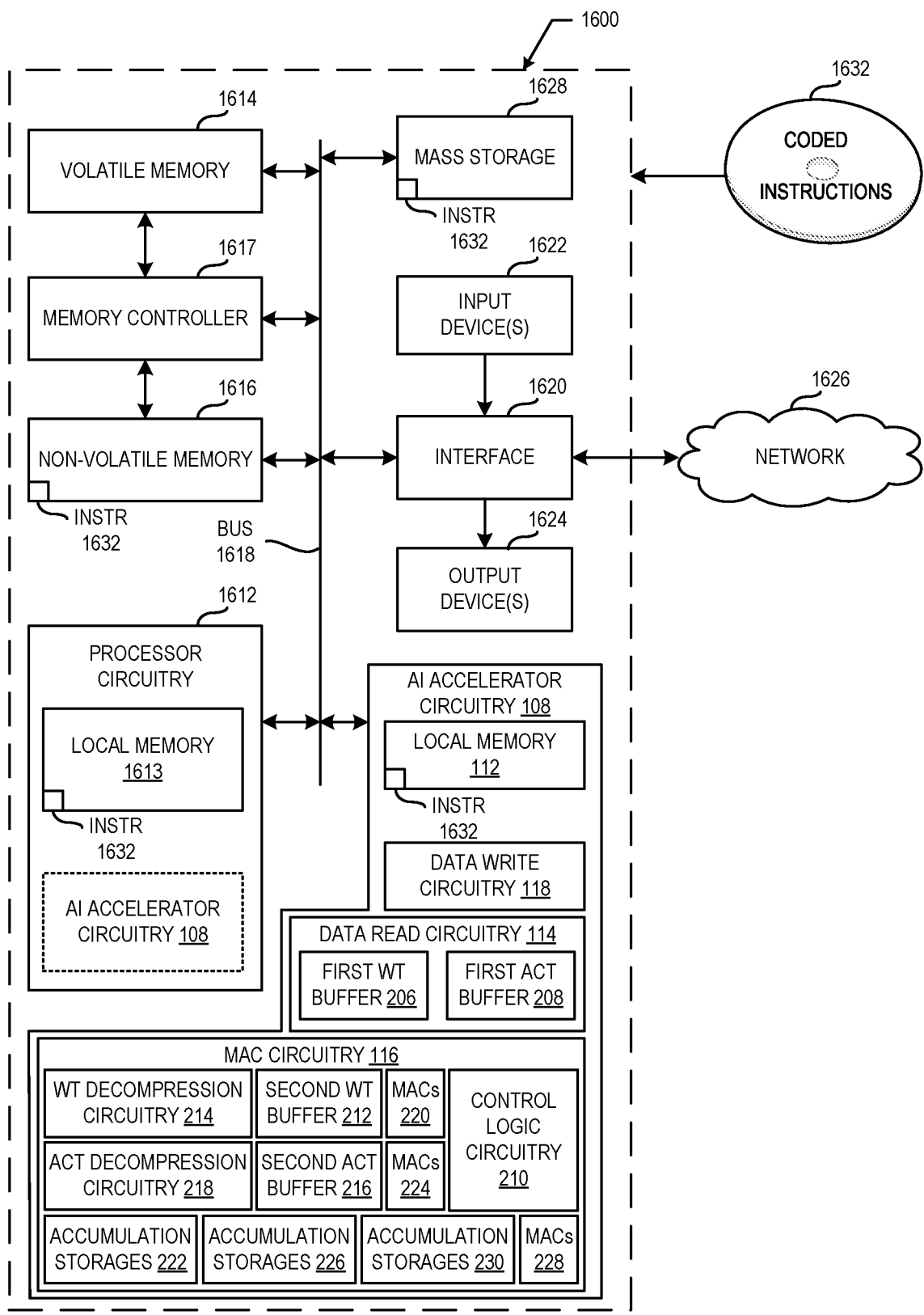
FIG. 16 is a block diagram of an example processing platform including processor circuitry structured to execute the example machine-readable instructions of FIGS. 10, 11, 12, 13, 14, and/or 15 to implement the example AI accelerator circuitry of FIGS. 1, 2A, and 2B.

FIG. 16 is a block diagram of an example processor platform 1600 structured to execute and/or instantiate the machine-readable instructions and/or operations of FIGS. 10, 11, 12, 13, 14, and/or 15 to implement the AI accelerator circuitry 108 of FIGS. 1 and/or 2. The processor platform 1600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs microprocessors, CPUs, GPUs, DSPs, and/or microcontrollers from any desired family or manufacturer. The processor circuitry 1612 may be implemented by one or more semiconductor based (e.g., silicon based) devices. In some examples, the processor circuitry 1612 implements the example local memory 112, the example data read circuitry 114, the example MAC circuitry 116, the example data write circuitry 118, the example first weight buffer 206, the example first activation buffer 208, the example control logic circuitry 210, the example second weight buffer 212, the example weight decompression circuitry 214, the example second activation buffer 216, the example activation decompression circuitry 218, the example first column of MAC circuits $220_{1,1}$-$220_{1,M}$, the example second column of MAC circuits $224_{1,1}$-$224_{1,M}$, the example Nth column of MAC circuits $228_{N,1}$-$228_{N,M}$, the example accumulation storages $222_{1,1}$-$222_{1,M}$, the example accumulation storages $226_{2,1}$-$226_{2,M}$, the example accumulation storages $230_{N,1}$-$230_{N,M}$. and/or, more generally, the example A1 accelerator circuitry 108 of FIG. 2.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random-Access Memory (SDRAM), Dynamic Random-Access Memory (DRAM), RAMBUS® Dynamic Random-Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes the A1 accelerator circuitry 108. The example AI accelerator circuitry 108 includes the example local memory 112, the example data read circuitry 114, the example MAC circuitry 116, and the example data write circuitry 118. In the example of FIG. 16, the data read circuitry 114 includes the example first weight buffer 206 and the example first activation buffer 208. Additionally, the MAC circuitry 116 includes the example control logic circuitry 210, the example second weight buffer 212, the example weight decompression circuitry 214, the example second activation buffer 216, the example activation decompression circuitry 218, the example first column of MAC circuits $220_{1,1}$-$220_{1,M}$, the example second column of MAC circuits $224_{1,1}$-$224_{1,M}$, the example Nth column of MAC circuits $228_{N,1}$-$228_{N,M}$, the example accumulation storages $222_{1,1}$-$222_{1,M}$, the example accumulation storages $226_{2,1}$-$226_{2,M}$, and the example accumulation storages $230_{N,1}$-$230_{N,M}$. As described above, the AI accelerator circuitry 108 of the illustrated example includes the local memory 112. The AI accelerator circuitry 108 of the illustrated example is in communication with the main memory including the volatile memory 1614 and the non-volatile memory 1616 by the bus 1618.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output devices 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1632, which may be implemented by the machine-readable instructions of FIGS. 10, 11, 12, 13, 14, and/or 15, may be stored in the local memory 112, in the local memory 1613, in the mass storage device 1628, in the volatile memory 1614, in the non-volatile memory 1616, and/or on a removable non-transitory computer readable storage medium such as a CD or DVD.

Figure 17:
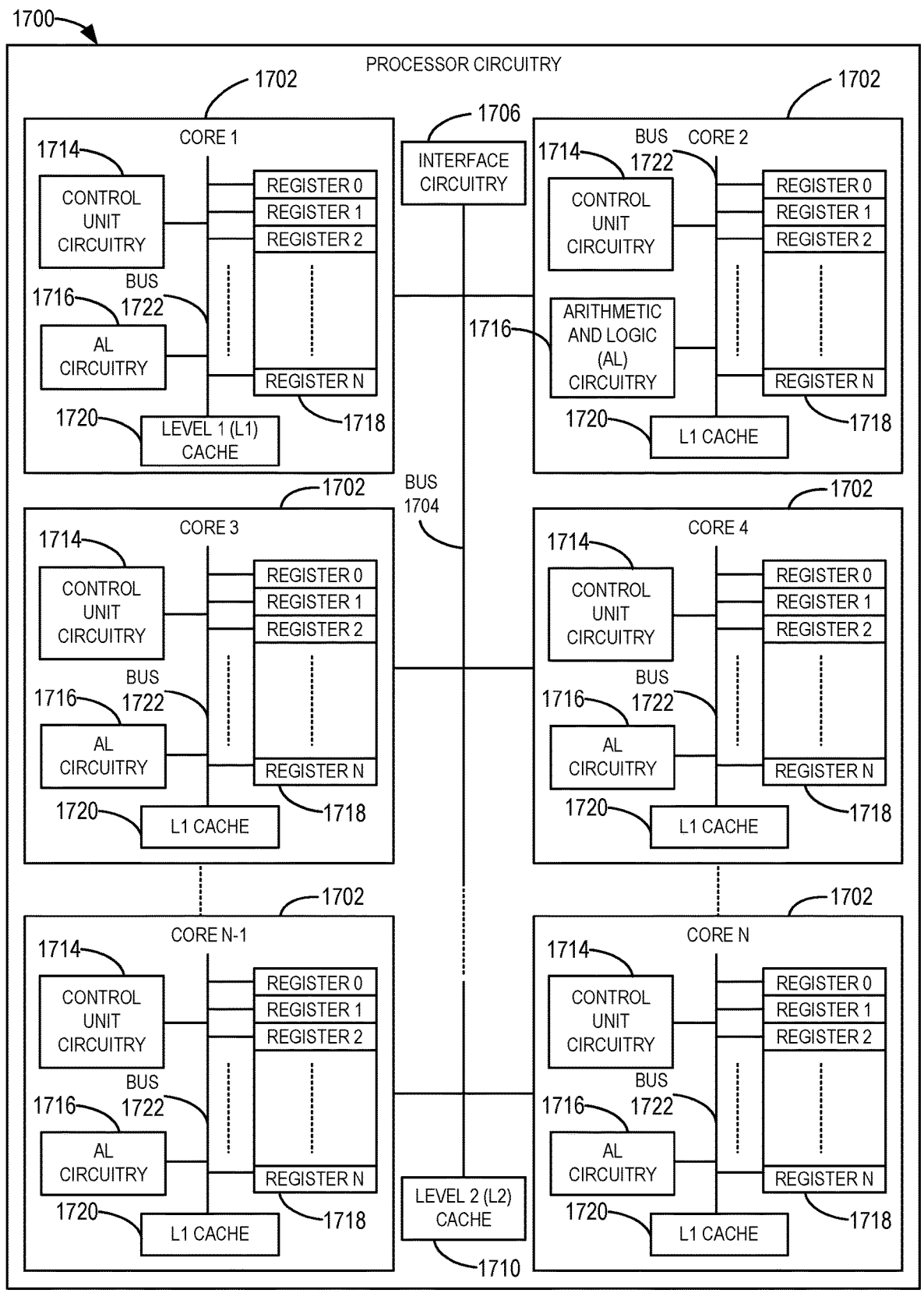
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a microprocessor 1700. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine-readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine-readable instructions and/or operations represented by the flowcharts of FIGS. 10, 11, 12, 13, 14, and/or 15.

The cores 1702 may communicate by an example bus 1704. In some examples, the bus 1704 may implement a communication bus to effectuate communication associated with one(s) of the cores 1702. For example, the bus 1704 may implement at least one of an Inter-Integrated Circuit (I2C) bus, a Serial Peripheral Interface (SPI) bus, a PCI bus, or a PCIe bus. Additionally or alternatively, the bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU circuitry) 1716, a plurality of registers 1718, the L1 cache 1720, and an example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The bus 1722 may implement at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
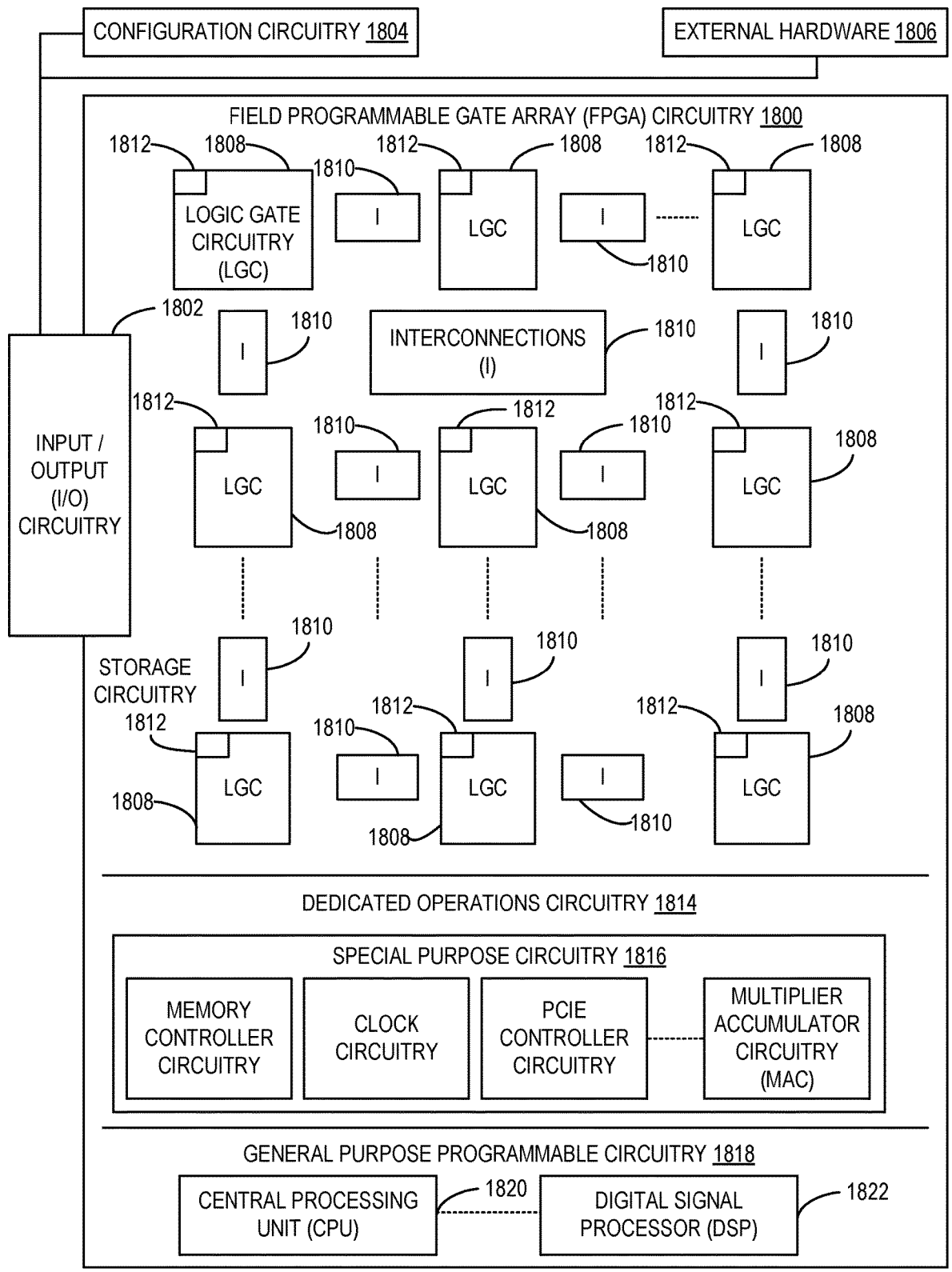
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine-readable instructions. However, once configured, the FPGA circuitry 1800 instantiates the machine-readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine-readable instructions represented by the flowcharts of FIGS. 10, 11, 12, 13, 14, and/or 15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine-readable instructions represented by the flowcharts of FIGS. 10, 11, 12, 13, 14, and/or 15. In particular, the FPGA circuitry 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 10, 11, 12, 13, 14, and/or 15. As such, the FPGA circuitry 1800 may be structured to effectively instantiate some or all of the machine-readable instructions of the flowcharts of FIGS. 10, 11, 12, 13, 14, and/or 15 as dedicated logic circuits to perform the operations corresponding to those software instructions in a dedicated manner analogous to an ASIC. Therefore, the FPGA circuitry 1800 may perform the operations corresponding to the some or all of the machine-readable instructions of FIGS. 10, 11, 12, 13, 14, and/or 15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine-readable instructions to configure the FPGA circuitry 1800, or portion(s) thereof. In some such examples, the configuration circuitry 1804 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware circuitry 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine-readable instructions of FIGS. 10, 11, 12, 13, 14, and/or 15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine-readable instructions represented by the flowcharts of FIGS. 10, 11, 12, 13, 14, and/or 15 may be executed by one or more of the cores 1702 of FIG. 17 and a second portion of the machine-readable instructions represented by the flowcharts of FIGS. 10, 11, 12, 13, 14, and/or 15 may be executed by the FPGA circuitry 1800 of FIG. 18.

In some examples, the processor circuitry 1612 of FIG. 16 may be in one or more packages. For example, the microprocessor 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
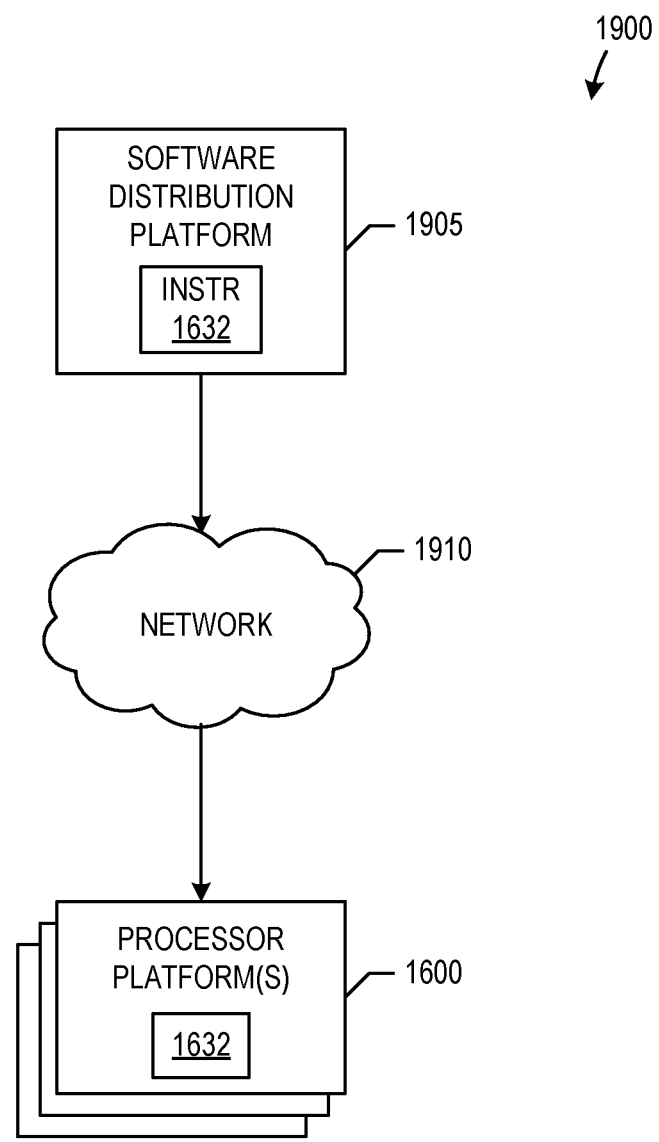
FIG. 19 is a block diagram of an example software distribution platform (e.g., one or more servers) to distribute software (e.g., software corresponding to the example machine-readable instructions of FIGS. 10, 11, 12, 13, 14, and/or 15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine-readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine-readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine-readable instructions 1632, which may correspond to the example machine-readable instructions and/or operations 1000 of FIG. 10, the example machine-readable instructions and/or operations 1100 of FIG. 11, the example machine-readable instructions and/or operations 1200 of FIG. 12, the example machine-readable instructions and/or operations 1300 of FIG. 13, the example machine-readable instructions and/or operations 1400 of FIG. 14, and/or the example machine-readable instructions and/or operations 1500 of FIG. 15, as described above. The one or more servers of the example software distribution platform 1905 are in communication with a network 1910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 1632 from the software distribution platform 1905. For example, the software, which may correspond to the example machine-readable instructions and/or operations 1000 of FIG. 10, the example machine-readable instructions and/or operations 1100 of FIG. 11, the example machine-readable instructions and/or operations 1200 of FIG. 12, the example machine-readable instructions and/or operations 1300 of FIG. 13, the example machine-readable instructions and/or operations 1400 of FIG. 14, and/or the example machine-readable instructions and/or operations 1500 of FIG. 15, may be downloaded to the example processor platform

1600, which is to execute the machine-readable instructions 1632 to implement the AI accelerator circuitry 108 of FIGS. 1 and/or 2. In some example, one or more servers of the software distribution platform 1905 periodically offer, transmit, and/or force updates to the software (e.g., the example machine-readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that increase data reuse for MAC operations. For example, systems, methods, apparatus, and articles of manufacture disclosed herein increase data reuse within AI accelerator circuitry. Example increased data reuse disclosed herein coupled with local buffering physically proximate to the MAC circuitry reduces both the number of memory reads and data movement for example AI accelerator circuitry, resulting in a higher TOPS/W.

The disclosed systems, methods, apparatus, and articles of manufacture improve the efficiency of using a computing device by reducing memory bandwidth requirement of example MAC circuitry. Accordingly, examples disclosed herein reduce the probability of memory contention from different read ports which increases the performance of example AI accelerator circuitry, resulting in higher utilization of example MAC circuitry. Additionally, lower memory bandwidth requirements reduce memory ports for example MAC circuitry thereby reducing routing complexity and improving timing closure during physical design. Accordingly, examples disclosed herein improves TOPS/W and TOPS/mm$^2$. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to increase data reuse for multiply and accumulate (MAC) operations are disclosed herein. Further examples and combinations thereof include the following:

Example 1 includes an apparatus to increase data reuse for multiply and accumulate (MAC) operations, the apparatus comprising a MAC circuit to process a first context of a set of a first type of contexts and a first context of a set of a second type of contexts, the first context of the first type stored in a first buffer, the first context of the second type stored in a second buffer, and control logic circuitry to in response to determining that there is an additional context of the second type to be processed in the set of the second type of contexts, reduce memory bandwidth by maintaining the first context of the first type in the first buffer, and in response to determining that there is an additional context of the first type to be processed in the set of the first type of contexts reduce the memory bandwidth by maintaining the first context of the second type in the second buffer, and iterate a pointer of the second buffer from a first position to a next position in the second buffer.

Example 2 includes the apparatus of example 1, wherein the control logic circuitry is to in response to determining that there is not an additional context of the second type to be processed in the set of the second type of contexts, flush the first context of the first type from the first buffer, and in response to determining that there is an additional context of the first type to be processed in the set of the first type of contexts, iterate a pointer of the first buffer to a next position in the first buffer.

Example 3 includes the apparatus of example 2, wherein while the MAC circuit processes a second context of the first type at the next position of the first buffer, the control logic circuitry is to load the first buffer with a next context of the set of the first type of contexts, and flush the next context of the set of the first type of contexts from a third buffer storing the set of the first type of contexts.

Example 4 includes the apparatus of example 3, wherein the control logic circuitry is to load the first buffer with a first subset of the set of the first type of contexts, and flush the first subset of the first type of contexts from the third buffer.

Example 5 includes the apparatus of example 1, wherein the next position in the second buffer is a first next position in the second buffer and the control logic circuitry is to in response to determining that there is not an additional context of the first type to be processed in the set of the first type of contexts, flush the first context of the second type from the second buffer, and in response to determining that there is an additional context of the second type to be processed in the set of the second type of contexts, iterate the pointer of the second buffer to a second next position in the second buffer.

Example 6 includes the apparatus of example 1, wherein the first type of contexts includes activation contexts, and the second type of contexts includes weight contexts.

Example 7 includes the apparatus of example 1, wherein the first type of contexts includes weight contexts, and the second type of contexts includes activation contexts.

Example 8 includes a non-transitory computer readable storage medium comprising instructions which, when executed, cause processor circuitry to at least process a first context of a set of a first type of contexts and a first context of a set of a second type of contexts, the first context of the first type stored in a first buffer, the first context of the second type stored in a second buffer, in response to determining that there is an additional context of the second type to be processed in the set of the second type of contexts, reduce memory bandwidth by maintaining the first context of the first type in the first buffer, and in response to determining that there is an additional context of the first type to be processed in the set of the first type of contexts reduce the memory bandwidth by maintaining the first context of the second type in the second buffer, and iterate a pointer of the second buffer from a first position to a next position in the second buffer.

Example 9 includes the non-transitory computer readable storage medium of example 8, wherein the instructions, when executed, cause the processor circuitry to in response to determining that there is not an additional context of the second type to be processed in the set of the second type of contexts, flush the first context of the first type from the first buffer, and in response to determining that there is an additional context of the first type to be processed in the set of the first type of contexts, iterate a pointer of the first buffer to a next position in the first buffer.

Example 10 includes the non-transitory computer readable storage medium of example 9, wherein while processing a second context of the first type at the next position of the first buffer, the instructions, when executed, cause the processor circuitry to load the first buffer with a next context of the set of the first type of contexts, and flush the next context of the set of the first type of contexts from a third buffer storing the set of the first type of contexts.

Example 11 includes the non-transitory computer readable storage medium of example 10, wherein the instructions, when executed, cause the processor circuitry to load the first buffer with a first subset of the set of the first type of contexts, and flush the first subset of the first type of contexts from the third buffer.

Example 12 includes the non-transitory computer readable storage medium of example 8, wherein the next position in the second buffer is a first next position in the second buffer and the instructions, when executed, cause the processor circuitry to in response to determining that there is not an additional context of the first type to be processed in the set of the first type of contexts, flush the first context of the second type from the second buffer, and in response to determining that there is an additional context of the second type to be processed in the set of the second type of contexts, iterate the pointer of the second buffer to a second next position in the second buffer.

Example 13 includes the non-transitory computer readable storage medium of example 8, wherein the first type of contexts includes activation contexts, and the second type of contexts includes weight contexts.

Example 14 includes the non-transitory computer readable storage medium of example 8, wherein the first type of contexts includes weight contexts, and the second type of contexts includes activation contexts.

Example 15 includes an apparatus to increase data reuse for multiply and accumulate (MAC) operations, the apparatus comprising means for performing MAC operations to process a first context of a set of a first type of contexts and a first context of a set of a second type of contexts, the first context of the first type stored in a first buffer, the first context of the second type stored in a second buffer, and means for controlling one or more buffers to in response to determining that there is an additional context of the second type to be processed in the set of the second type of contexts, reduce memory bandwidth by maintaining the first context of the first type in the first buffer, and in response to determining that there is an additional context of the first type to be processed in the set of the first type of contexts reduce the memory bandwidth by maintaining the first context of the second type in the second buffer, and iterate a pointer of the second buffer from a first position to a next position in the second buffer.

Example 16 includes the apparatus of example 15, wherein the means for controlling one or more buffers are to in response to determining that there is not an additional context of the second type to be processed in the set of the second type of contexts, flush the first context of the first type from the first buffer, and in response to determining that there is an additional context of the first type to be processed in the set of the first type of contexts, iterate a pointer of the first buffer to a next position in the first buffer.

Example 17 includes the apparatus of example 16, wherein while the means for performing MAC operations processes a second context of the first type at the next position of the first buffer, the means for controlling one or more buffers are to load the first buffer with a next context of the set of the first type of contexts, and flush the next context of the set of the first type of contexts from a third buffer storing the set of the first type of contexts.

Example 18 includes the apparatus of example 17, wherein the means for controlling one or more buffers are to load the first buffer with a first subset of the set of the first type of contexts, and flush the first subset of the first type of contexts from the third buffer.

Example 19 includes the apparatus of example 15, wherein the next position in the second buffer is a first next position in the second buffer and the means for controlling one or more buffers are to in response to determining that there is not an additional context of the first type to be processed in the set of the first type of contexts, flush the first context of the second type from the second buffer, and in response to determining that there is an additional context of the second type to be processed in the set of the second type of contexts, iterate the pointer of the second buffer to a second next position in the second buffer.

Example 20 includes the apparatus of example 15, wherein the first type of contexts includes activation contexts, and the second type of contexts includes weight contexts.

Example 21 includes the apparatus of example 15, wherein the first type of contexts includes weight contexts, and the second type of contexts includes activation contexts.

Example 22 includes a method for increasing data reuse for multiply and accumulate (MAC) operations, the method comprising processing a first context of a set of a first type of contexts and a first context of a set of a second type of contexts, the first context of the first type stored in a first buffer, the first context of the second type stored in a second buffer, in response to determining that there is an additional context of the second type to be processed in the set of the second type of contexts, reducing memory bandwidth by maintaining the first context of the first type in the first buffer, and in response to determining that there is an additional context of the first type to be processed in the set of the first type of contexts reducing the memory bandwidth by maintaining the first context of the second type in the second buffer, and iterating a pointer of the second buffer from a first position to a next position in the second buffer.

Example 23 includes the method of example 22, further including in response to determining that there is not an additional context of the second type to be processed in the set of the second type of contexts, flushing the first context of the first type from the first buffer, and in response to determining that there is an additional context of the first type to be processed in the set of the first type of contexts, iterating a pointer of the first buffer to a next position in the first buffer.

Example 24 includes the method of example 23, wherein while processing a second context of the first type at the next position of the first buffer, the method further includes loading the first buffer with a next context of the set of the first type of contexts, and flushing the next context of the set of the first type of contexts from a third buffer storing the set of the first type of contexts.

Example 25 includes the method of example 24, further including loading the first buffer with a first subset of the set of the first type of contexts, and flushing the first subset of the first type of contexts from the third buffer.

Example 26 includes the method of example 22, wherein the next position in the second buffer is a first next position in the second buffer and the method further includes in response to determining that there is not an additional context of the first type to be processed in the set of the first type of contexts, flushing the first context of the second type from the second buffer, and in response to determining that there is an additional context of the second type to be processed in the set of the second type of contexts, iterating the pointer of the second buffer to a second next position in the second buffer.

Example 27 includes the method of example 22, wherein the first type of contexts includes activation contexts, and the second type of contexts includes weight contexts.

Example 28 includes the method of example 22, wherein the first type of contexts includes weight contexts, and the second type of contexts includes activation contexts.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to increase data reuse for multiply and accumulate (MAC) operations, the apparatus comprising:
    a MAC circuit to process a first context of a set of a first type of contexts and a first context of a set of a second type of contexts, the first context of the first type stored in a first buffer, the first context of the second type stored in a second buffer; and
    control logic circuitry to:
        in response to determining that there is an additional context of the second type to be processed in the set of the second type of contexts, reduce memory bandwidth by maintaining the first context of the first type in the first buffer; and
        in response to determining that there is an additional context of the first type to be processed in the set of the first type of contexts:
            reduce the memory bandwidth by maintaining the first context of the second type in the second buffer; and
            iterate a pointer of the second buffer from a first position to a next position in the second buffer.

2. The apparatus of claim 1, wherein the control logic circuitry is to:
    in response to determining that there is not an additional context of the second type to be processed in the set of the second type of contexts, flush the first context of the first type from the first buffer; and
    in response to determining that there is an additional context of the first type to be processed in the set of the first type of contexts, iterate a pointer of the first buffer to a next position in the first buffer.

3. The apparatus of claim 2, wherein while the MAC circuit processes a second context of the first type at the next position of the first buffer, the control logic circuitry is to:
    load the first buffer with a next context of the set of the first type of contexts; and
    flush the next context of the set of the first type of contexts from a third buffer storing the set of the first type of contexts.

4. The apparatus of claim 3, wherein the control logic circuitry is to:
    load the first buffer with a first subset of the set of the first type of contexts; and
    flush the first subset of the first type of contexts from the third buffer.

5. The apparatus of claim 1, wherein the next position in the second buffer is a first next position in the second buffer and the control logic circuitry is to:
    in response to determining that there is not an additional context of the first type to be processed in the set of the first type of contexts, flush the first context of the second type from the second buffer; and
    in response to determining that there is an additional context of the second type to be processed in the set of the second type of contexts, iterate the pointer of the second buffer to a second next position in the second buffer.

6. The apparatus of claim 1, wherein the first type of contexts includes activation contexts, and the second type of contexts includes weight contexts.

7. The apparatus of claim 1, wherein the first type of contexts includes weight contexts, and the second type of contexts includes activation contexts.

8. An apparatus to increase data reuse for multiply and accumulate (MAC) operations, the apparatus comprising:
    means for performing MAC operations to process a first context of a set of a first type of contexts and a first context of a set of a second type of contexts, the first context of the first type stored in a first buffer, the first context of the second type stored in a second buffer; and
    means for controlling one or more buffers to:
        in response to determining that there is an additional context of the second type to be processed in the set of the second type of contexts, reduce memory bandwidth by maintaining the first context of the first type in the first buffer; and
        in response to determining that there is an additional context of the first type to be processed in the set of the first type of contexts:
            reduce the memory bandwidth by maintaining the first context of the second type in the second buffer; and
            iterate a pointer of the second buffer from a first position to a next position in the second buffer.

9. The apparatus of claim 8, wherein the means for controlling one or more buffers are to:
    in response to determining that there is not an additional context of the second type to be processed in the set of the second type of contexts, flush the first context of the first type from the first buffer; and
    in response to determining that there is an additional context of the first type to be processed in the set of the first type of contexts, iterate a pointer of the first buffer to a next position in the first buffer.

10. The apparatus of claim 9, wherein while the means for performing MAC operations processes a second context of the first type at the next position of the first buffer, the means for controlling one or more buffers are to:
    load the first buffer with a next context of the set of the first type of contexts; and
    flush the next context of the set of the first type of contexts from a third buffer storing the set of the first type of contexts.

11. The apparatus of claim 10, wherein the means for controlling one or more buffers are to:
    load the first buffer with a first subset of the set of the first type of contexts; and
    flush the first subset of the first type of contexts from the third buffer.

12. The apparatus of claim 8, wherein the next position in the second buffer is a first next position in the second buffer and the means for controlling one or more buffers are to:
    in response to determining that there is not an additional context of the first type to be processed in the set of the first type of contexts, flush the first context of the second type from the second buffer; and
    in response to determining that there is an additional context of the second type to be processed in the set of the second type of contexts, iterate the pointer of the second buffer to a second next position in the second buffer.

13. The apparatus of claim 8, wherein the first type of contexts includes activation contexts, and the second type of contexts includes weight contexts.

14. A method for increasing data reuse for multiply and accumulate (MAC) operations, the method comprising:
  processing a first context of a set of a first type of contexts and a first context of a set of a second type of contexts, the first context of the first type stored in a first buffer, the first context of the second type stored in a second buffer;
  in response to determining that there is an additional context of the second type to be processed in the set of the second type of contexts, reducing memory bandwidth by maintaining the first context of the first type in the first buffer; and
  in response to determining that there is an additional context of the first type to be processed in the set of the first type of contexts:
    reducing the memory bandwidth by maintaining the first context of the second type in the second buffer; and
    iterating a pointer of the second buffer from a first position to a next position in the second buffer.

15. The method of claim 14, further including:
  in response to determining that there is not an additional context of the second type to be processed in the set of the second type of contexts, flushing the first context of the first type from the first buffer; and
  in response to determining that there is an additional context of the first type to be processed in the set of the first type of contexts, iterating a pointer of the first buffer to a next position in the first buffer.

16. The method of claim 15, wherein while processing a second context of the first type at the next position of the first buffer, the method further includes:
  loading the first buffer with a next context of the set of the first type of contexts; and
  flushing the next context of the set of the first type of contexts from a third buffer storing the set of the first type of contexts.

17. The method of claim 16, further including:
  loading the first buffer with a first subset of the set of the first type of contexts; and
  flushing the first subset of the first type of contexts from the third buffer.

18. The method of claim 14, wherein the next position in the second buffer is a first next position in the second buffer and the method further includes:
  in response to determining that there is not an additional context of the first type to be processed in the set of the first type of contexts, flushing the first context of the second type from the second buffer; and
  in response to determining that there is an additional context of the second type to be processed in the set of the second type of contexts, iterating the pointer of the second buffer to a second next position in the second buffer.

19. A non-transitory computer readable storage medium comprising instructions which, when executed, cause processor circuitry to at least:
  process a first context of a set of a first type of contexts and a first context of a set of a second type of contexts, the first context of the first type stored in a first buffer, the first context of the second type stored in a second buffer;
  in response to determining that there is an additional context of the second type to be processed in the set of the second type of contexts, reduce memory bandwidth by maintaining the first context of the first type in the first buffer; and
  in response to determining that there is an additional context of the first type to be processed in the set of the first type of contexts:
    reduce the memory bandwidth by maintaining the first context of the second type in the second buffer; and
    iterate a pointer of the second buffer from a first position to a next position in the second buffer.

20. The non-transitory computer readable storage medium of claim 19, wherein the instructions, when executed, cause the processor circuitry to:
  in response to determining that there is not an additional context of the second type to be processed in the set of the second type of contexts, flush the first context of the first type from the first buffer; and
  in response to determining that there is an additional context of the first type to be processed in the set of the first type of contexts, iterate a pointer of the first buffer to a next position in the first buffer.

21. The non-transitory computer readable storage medium of claim 20, wherein while processing a second context of the first type at the next position of the first buffer, the instructions, when executed, cause the processor circuitry to:
  load the first buffer with a next context of the set of the first type of contexts; and
  flush the next context of the set of the first type of contexts from a third buffer storing the set of the first type of contexts.

22. The non-transitory computer readable storage medium of claim 21, wherein the instructions, when executed, cause the processor circuitry to:
  load the first buffer with a first subset of the set of the first type of contexts; and
  flush the first subset of the first type of contexts from the third buffer.

23. The non-transitory computer readable storage medium of claim 19, wherein the next position in the second buffer is a first next position in the second buffer and the instructions, when executed, cause the processor circuitry to:
  in response to determining that there is not an additional context of the first type to be processed in the set of the first type of contexts, flush the first context of the second type from the second buffer; and
  in response to determining that there is an additional context of the second type to be processed in the set of the second type of contexts, iterate the pointer of the second buffer to a second next position in the second buffer.

24. The non-transitory computer readable storage medium of claim 19, wherein the first type of contexts includes activation contexts, and the second type of contexts includes weight contexts.

25. The non-transitory computer readable storage medium of claim 19, wherein the first type of contexts includes weight contexts, and the second type of contexts includes activation contexts.

* * * * *